(12) United States Patent
Victoroff et al.

(10) Patent No.: US 10,956,790 B1
(45) Date of Patent: Mar. 23, 2021

(54) GRAPHICAL USER INTERFACE TOOL FOR DATASET ANALYSIS

(71) Applicant: INDICO, Boston, MA (US)

(72) Inventors: Slater Victoroff, Boston, MA (US); Madison May, Boston, MA (US)

(73) Assignee: INDICO, Boston, MA (US)

( * ) Notice: Subject to any disclaimer, the term of this patent is extended or adjusted under 35 U.S.C. 154(b) by 0 days.

(21) Appl. No.: 16/422,660

(22) Filed: May 24, 2019

Related U.S. Application Data

(60) Provisional application No. 62/677,504, filed on May 29, 2018.

(51) Int. Cl.
| | |
|---|---|
| *G06K 9/62* | (2006.01) |
| *G06F 3/0481* | (2013.01) |
| *G06K 9/00* | (2006.01) |
| *G06N 20/00* | (2019.01) |

(52) U.S. Cl.
CPC ......... *G06K 9/6263* (2013.01); *G06F 3/0481* (2013.01); *G06K 9/00483* (2013.01); *G06K 9/6211* (2013.01); *G06K 9/6231* (2013.01); *G06K 9/6253* (2013.01); *G06K 9/6257* (2013.01); *G06N 20/00* (2019.01)

(58) Field of Classification Search
CPC .. G06K 9/6263; G06K 9/6211; G06K 9/6253; G06K 9/00483; G06K 9/6257; G06K 9/6231; G06F 3/0481; G06N 20/00
USPC ........................................................ 715/764
See application file for complete search history.

(56) References Cited

U.S. PATENT DOCUMENTS

| | | | |
|---|---|---|---|
| 10,062,039 B1 * | 8/2018 | Lockett ................ | G06N 3/0454 |
| 10,108,902 B1 * | 10/2018 | Lockett ................ | G06N 3/0445 |
| 10,671,812 B2 * | 6/2020 | Bondugula ............ | G06F 16/35 |
| 10,713,560 B2 * | 7/2020 | Applegate ............ | G06N 3/0472 |
| 2010/0092093 A1 * | 4/2010 | Akatsuka ............. | G06K 9/6212 |
| | | | 382/203 |
| 2014/0105506 A1 * | 4/2014 | Drost .................. | G06K 9/00201 |
| | | | 382/199 |

(Continued)

OTHER PUBLICATIONS

Devlin, Jacob, et al., "BERT: Pre-training of Deep Bidirectional Transformers for Language Understanding", (https://arxiv.org/abs/1810.04805), May 24, 2019, 16 pages.

(Continued)

*Primary Examiner* — William D Titcomb
(74) *Attorney, Agent, or Firm* — Ladas & Parry, LLP

(57) ABSTRACT

A graphical user interface comprising a data interface for receiving a set of text documents; a calculator for transforming each received text document into a vector of a n-dimensional manifold, n being larger than 2; transforming each n-dimensional manifold vector into a 2-D data; generating a first mapping of what 2-D data corresponds to what n-dimensional manifold vector; and generating a second mapping of what 2-D data corresponds to what received text document; a first user display arranged for displaying each 2-D data on a 2-D plane; a first user interface arranged for allowing a user to select a subset of the displayed 2-D data; wherein selecting said subset of 2-D data automatically selects the n-dimensional manifold vectors that correspond to said subset of 2-D data; and a second user display arranged for displaying a list of the text documents that correspond to said subset of 2-D data.

26 Claims, 34 Drawing Sheets

(56) References Cited

U.S. PATENT DOCUMENTS

| | | | |
|---|---|---|---|
| 2014/0247996 A1* | 9/2014 | Lin | G06K 9/6211 |
| | | | 382/218 |
| 2015/0193431 A1* | 7/2015 | Stoytchev | G16B 20/00 |
| | | | 704/9 |
| 2017/0024466 A1* | 1/2017 | Bordawekar | G06F 40/216 |
| 2017/0053646 A1* | 2/2017 | Watanabe | G06N 3/0445 |
| 2017/0212829 A1* | 7/2017 | Bales | G06F 11/3612 |
| 2017/0228361 A1* | 8/2017 | Zhang | G06F 16/337 |
| 2017/0270409 A1* | 9/2017 | Trischler | G06N 3/08 |
| 2017/0286835 A1* | 10/2017 | Ho | G06F 16/367 |
| 2017/0351953 A1* | 12/2017 | Raemy | G06F 40/284 |
| 2018/0018573 A1* | 1/2018 | Henderson | G06N 7/005 |
| 2018/0053324 A1* | 2/2018 | Cohen | G06T 9/005 |
| 2018/0232443 A1* | 8/2018 | Delgo | G06F 16/334 |
| 2018/0246883 A1* | 8/2018 | Wang | G06F 40/44 |
| 2018/0268298 A1* | 9/2018 | Johansen | G06F 40/30 |
| 2018/0285352 A1* | 10/2018 | Ma | G06F 40/42 |
| 2018/0285459 A1* | 10/2018 | Soni | G06F 16/93 |
| 2018/0373986 A1* | 12/2018 | Rainwater | G06N 3/0445 |
| 2019/0065986 A1* | 2/2019 | Witbrock | G06N 20/10 |
| 2019/0087721 A1* | 3/2019 | Prakash | G06N 3/0445 |
| 2019/0163817 A1* | 5/2019 | Milenova | G06N 5/04 |
| 2019/0286978 A1* | 9/2019 | Aggarwal | G06N 3/0445 |
| 2019/0311301 A1* | 10/2019 | Pyati | G06F 16/901 |
| 2020/0191943 A1* | 6/2020 | Wu | G01S 13/003 |

OTHER PUBLICATIONS

Mikolov, Tomas, et al., "Distributed Representations of Words and Phrases and their Compositionality", (https://papers.nips.cc/paper/5021-distributed-representations-of-words-and-phrases- and-their-compositionality.pdf), 2013, 9 pages.

Pennington, Jeffrey, et al., "GloVe: Global Vectors for Word Representation", Computer Science Department, Stanford University, Stanford, CA 94305; (https://www.aclweb.org/anthology/D14-1162), 2014, pp. 1532-1543.

Peters, Matthew E., et al. "Deep contextualized word representations", JUN(https://arxiv.org/pdf/1802.05365.pdf), Mar. 22, 2018, 15 pages.

* cited by examiner

| | ROC AUC | Precision | Recall | F1 Score | Accuracy |
|---|---|---|---|---|---|
| MWS | 0.88 | 0.72 | 0.72 | 0.72 | 0.83 |
| EAP | 0.84 | 0.72 | 0.76 | 0.74 | 0.76 |
| HPL | 0.89 | 0.74 | 0.7 | 0.72 | 0.84 |

1 - 3 of 3

INCORRECT — CORRECT

16 — Pareamo aver qui tutto il ben raccolto Che fra mortali in piu parte si rimembra. 0

16' — je lui ai cette obligation entre les autres, de m' auoir non seulement mis en main cc Livre en anglois, mais encore le Manuscrit due Sieur Thomas D'Anan, gentilhomme Eccossois, recommandable pour sa vertu, sur la version duquel j' advoue que j' ay tir le plan de la mienne"   EAP   ✕

GRAPHICAL USER INTERFACE TOOL FOR DATASET ANALYSIS

TECHNICAL FIELD

This presentation relates to a graphical user interface allowing a user to intuitively create a data-driven taxonomy, test taxonomic hypotheses, refine a preliminary set of training data, and efficiently label data for a natural language processing model.

BACKGROUND

Data-driven taxonomy creation and prototyping of the corresponding classification model can be conducted using distributed word representations. Distributed word representations, for example word embeddings, can be applied in various text mining and natural language processing tasks. They are used to embed individual words into a high dimensional manifold. A corresponding technology used for full documents is that of text embeddings rather than word embeddings. Text embeddings similarly embed full documents into a high-dimensional manifold, and often use word embeddings as a starting point. An embedding method can thus be used to represent full text documents as vectors. These embedding methods are for example used in information filtering, information retrieval, indexing or relevancy rankings. There exists a need for a graphical user interface capable of allowing users to intuitively discover and understand topic variants, which can be effectively achieved through effective use of these text embeddings.

SUMMARY

This presentation discloses a Graphical User Interface (GUI) system for discovering and understanding topic variants within subject matter through visualization of text embeddings.

This presentation discloses a GUI system for iteratively discovering unknown-unknowns through display of implicit corpus topology via manifold layout algorithms and corresponding model introspection.

This presentation discloses a GUI system for improving the speed and efficacy of labeling tasks over time by intrinsically connecting the task to a machine learning model.

This presentation discloses a GUI system for expanding common error visualization techniques to allow for surgical correction and interpretation of machine learning models built on top of text embeddings.

This presentation generally discloses the following concepts:

Concept 1. A graphical user interface (GUI) comprising an interface arranged to allow the user to upload a series of documents. These documents may be in a variety of formats including but not limited to, DOCX, PDF, and csv.

Concept 2. An application programing interface (API) accepting as input the documents outlined in Concept 1 and computing a series of calculations against that dataset for later use. Specifically the API will compute the following:
a/ A standard text representation for all submitted documents (The Corpus) using traditional techniques for extraction, transformation and loading (ETL) including but not limited to Optical Character Recognition (OCR), XML Parsing, and CSV Parsing b/ A vector space model of The Corpus based on computed term frequencies resulting in a sparse n-dimensional vector, where n is the number of words included in the vocabulary
c/ A dense m-dimensional vector for each document in The Corpus. This vector is computed using any of a variety of techniques including but not limited to neural networks, dimensionality reduction of co-occurrence matrices, and probabilistic models (The Embedding Technique). The value "m" is specific to The Embedding Technique.
d/ A 2-D vector for each document in The Corpus computed by applying a non-linear dimensionality reduction algorithm to the m-dimensional vectors computed in concept 2c.

Concept 3. A GUI comprising the following specific displays:
a/ a user display arranged for presenting the 2-D vectors of concept 2-D and allowing the user to select a subset of these vectors;
b/ a user display arranged for the selection of machine learning models (Custom Collections) trained on The Corpus;
c/ a user display for presenting and labeling the subset of documents from The Corpus in Concept 2a corresponding to the 2-d vectors selected in concept 3a;
d/ a user display for visualizing vector space models computed by comparing a vector space model representing a subset of The Corpus to the vector space model referenced in Concept 1b.

Concept 4. The GUI of Concept 3a wherein each datum of Concept 2d is represented as a point having an x and y coordinate on a plane displayed in Concept 3a; as well as an associated coloration (an Overlay).

Concept 5. The GUI of Concept 3b wherein a user is presented a standard type-ahead list of available Custom Collections that have been created on The Corpus, as well as an ability to create an empty Custom Collection. Upon selection the Custom Collection is used to predict labels for each example in The Corpus. Each label in the Custom Collection is then assigned to a color value and applied as an Overlay to Concept 4.

Concept 6. The GUI of Concept 3c comprising: a user display arranged for displaying in a list each document represented in concept 3c, as well as an interface displaying the classes present in the Custom Collection selected in concept 2b as options for labeling the selected documents according to their text content. After labeling, the user "submits" the data to the Custom Collection, updating the underlying machine learning model.

Concept 7. The GUI of Concept 3d arranged to display the most frequent words of the corresponding n-dimensional vector space model, each with a size depending on the weight associated with the word in said vector space model.

Concept 8. The GUI of Concept 3a comprising an additional user display arranged to allow for the user to input a word or short phrase (the Query).

Concept 9. An API accepting as input the Query from Concept 8 and computing the following:
a/ An m-dimensional dense vector representation of the Query computed using The Embedding Technique (The Query Vector);
b/ An o-dimensional vector (The Distance Vector) where o is the number of documents in The Corpus, and each index i of the vector corresponding to the distance between The Query Vector and the ith m-dimensional vector computed in Concept 2c according to a distance metric appropriate to The Embedding Technique;
c/ A second o-dimensional vector (The Coloration Vector) derived from The Distance Vector where each index j of The Coloration Vector corresponding to a short tuple derived from the jth entry in The Distance Vector. Each tuple represents a point in color space according to an appropriate color model.

Concept 10. The GUI of concept 3a comprising an additional user display in which The Coloration Vector is used as an Overlay as per Concept 4.

Concept 11. A graphical user interface comprising: a data interface arranged for receiving a set of test documents having each a known association to one label of a set of labels; a data recognition model arranged for associating each test document to an estimated label of said set of labels, using recognition rules based on a set of learning documents having each a known association to one of said set of labels; a first user display for displaying a plurality of the test documents together with their estimated and known associated labels; a first user interface arranged for allowing a user to select any of the test documents displayed by the first user display; a second user display for displaying the learning documents of said set of learning documents that are within a predetermined distance of the selected test documents.

Concept 12. The graphical user interface of concept 11, comprising a second user interface arranged for allowing a user to correct the set of learning documents by canceling any learning document displayed on the second user display; wherein the data recognition model is arranged for updating said recognition rules based on the corrected set of learning documents.

Concept 13. A graphical user interface comprising: a data interface arranged for receiving a set of learning documents; a first user display arranged for displaying a first series of learning documents; a first user interface arranged for allowing a user to enter a known association between each learning document displayed on the first user display and a selected label of a set of labels; a second user display arranged for displaying a second series of learning documents, a data recognition model having recognition rules based on said known associations for associating each learning document displayed on the second user display to an estimated label of said set of labels; the second user display being arranged for additionally displaying the estimated label of each learning document displayed on the second user display; a second user interface arranged for allowing a user to accept—or not—each estimated label association as a known association that is to be used by the data recognition model to update the recognition rules.

Concept 14 The graphical user interface of concept 13, wherein the said displaying on the first or second user displays of the estimated label of each learning document displayed comprises highlighting in a non-binary way how at least one word of said learning document associates said learning document to said estimated label.

Concept 15. The graphical user interface of concept 13, wherein each data/document of the set of learning documents is a sequence of words.

Concept 16. The graphical user interface of concept 13, wherein said data recognition model is arranged for associating each learning document displayed on the second user display to a plurality of estimated labels, each with a calculated confidence level; the second user display being arranged for additionally displaying each estimated label association together with its calculated confidence level.

Concept 17 A graphical user interface comprising: a data interface arranged for receiving a set of text documents; a calculator arranged for: transforming each text document of the received set into a vector of a n-dimensional manifold, n being an integer larger than 2; transforming each vector in said n-dimensional manifold into a data in a 2-D space; generating and storing a first mapping of what data in said 2-D space corresponds to what vector in said n-dimensional manifold; and generating and storing a second mapping of what data in said 2-D space corresponds to what text document of the received set; a first user display arranged for displaying each data in said 2-D space on a 2-D plane; a first user interface arranged for allowing a user to select a subset of the displayed data in said 2-D space; wherein selecting said subset of the data in said 2-D space automatically selects the vectors in said n-dimensional manifold that correspond to said subset of data in said 2-D space; and a second user display arranged for displaying a list of the text documents that correspond to said subset of data in said 2-D space.

Concept 18. The graphical interface of concept 17, wherein the calculator is further arranged for: calculating a first vector space model of the received set of text documents; calculating a second vector space model of the text documents that correspond to said subset of data in said 2-D space; and calculating a third vector space model equal to the difference between the first and second vector space models; the graphical user interface further comprising a third user display for displaying a word cloud representation of said third vector space model.

Concept 19. The graphical interface of concept 17, wherein said data interface arranged for receiving a set of text documents comprises one of an Optical Character Recognition function, a XML Parsing function, and a CSV Parsing function.

Concept 20. The graphical interface of concept 17, further comprising a second user interface arranged for allowing a user to associate said subset of the data in said 2-D space to an associated label, from a predetermined set of labels or entered by the user; wherein associating said subset of the data in said 2-D space to said associated label automatically associates said associated label to the vectors in said n-dimensional manifold that correspond to said subset of data in said 2-D space.

Concept 21. The graphical interface of concept 20, wherein the calculator is further arranged to: train a label recognition model using said associated label and said vectors in said n-dimensional manifold that correspond to said subset of data in said 2-D space; using said label recognition model, estimate the likeliness of each text document of said received set of text documents being associated to said associated label; and emphasize differently on the first user display the data in said 2-D space that corresponds to a text document of said received set of text documents having different predetermined likeliness of being associated to said associated label.

Concept 22. The graphical user interface of concept 21, further comprising a third user interface arranged to allow a user to select a label associated to at least one data in said 2-D space, the calculator being arranged:

to generate a modified set of text documents comprising either the received text documents associated to the selected label or the received text documents except those associated to the selected label; and to display on the 2D display only the 2-D data corresponding to the n-dimensional manifold vectors of the modified set of text documents.

Concept 23. The graphical user interface of concept 22, wherein the calculator is arranged to change the scale of the 2-D display such that the 2-D data is always displayed on at least a predetermined portion of the first user display.

Concept 24. The graphical user interface of concept 22, wherein the calculator is arranged to change how said vectors in said n-dimensional manifold are transformed into a data in a 2-D space as a function of said modified set of text documents, such that the 2-D data is always displayed on at least a predetermined portion of the first user display.

Concept 25. The graphical user interface of concept 21, further comprising a third user interface arranged to allow a user to associate a received text document to a label, or to un-associate a received text document from a label to which it was previously associated, by selecting the displayed 2-D data corresponding to the received text document.

Concept 26. The graphical user interface of concept 21 or 22, wherein the calculator is arranged to change how the vectors in the n-dimensional manifold are transformed into a data in a 2-D space, such that the 2-D data of text documents associated to a same label form clusters on the first user display.

Concept 27. The graphical user interface of concept 26 wherein the calculator is arranged to weigh the directions of the n-dimensional manifold that appear prominently in the vectors of the text documents associated to labels differently from the other directions of the n-dimensional manifold.

Concept 28. The graphical user interface of concept 27, wherein the weighing of the prominent directions is such that the 2-D projection of distances along said directions appear shorter on the 2-D display than the 2-D projection of distances along the other, non-weighed, directions.

Concepts 29. The graphical user interface of concept 26, wherein the calculator is arranged to cause the 2-D data of text documents associated to a same label to form said clusters in real time as the text documents associated to a same label change.

Concept 30. The graphical user interface of concept 21, wherein the calculator is arranged to change how said vectors in said n-dimensional manifold are transformed into a data in a 2-D space, such that the distances separating the 2-D data of text documents associated to a same label are reduced on the first user display.

Concept 31. The graphical user interface of concept 17, wherein the calculator is further arranged to allow a user to adjust the number n of dimensions in said n-dimensional manifold.

Concept 32. The graphical user interface of concept 17, wherein at least one of the received text documents is associated to a label and wherein the calculator is further arranged to:
train a label recognition model using said associated label and the vectors in the n-dimensional manifold that correspond to said at least one of the received text documents; using said label recognition model, estimate the likeliness of each non-labeled text document of said received set of text documents being associated to said associated label; and emphasize differently on the first user display the data in said 2-D space that corresponds to a text document of said received set of text documents having different predetermined likeliness of being associated to said associated label.

Concept 33. The graphical user interface of concept 17, wherein at least one of the received text documents is associated to a label and wherein the calculator is further arranged to filter out and not process anymore said at least one of the received text documents if said label is part of a predetermined set of labels that are to be filtered out.

Concept 34. A graphical user interface comprising: a data interface arranged for receiving a set of text documents; a calculator arranged for: transforming each text document of the received set into a vector of a n-dimensional manifold, n being an integer larger than 2; transforming each vector in said n-dimensional manifold into a data in a 2-D space; and generating and storing a first mapping of what data in said 2-D space corresponds to what vector in said n-dimensional manifold; a first user display arranged for displaying each data in said 2-D space on a 2-D plane; and a first user interface arranged for allowing a user to submit a query text; the calculator being further arranged to: transform said query text into a vector of said n-dimensional manifold; and use a distance metric to calculate a distance between the transformed query text and the vector in said n-dimensional manifold of each text document of the received set; the first user display being arranged for highlighting each data in said 2-D space as a function of the distance calculated for the n-dimensional manifold vector that corresponds to the data in 2-D space.

Concept 35. The graphical interface of concept 34, wherein the calculator is further arranged for: generating and storing a second mapping of what data in said 2-D space corresponds to what text document of the received set; and generating a first subset of data in said 2-D space corresponding to n-dimensional manifold vectors having a calculated distance below a predetermined threshold; the graphical user interface comprising a second user display arranged for displaying a list of the text documents that correspond to said first subset of data in said 2-D space.

Concept 36. The graphical interface of concept 34, wherein the calculator is further arranged for: calculating a first vector space model of the received set of text documents; calculating a second vector space model of the text document that correspond to said first subset of data in said 2-D space; and calculating a third vector space model equal to the difference between the first and second vector space models; the graphical user interface further comprising a third user display for displaying a word cloud representation of said third vector space model.

Concept 37. The graphical interface of concept 35, comprising a second user interface arranged for allowing a user to select a second subset of the displayed data in said 2-D space; wherein selecting said second subset of the data in said 2-D space automatically selects the vectors in said n-dimensional manifold that correspond to said second subset of data in said 2-D space; a third user display being arranged for displaying a list of the text document that correspond to said second subset of data in said 2-D space.

Concept 38. The graphical interface of concept 37, further comprising a third user interface arranged for allowing a user to associate said second subset of the data in said 2-D space to an associated label, from a predetermined set of labels or entered by the user; wherein associating said second subset of the data in said 2-D space to said associated label automatically associates said associated label to the vectors in said n-dimensional manifold that correspond to said second subset of data in said 2-D space.

Concept 39. The graphical interface of concept 38, wherein the calculator is further arranged to: train a label recognition model using said selected label and said vectors in said n-dimensional manifold that correspond to said subset of data in said 2-D space; using said label recognition model, estimate the likeliness of each text document of said received set of text documents being associated to said selected label; and emphasize differently on the first user display the data in said 2-D space that corresponds to a text document of said received set of text documents having different predetermined likeliness of being associated to said selected label.

Concept 40. The graphical interface of concept 34, wherein said data interface arranged for receiving a set of text documents comprises one of an Optical Character Recognition function, a XML Parsing function, and a CSV Parsing function.

Concept 41. A graphical user interface comprising: a data interface arranged for receiving a set of test documents having each a known association to one label of a set of labels; a data recognition model arranged for associating each test document to an estimated label of said set of labels, said data recognition model based on a set of learning documents having each a known association to one of said set of labels; a first user display for displaying any discrepancy between the estimated and known associated labels for all the test documents; a first user interface arranged for allowing a user to select any of the test documents having a displayed discrepancy between its estimated and known associated labels; a calculator arranged for using a distance metric to calculate a distance between the selected test documents and each document of the set of learning documents; and a second user display for displaying a predetermined number of the learning documents of said set of learning documents that are the closest to the selected test documents.

Concept 42. The graphical user interface of concept 41, comprising a second user interface arranged for allowing a user to correct the set of learning documents by canceling from the set of learning documents any learning document displayed on the second user display; wherein the data recognition model is arranged for updating said data recognition model based on the corrected set of learning documents.

Concept 43. The graphical interface of concept 41, wherein each test and learning document is a text document; said calculator being arranged for transforming each text document of the test and learning documents sets into a vector of a n-dimensional manifold, n being an integer larger than 2; wherein a distance between a test document and a learning document according to said distance metric is a distance between the vectors in said n-dimensional manifold of said test document and learning document.

Concept 44. A graphical user interface comprising: a data interface arranged for receiving a first set of text documents; a calculator arranged for transforming each received text document into a vector of a n-dimensional manifold, n being an integer larger than 2; a first user display arranged for successively displaying each text document of the first set of text documents; a first user interface arranged for allowing a user to associate each displayed text document to a label selected by the user; the calculator being arranged to associate said label selected by the user to the n-dimensional manifold vector that corresponds to the displayed text document; and a data recognition model arranged for estimating a likelihood of any received n-dimensional manifold vector being associated with a label, the data recognition model being dynamically based on the associations made by said calculator between the labels selected by the user and the n-dimensional manifold vectors; the data recognition model being arranged to receive the n-dimensional manifold vector corresponding to each text document displayed on the first user display, and to output a likelihood of said received n-dimensional manifold vector being associated with each of the labels selected by the user; the first user display being further arranged for displaying, in addition to displaying each text document of the first set of text documents, at least some of the likelihoods output by the data recognition model for said text document.

Concept 45. The graphical user interface of concept 44, wherein said data interface is arranged for receiving a second set of text document; the graphical user interface further comprising a second user display arranged for successively displaying subsets of the second set of text documents; the calculator being arranged for transforming each text document of said displayed subsets into a vector of said n-dimensional manifold; and the data recognition model being arranged to receive the n-dimensional manifold vector corresponding to each text document of said displayed subsets and to output a likelihood of said received n-dimensional manifold vector being associated with each of the labels selected by the user; the second user display being arranged for displaying, in addition to displaying each text document of the subsets of the second set of text documents, at least some of the likelihoods output by the data recognition model for said text document.

Concept 46. The graphical user interface of concept 45, further comprising: a second user interface arranged for allowing the user to accept as valid or reject as invalid the likelihoods displayed on said second user display; the accepted likelihoods being considered as a label association to be used as a basis for the data recognition model.

Embodiments of this presentation also relate to methods corresponding to the above concepts.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 15 illustrates a GUI according to alternative embodiments of this presentation.

FIGS. 20, 21 and 22 illustrate a display of a GUI such as described in relation with

FIG. 7.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the claimed invention.

Figure 1:
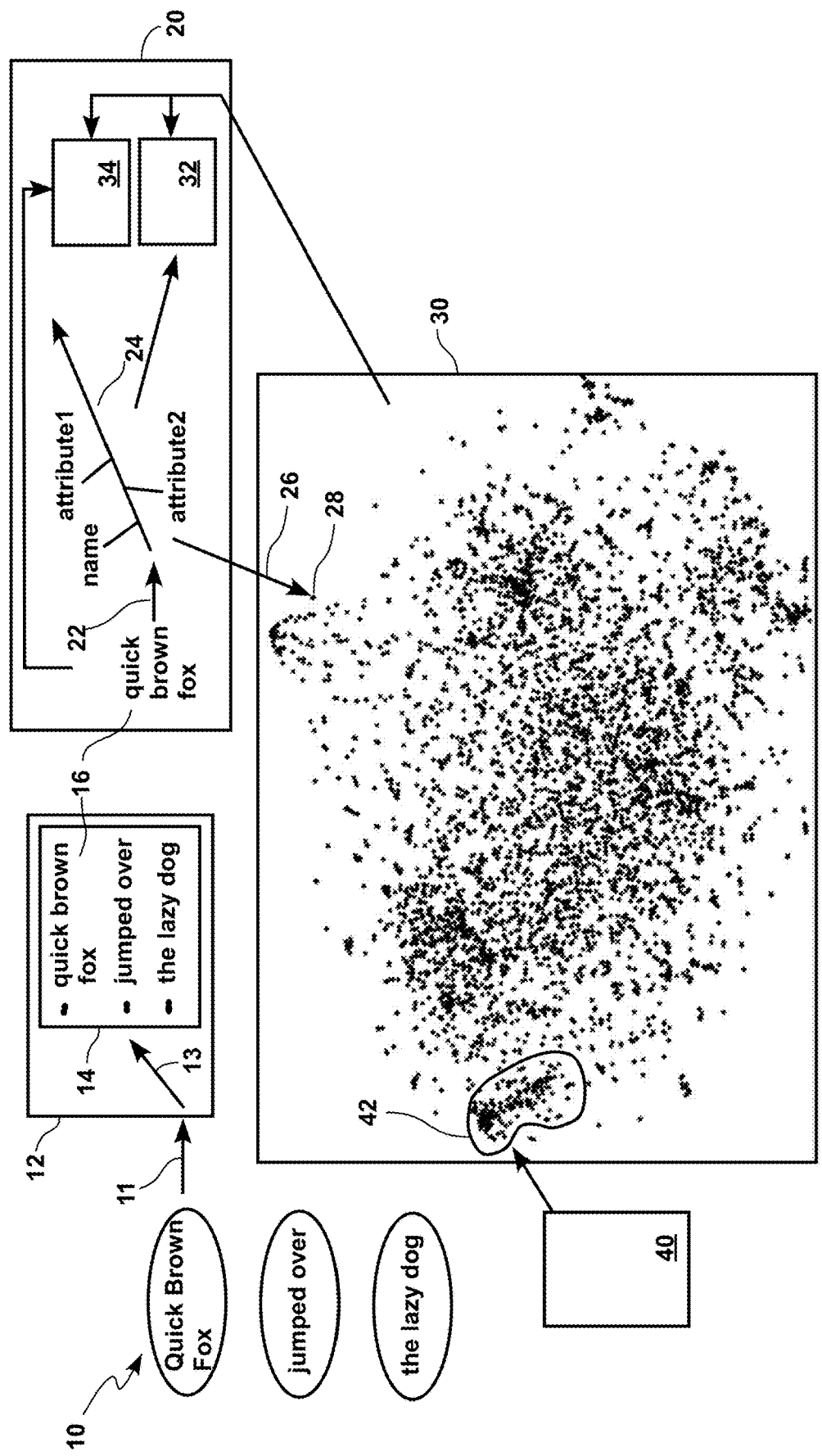
FIG. 1 illustrates a display displaying on a 2-D plane each of the data in the 2-D space generated by the calculator according to embodiments of this presentation.

FIG. 1 illustrates an embodiment of a graphical user interface (GUI) 10 according to embodiments of this presentation, which comprises a data interface 12 (for example an Optical Character Recognition function, a XML Parsing function, and a CSV Parsing function) arranged for receiving a set 14 of text documents 16. In this presentation, "receiving" a set of documents can mean imputing the set of documents under a first format, such as an audio or printed format, and transforming 13 and optionally storing the set of documents under a format comprising a sequence of electronically encoded words. Further, the GUI 10 comprises a calculator 20 arranged for: first, transforming 22 each text document 16 of the received set into a vector 24 of a n-dimensional manifold, n being an integer larger than 2; and then, transforming 26 each vector in said n-dimensional manifold into a data 28 in a 2-D space. In the illustrated example, the text document 16 "quick brown fox" is transformed into a vector 24 having for example a first value in a direction "name" of the n-dimensional manifold, a second value in a direction "attribute1" of the n-dimensional manifold and a third value in a direction "attribute2" of the n-dimensional manifold. Of note, the number of words in text document 16 does not necessarily correspond to the number of non-null values in vector 24. The GUI 10 further comprises a first user display 30 arranged for displaying each data 28 in said 2-D space on a 2-D plane.

Exemplary transformation of text documents into n-dimensional manifold vectors can for example be found in the references:

"Distributed Representations of Words and Phrases and their Compositionality", by Tomas Mikolov, Ilya Sutskever, Kai Chen, Greg Corrado, Jeffrey Dean (https://papers.nips.cc/paper/5021-distributed-representations-of-words-and-phrases-and-their-compositionality.pdf)

"GloVe: Global Vectors for Word Representation", by Jeffrey Pennington, Richard Socher, Christopher D. Manning; Computer Science Department, Stanford University, Stanford, Calif. 94305; (https://www.aclweb.org/anthology/D14-1162)

"BERT: Pre-training of Deep Bidirectional Transformers for Language Understanding", by Jacob Devlin, Ming-Wei Chang, Kenton Lee, Kristina Toutanova (https://arxiv.org/abs/1810.04805)

"Deep contextualized word representations", by Matthew E. Peters, Mark Neumann, Mohit Iyyer, Matt Gardner, Christopher Clark, Kenton Lee, Luke Zettlemoyer (https://arxiv.org/pdf/1802.05365.pdf)

According to embodiments of this presentation, calculator 20 is further provided for generating and storing: a first mapping 32 of what data 28 in said 2-D space corresponds to what vector 24 in said n-dimensional manifold; and a second mapping 34 of what data 28 in said 2-D space corresponds to what text document 16 of the received set.

According to an embodiment of this presentation, the GUI 10 also comprises a first user interface 40 arranged for allowing a user to select a subset 42 of the displayed data 28 in the 2-D space. User interface 40 can include a touch screen or a pointing device such as a mouse, for example allowing the user to lasso the displayed 2-D data 28 with a finger or pointer. According to an embodiment of this presentation the GUI 10 is arranged such that selecting said subset 42 of the data 28 in said 2-D space automatically selects the vectors 24 in the n-dimensional manifold that correspond to the subset of data 42 in said 2-D space (using mapping 32). In case the first user interface comprises a touch screen, the first user interface and the first user display can share a common screen.

Figure 2:
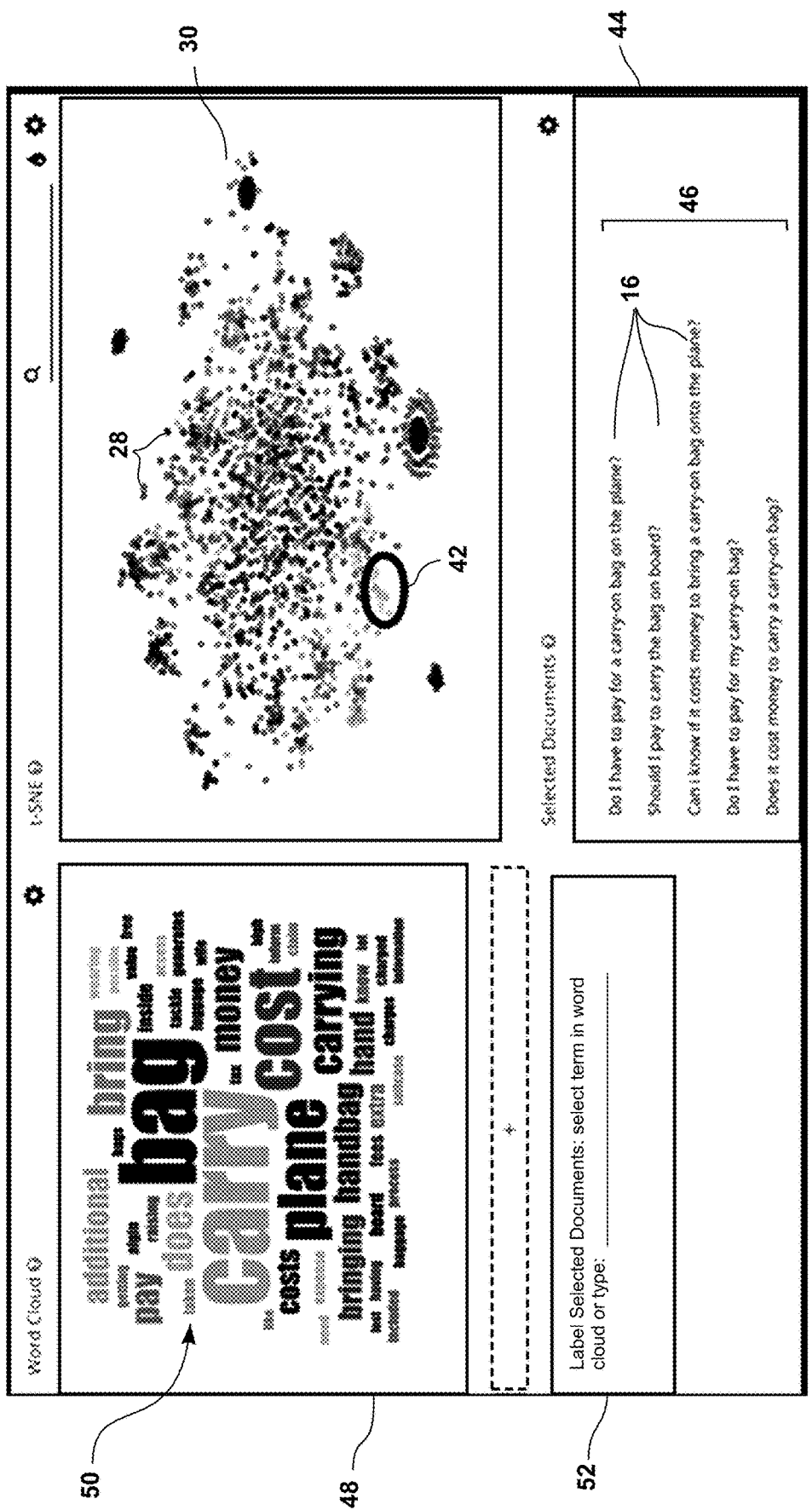
FIG. 2 illustrates a first display/interface displaying a set of 2-D data with a subset of data selected, and a second display displaying a list of the text document that correspond to the selected subset of data, according to embodiments of this presentation.

As illustrated in FIG. 2 and according to embodiments of this presentation, the GUI 10 comprises a second user display 44 arranged for displaying a list 46 of the text documents 16 that correspond to the subset of data 42 in the 2-D space. The second user display 44 can be arranged near the first user interface and/or near the first user display 30. FIG. 2 illustrates a first user display 30 displaying a set of 2-D data 28, wherein a subset 42 of 2-D data was selected (with a "lasso" like shape generated by the user interface 40); the first user display 30 arranged on a common screen above the second user display 44.

According to an embodiment, the second user display 44 can be arranged to display only a part of the list 46 of text documents 16, and to allow the user to scroll though the list.

As illustrated in FIG. 2 the GUI calculator 20 can be further arranged for calculating a first vector space model of the received set 14 of text documents 16; calculating a second vector space model of the text documents that correspond to said subset 42 of data in said 2-D space; and calculating a third vector space model equal to the difference between the first and second vector space models; wherein the GUI further comprises a third user display 48 for displaying a word cloud representation 50 of the third vector space model.

According to an embodiment, the GUI 10 can comprise a second user interface 52 arranged for allowing a user to associate the selected subset of displayed 2-D data to an "associated label". Such label can be selected from a predetermined set of labels or can be entered by the user. According to an embodiment, the label can be generated or selected by selecting a word displayed on the word cloud. According to an embodiment, associating the subset of selected 2-D data 42 to a label also automatically associates the label to all the vectors 24 in the n-dimensional manifold that correspond to the selected subset of 2-D data 42, for example using mapping 32.

According to embodiments of this presentation, the set of text documents associated to labels can also additionally be changed by receiving with interface 12 a plurality of text documents each already associated to a label. According to an embodiment, the calculator 20 is further arranged to filter out and not process anymore any received text documents that is associated to a label that is part of a predetermined set of labels that are to be filtered out.

According to an embodiment, the GUI calculator 20 can be further arranged to: train a label recognition model that uses the label associated to the selected 2-D data 42 and their corresponding vectors 24 in the n-dimensional manifold; and, using the trained label recognition model, estimate the likeliness of each text document 16 of the received set 14 of text documents being associated to said associated label. The GUI 10 can then be arranged to emphasize differently on the first user display 30 the 2-D data 28 that corresponds to a text document of said received set of text documents having different predetermined likeliness of being associated to said associated label.

Figure 3:
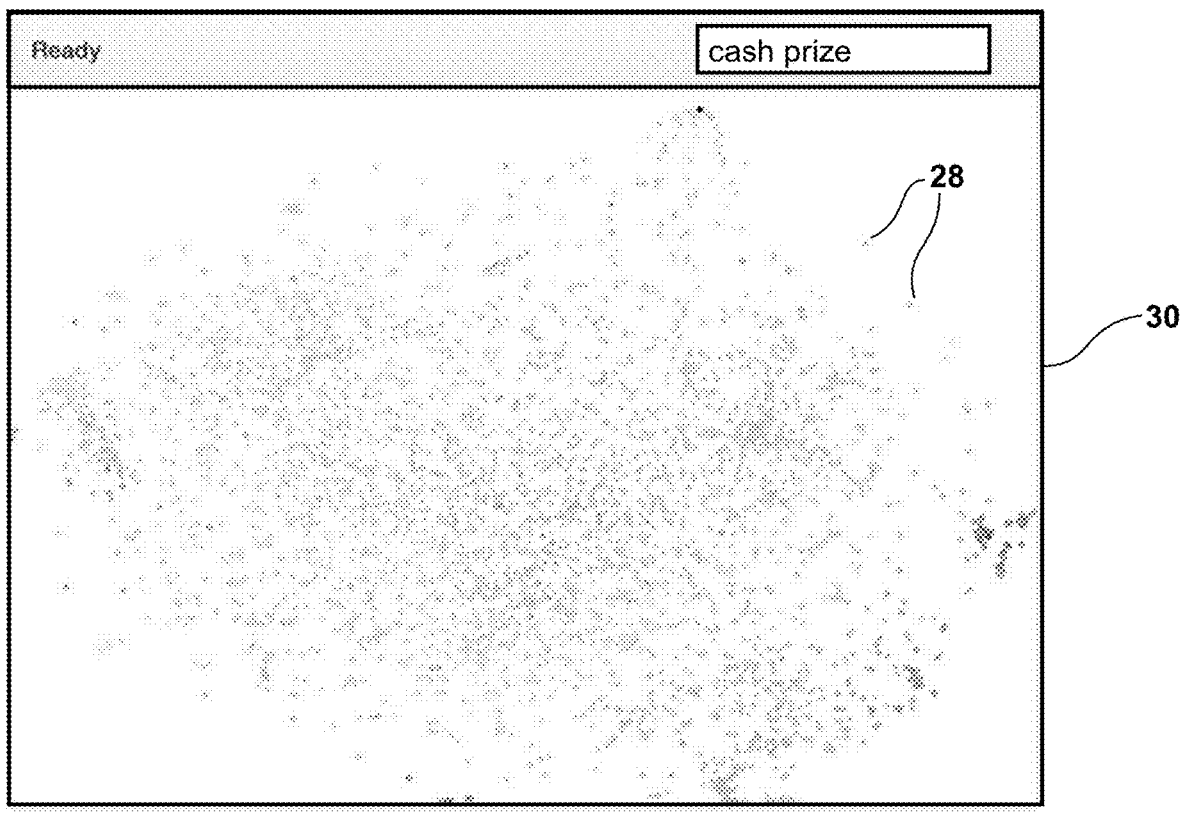
FIG. 3 illustrates a first display displaying a set of 2-D data, a first user interface query window and a highlighting of the 2-D data that corresponds to a query text, according to embodiments of this presentation.

FIG. 3 illustrates an embodiment of this presentation where the first display 30 displays in darker shades the points representing the 2-D data 28 that correspond to text documents 16 likely to be associated with a label 54; the shade of the points representing each 2-D data getting darker as the likelihood increases. Label 54 can be entered by the user with a user interface or it can be associated with a selected subset of 2-D data 42 (not shown in FIG. 3).

According to an embodiment, the different shades of grey used to indicate a value variation in a set of data (for example an increased likelihood of a text document 16 associated to a displayed 2-D data 28 of being associated with a given label 54) can be associated dynamically to groups of data of comparable sizes, even if this implies putting together small groups having similar likelihood or splitting large groups into smaller groups having similar likelihood. This allows to avoid assigning a shade of grey to a too large or a too small 2-D data groups that would make the display hard to read.

The inventors have discovered that a GUI 10 as detailed above allows a user to effortlessly and intuitively find a group of related text in a large group of text, attach a label to said group of related text, and find additional text related to said group. Such GUI can be useful to determine rapidly the theme and ratios by theme of a set of received text (e.g. user feedback for an air-travel company).

Figure 4:
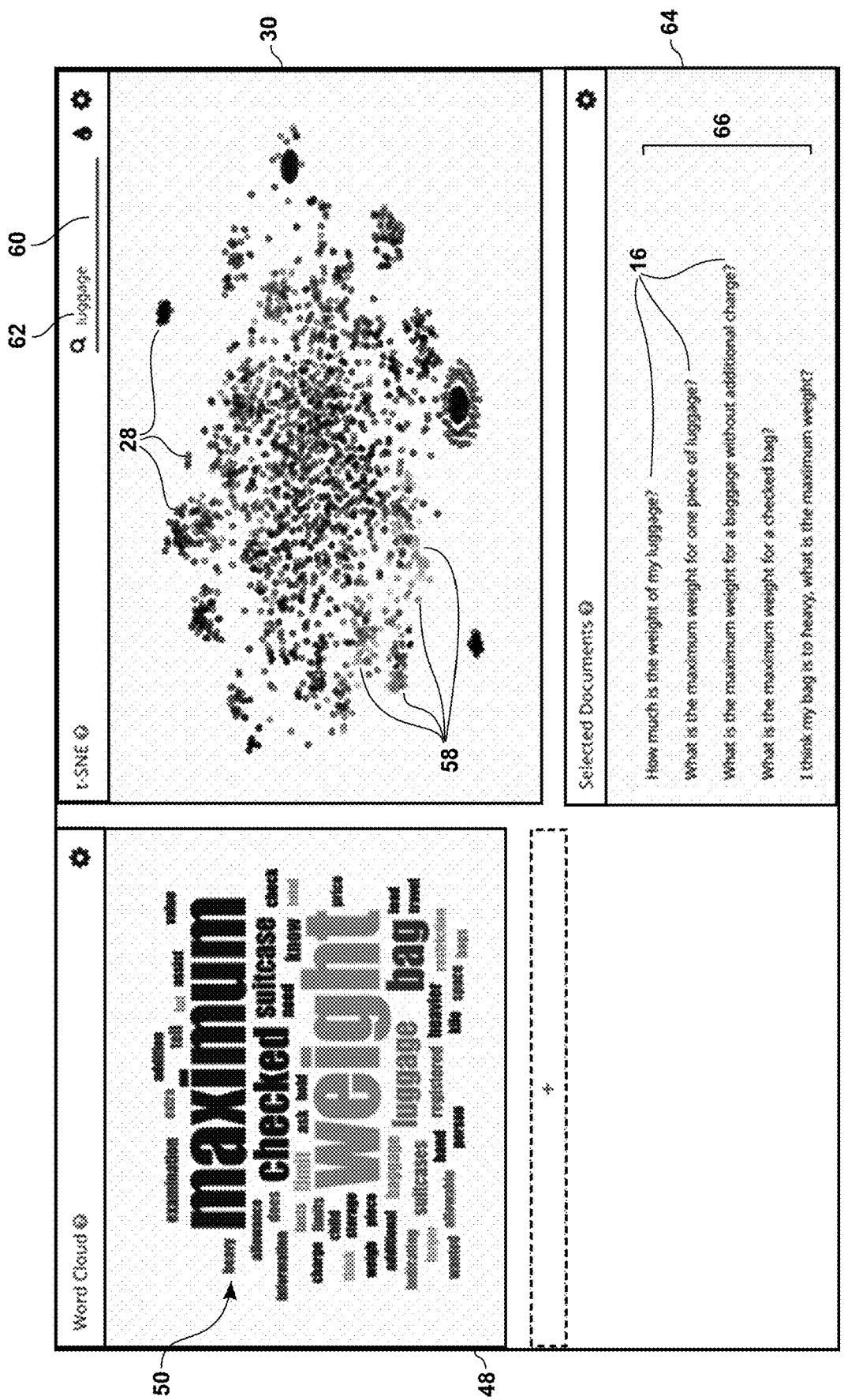
FIG. 4 illustrates a GUI according to embodiments of this presentation, where a first display displays 2-D data derived from a received text, and where the 2-D data corresponding to a query text are highlighted.

FIG. 4 illustrates another embodiment of this presentation that comprises, as the embodiment previously detailed and not shown in FIG. 4, a GUI 10 with a data interface 12 arranged for receiving a set 14 of text documents 16 and a calculator 20 arranged for transforming each text document 16 of the received set 14 into a vector 24 of a n-dimensional manifold; and each vector 24 in said n-dimensional manifold into a data 28 in a 2-D space; generating and storing the corresponding mappings 32, 34. The above features are for example identical to those illustrated in FIG. 1 and being not shown in FIG. 4. The GUI 10 of FIG. 4 is also provided for displaying the 2-D data 28 on a first user display 30.

According to this embodiment, the GUI 10 further comprises a first user interface 60 arranged for allowing a user to submit a query text 62; and the GUI calculator 20 is further arranged to transform said query text 62 into a vector (query vector, not shown) of said n-dimensional manifold; and use a distance metric to calculate a distance between the transformed query text vector and the vector 24 in said n-dimensional manifold of each text document 16 of the received set 14. The first user display 30 is then further arranged for highlighting each data 28 in said 2-D space as a function of the distance calculated for the n-dimensional manifold vector that corresponds to the data in 2-D space.

FIG. 4 illustrates the first display 30 displaying the 2-D data 28 (in the form of markers, or dots, having each an x and a y coordinate), first user interface window 60 where a query text ("luggage") was entered; and illustrates the highlighting as shadings of grey of the 2-D data 28 on the first display, the shading getting darker as a function of the distance between the n-dimensional manifold vector 24 that corresponds to the 2-D data 28 and the transformed query text vector.

According to an embodiment, instead of changing the shading of all the 2-D data as a function of their vector's distance from the query vector, the GUI calculator 20 can be arranged for generating (and displaying on display 30) a subset 58, of the 2-D data 28 that correspond to n-dimensional manifold vectors 24 having a calculated distance to the query vector that is below a predetermined threshold. The GUI 10 can then comprise a second user display 64 arranged for displaying a list 66 of the text documents 16 that correspond to said subset 58 of 2-D data.

FIG. 4 alternatively illustrates such a GUI 10, where display 30 displays the 2-D data 28 derived from the received text 14, and where a subset 58 of the 2-D data 28, corresponding to n-dimensional manifold vectors close to the query vector of query text "luggage" 62 (entered in a user interface "query" window 60), is highlighted in hues of gray that change as a function of the distance from the query vector.

According to embodiments of this presentation, the GUI calculator 20 can be arranged to: calculate a first vector space model of the received set 14 of text documents 16; calculate a second vector space model of the text documents that correspond to said the subset 58 of data in said 2-D space; and calculate a third vector space model equal to the difference between the first and second vector space models. The first, second and third vector space models can belong to a space having as many dimensions as the received set 14 of text documents 16 comprises different words. The GUI 10 can then comprise a third user display 48 for displaying a word cloud 50 representation of said third vector space model.

According to an embodiment, the GUI can additionally comprise a further user interface similar to the user interface 40 detailed previously, and arranged for allowing a user to select a subset 42 of the displayed 2-D data (for example by "lassoing" the 2-D data as outlined previously in relation to FIG. 2); wherein such selecting such a subset 42 of the 2-D data 28 automatically selects their corresponding vectors 24 in said n-dimensional manifold; a further user display 44 being arranged for displaying a list of the text document 16 that correspond to the selected subset 42 of 2-D data 28.

In such an embodiment, the GUI 10 can further comprise a further user interface 52 such as illustrated in FIG. 2, arranged for allowing the user to associate the selected subset 42 of 2-D data to a label (which can be chosen from a predetermined set of labels or entered by the user); wherein associating the selected subset 42 of 2-D data 28 to a label automatically associates the label to the vectors 24 in said n-dimensional manifold that correspond to all the 2-D data in the selected subset 42 of 2-D data.

In such an embodiment, the GUI calculator can be further arranged to train a label recognition model (for example run by calculator 20) using the selected label and the vectors in said n-dimensional manifold that correspond to the selected subset of 2-D data. The calculator 20 can then be arranged to use the label recognition model to estimate the likeliness of each received text document 16 being associated to said selected label; and emphasize differently on user display 30 the 2-D data that corresponds to a text document 16 of said received set 14 of text documents having different predetermined likeliness of being associated to the selected label. For example, the 2-D data on display 30 can be given a color that depends of the highest likeness of its corresponding text document being associated to a given label.

The inventors have discovered that a GUI as outlined above allows a user to effortlessly and intuitively find if any proportion of text in a large group of text is related or not to a label. Such GUI can also be useful to rapidly identify and label groups of theme-related texts in a large group of texts.

Figure 5:
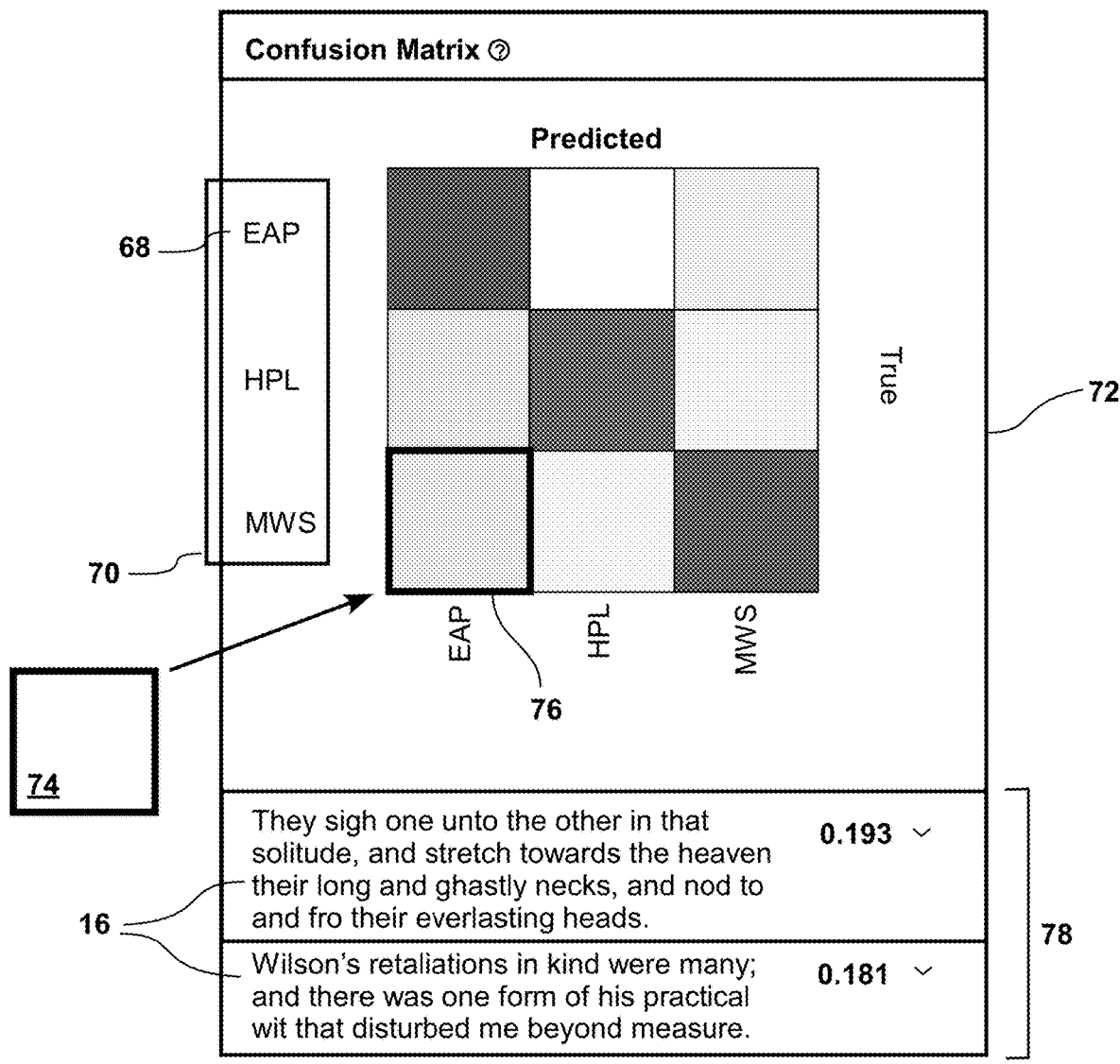
FIGS. 5 and 6 illustrate a GUI according to embodiments of this presentation, arranged for displaying discrepancies between estimated and known associated labels for test documents.

FIG. 5 illustrates other embodiments of this presentation, which comprise a GUI 10 having a data interface 12 arranged for receiving a set 14 of documents 16 such as described in relation with FIG. 1 (not illustrated in FIG. 4), where each document 16 is a test document that has a known association to one label 68 of a set of labels 70 (three labels illustrated). Further, the GUI 10 comprises a data recognition model (for example run in calculator 20) arranged for associating each test document 16 to an estimated label 68 of said set of labels 70; wherein the data recognition model is based on a set of learning documents 16' having each a known association to one label 68 of said set of labels 70. According to an embodiment of this disclosure, the GUI comprises a user display 72 arranged for displaying any discrepancy between the estimated and known associated labels for all the test documents. According to an embodiment of this presentation, user display 72 can be arranged to display said discrepancy as a confusion matrix as illustrated in FIG. 5.

The illustrated confusion matrix relates to a set of three labels 68 (EAP, HPL and MWS) and consequently comprises three columns (as many as there are labels) corresponding each to a predicted label and three rows (as many as there are labels) corresponding each to a known label. In the illustrated confusion matrix, each test document having the same known and estimated labels is displayed as a darkening of the matrix box at the intersection of the known and estimated label (on the diagonal of the matrix). Consistently, each test document having an estimated label different from its known label is displayed as a darkening of the matrix box at the intersection of the known and estimated label (below the diagonal of the matrix). One confusion matrix can be displayed successively for each test document or a single confusion matrix can be displayed and its boxes darkened successively in relation to each test document processed.

Other embodiments not using a confusion matrix can also be implemented, for example using error display schemes such as illustrated hereafter.

According to an embodiment, the GUI comprises a user interface 74 (such as a mouse, a touch screen) arranged to allow a user to select any test document or group of test documents corresponding to a box 76 of the matrix showing discrepancy between the estimated and known associated labels, for example by selecting (e.g. clicking, or touching on a touch-screen) the box 76 of the confusion matrix. The selected test documents can then be displayed on a further display 78. The GUI calculator 20 can then be arranged to calculate a distance between the test documents 16 corresponding to the selected box 76 and each document of the set of learning documents 16'; and the GUI can be provided to determine the learning documents 16' of said set of learning documents that are the closest to the selected test documents

16. The closest learning documents can be determined by looking at all the learning documents 16' within a distance of the selected test document 16, said distance being increased until a predetermined number of the learning documents 16' is identified.

Figure 6:
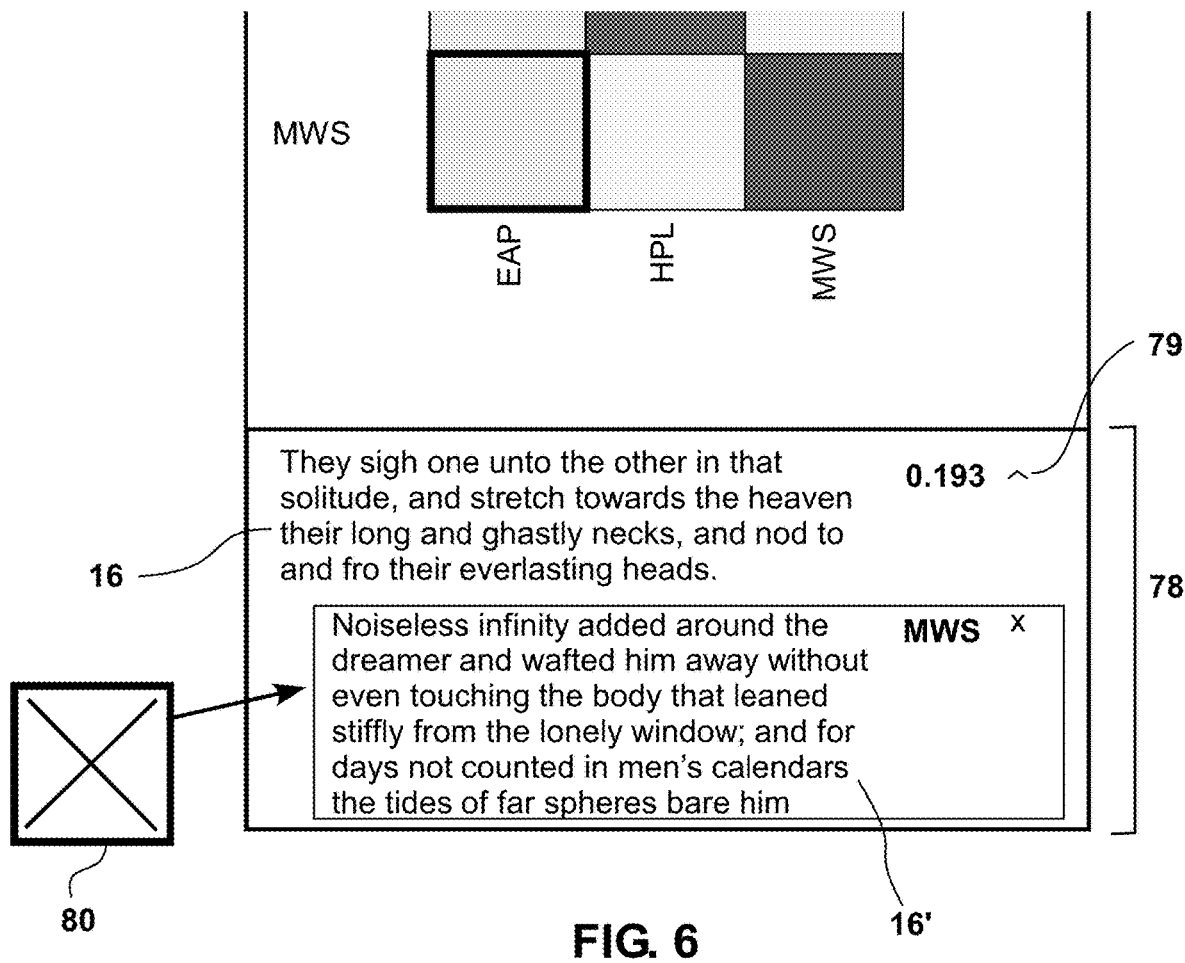

FIG. 6 illustrates embodiments of this presentation where the GUI is provided for additionally displaying on display 78 the learning document 16' that has been determined to be the closest to a displayed selected test document 16. Displaying the learning document 16' can be automatic or it can be triggered by the user clicking on or otherwise interacting with one of the selected test documents 16 displayed on display 78.

The inventors have noted that a problem with data recognition models often derives from the accidental use of mistaken learning documents. A GUI according to the embodiments illustrated above allows feeding test documents to a trained recognition model, visualizing immediately (with display 72) an error made by the recognition model on the test documents, and visualizing immediately (with display 78) the training document that is closest to the mis-recognized test document, thus allowing a user to locate rapidly mistaken training documents.

According to an embodiment, the GUI can comprise a further user interface 80 arranged for allowing a user to correct the set of learning documents, for example by selecting and canceling from the set of learning documents any learning document 16' displayed on the user display 78.

According to an embodiment, the GUI 10 can then be arranged to update the data recognition model (for example run in calculator 20) based on the corrected set of learning documents 16', and eventually display any remaining discrepancy between the estimated and known associated labels for all the test documents, allowing the user to repeat the operations above until no discrepancies are found between the estimated and known associated labels for all the test documents.

According to an embodiment, each of the test documents 16 and learning documents 16' are text documents; and the GUI calculator 20 is arranged for transforming each text document of the test and learning documents sets into a vector of a n-dimensional manifold, n being an integer larger than 2; wherein the distance between a test document and a learning document is the distance between the vectors in said n-dimensional manifold of said test document and learning document.

Figure 7:
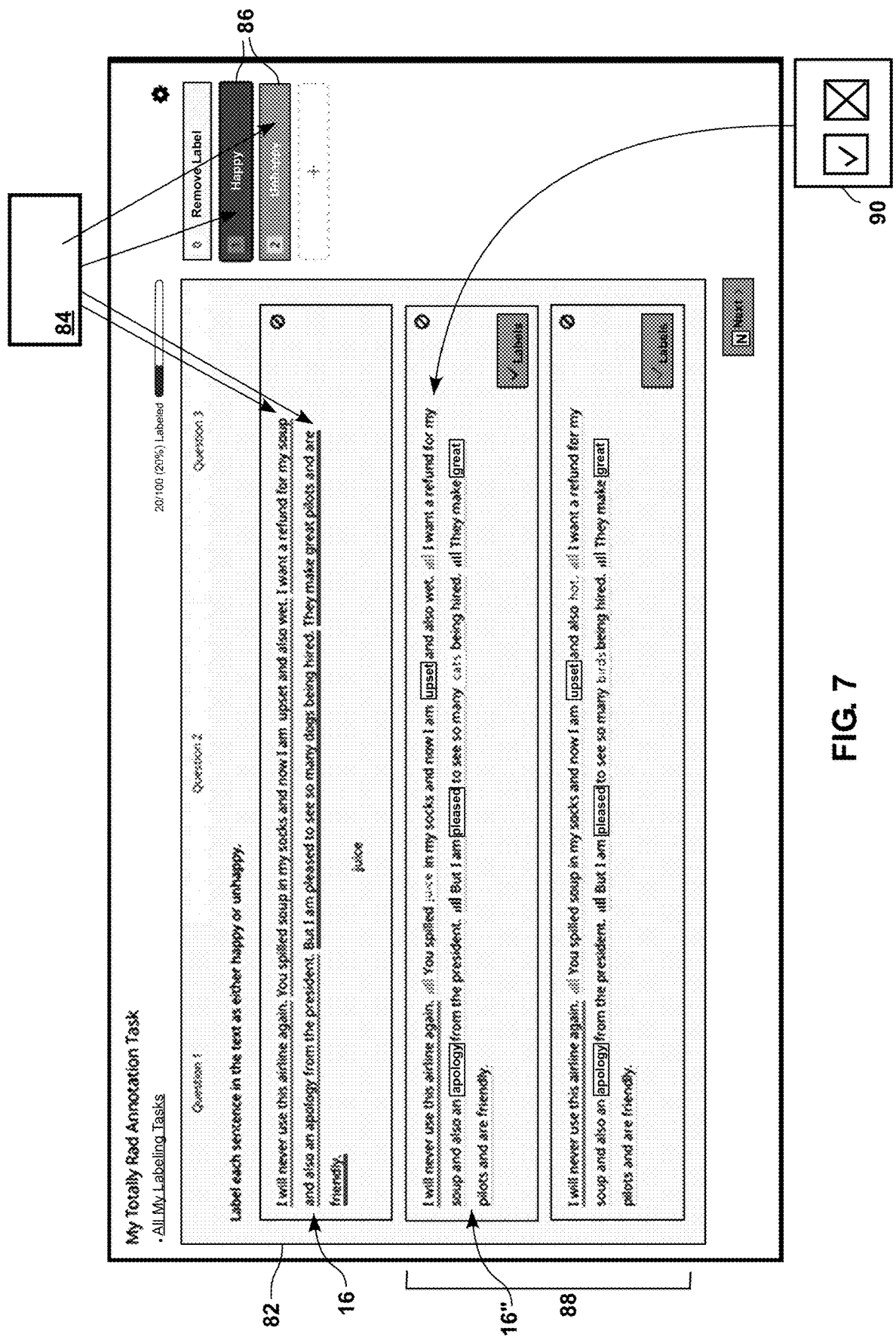
FIG. 7 illustrates a GUI 10 according to another embodiment of this presentation.

FIG. 7 illustrates a GUI 10 according to another embodiment of this presentation, having a data interface 12 arranged for receiving a first set 14 of text documents 16; and a calculator 20 arranged for transforming each received text document into a vector 24 of a n-dimensional manifold, n being an integer larger than 2; such as detailed in relation with FIG. 1. According to this embodiment, GUI 10 can alternatively or additionally comprise a first user display 82 arranged for, controllably, successively displaying each text document 16 of the first set 14 of text documents; and a first user interface 84 arranged for allowing a user to associate each displayed text document 16 to a label 86 selected by the user. FIG. 7 illustrates the display 82 of GUI 10 that displays a received text 16, and the result of a user selecting (e.g. using a mouse or a touch screen user interface) at least portions of the displayed text 16, then associating the selected text portion to one label 86 (e.g. from a list of labels displayed on the right portion of the figure).

According to an embodiment, the GUI calculator 20 can be arranged to make an association between the label 86 selected by the user and the n-dimensional manifold vector 24 that corresponds to the displayed text document 16 (or alternatively to a vector 24 that corresponds to the selected portion of text, calculated after selection of said portion of the text). Further, the GUI 10 can comprise a data recognition model (for example run in the calculator 20) arranged for estimating a likelihood of any received n-dimensional manifold vector being associated with a label, the data recognition model being dynamically based on said associations made by calculator 20 between the labels 86 selected by the user and the corresponding n-dimensional manifold vectors 24.

As outlined previously, FIG. 7 illustrates the GUI 10 being arranged to provide feedback to the user by underlining the selected text document 16 or portion of text document 16, for example with a line colored in the same way as a box containing the label 86 to which the user has associated the selected text.

According to embodiments of this presentation, GUI 10 can further be arranged for receiving a second set of text documents 16". The first and second set of text documents can for example be arbitrarily separated portions of a unique set 14 of received text documents 16. The GUI 10 then comprises a second user display 88 arranged for successively displaying subsets of the second set of text documents 16" (for example a controllable number of text documents 16"); the calculator 20 being arranged for transforming each text document 16" (the text document being the entirety of a received text document 16" or a portion of said text document 16" identified by a marker such as a sentence between punctuation marks) of said displayed subsets into a vector 24 of said n-dimensional manifold; and the data recognition model being arranged to receive the n-dimensional manifold vector 24 corresponding to each text document of said displayed subsets and to output a likelihood of said received n-dimensional manifold vector 24 being associated with each of the labels 86 selected by the user.

FIG. 7 illustrates the second user display 88 displaying a text document 16" of the subsets of the second set of text documents, and displaying a likelihood of sentences in the displayed text being associated to one of the two labels 86 selected in the figure. According to an embodiment and as illustrated, the GUI 10 can display that a sentence is most likely to be associated with a label by underlining the sentence with a color arbitrarily or controllably associated to that label. As the likelihood increases the color of the underlining can become more vivid and as the likelihood decreases the color can become less vivid.

Alternatively or in addition, the display 88 can display a little "reception bar" or scale diagram of color at the end of each sentence of the text, having a number of colored bars indicating the likelihood of the sentence being associated to the label identified by the color.

According to an embodiment of this presentation, the GUI 10 can comprise a further user interface 90 arranged for allowing the user to accept as valid or reject as invalid the likelihoods displayed on user display 88; the accepted likelihoods being considered as a label association to be used as a basis for the data recognition model.

The inventors have noted that a GUI 10 according to the above embodiment allows training rapidly a data recognition model, by allowing a user to spot immediately recognition errors and update the recognition model accordingly.

Details about the above embodiments as well as further embodiments of the present disclosure are disclosed hereafter.

Figure 8:
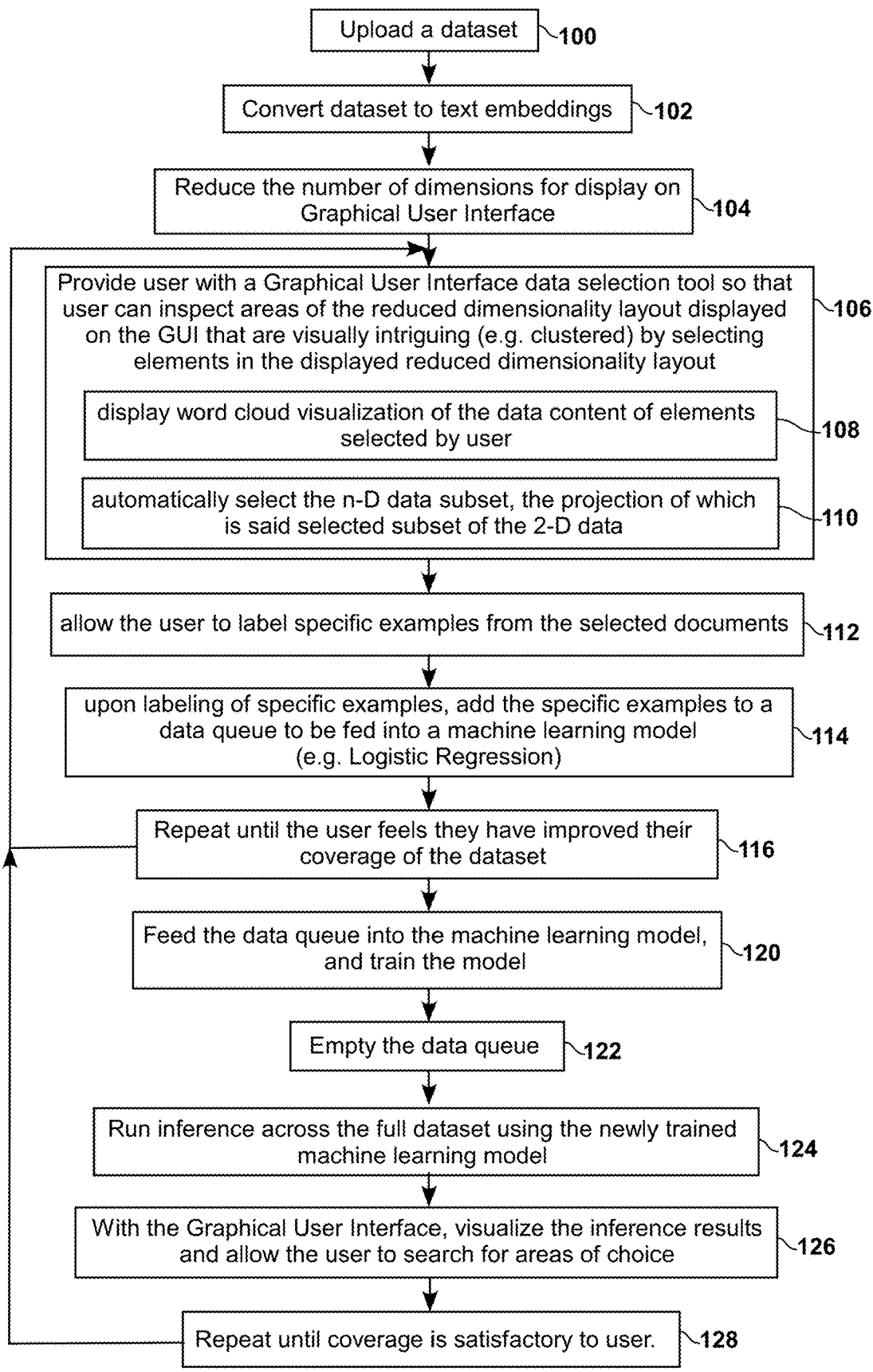
FIG. 8 illustrates a method of operating a GUI according to embodiments of this presentation.

FIG. 8 illustrates a method of operating a GUI according to embodiments of this presentation, which allow understanding the impact of various structural aspects in a dataset's implicit structure (born of text embeddings). Rather than a unknown-unknown problem, a GUI-implemented method according to embodiments of this presentation allows the resolution of known-unknown problems ("I know this is a problem, I just don't know what's causing it").

A first step in the method is to decide upon a Graphical User Interface overlay—which may be either an existing structured data field (customer satisfaction, account value, etc. . . . ), an extrinsic property of the document separated from the document's implicit structure (e.g. sentiment), or an extrinsic property of the document that is directly linked to the document's implicit structure (fuzzy search as an overlay).

Once identifying intriguing areas of overlap and correlation between the document's implicit structure and the overlays discussed above, the user is capable of immediately understanding the high-level overview of a particular skew of the document (word cloud visualization of a cluster). These insights may be used downstream in a number of processes ranging from qualitative product understanding that fuels development to appropriately assigning Customer Service Representatives to the tasks which they are best suited to address.

Embodiments of this presentation comprise interplay of the implicit structure of the document, and the extrinsic external variables. Typically these would be viewed in isolation of each other: Either the implicit structure of the documents would be thrown away and mapped to a set of extrinsic variables (tf-idf for customer satisfaction prediction, or more traditional churn analysis), or the existing extrinsic variables would be thrown away in favor of a pure analysis of the implicit structure of the documents (theme analysis). Embodiments of this presentation use a nonlinear dimensionality reduction technique on top of pre-trained embeddings to drive and refine a data-driven taxonomy.

Typically, when one uses a nonlinear dimensionality reduction technique for visualization of embeddings, it is done as a test of those embeddings and the structure displayed is compared against an already-known set of classes to check for alignment. If the structure aligns with the known-classes then the combinations of embeddings and dimensionality reduction are determined to work well. If the structure does not align then they are determined to not work well.

Embodiments of this presentation instead do not question the efficacy of the embeddings or the efficacy of the dimensionality layout technique. Embodiments of this presentation use the combination of these to drive suggested classifications of the source dataset, letting a user develop a data-driven taxonomy. This ensures that any machine-learning model created on top of this taxonomy will be effective.

Correspondingly, the model introspection process changes entirely. The typical use of such a visual is to overlay "true" class labels and visually examine the separation of these class labels. If the visual separation of class labels is poor then the embedding algorithm and/or the dimensionality reduction algorithm is/are changed. Instead in embodiments of this presentation the embedding algorithm and the dimensionality reduction algorithm both stay static. Further, as classes are identified within the reduced dimensionality layout displayed on the display of GUI, predictions of an associated machine learning model can be used as an overlay on the GUI display. As a result, poor performance is indicated by areas of mixed classifications on the reduced dimensionality (e.g. 2-D) layout displayed on the GUI. Poor performance is remedied by adding additional training examples or adding entirely new classes as dictated by the data.

Embodiments of this presentation relate to a method of operating a GUI comprising the following operations: Upload 100 a dataset (a set of documents such as the set 14 described previously); Convert 102 the dataset 14 (set of documents) to text embedding n-D vectors 24 (e.g. each document may comprise words and each document in text embedding form represents a data or vector in an n-dimensions space, where n is larger than 2); and use a calculator with a dimensionality reduction algorithm (e.g. tsne) on the above text embedding n-D vectors 24 (or "n-D data" in the figure) to reduce 104 the number of dimensions to (e.g.) 2 for display on a display 30 of Graphical User Interface 10. Each data 28 of the set of 2-D data is for example displayed as a point having x and y coordinates on a plane displayed on user display 30, as illustrated in FIG. 1.

A GUI according to embodiments of this presentation can be implemented on a known computer or it can be a dedicated electronic apparatus, constructed for example using ASICs for doing the calculations, combined with off-the shelf interfaces such as display screens, keyboard, touchpads, touch-sensitive screens and mouse apparatuses.

According to embodiments of this presentation, the method further comprises providing 106 a user with a Graphical User Interface data selection tool, so that the user can inspect areas of the reduced dimensionality (i.e 2-D) layout displayed on the GUI that are visually intriguing to the user (e.g. clustered). According to embodiments of this presentation, areas of neighboring points in the 2-D plane correspond to sets of documents that are somehow thematically linked. As outlined in relation with FIG. 1, the GUI 10 can be provided with an interface 40 for selecting elements 28 in the displayed reduced dimensionality layout by clicking on the elements or by lassoing the elements with a perimeter drafted on the display.

According to embodiments of this presentation, the GUI 10 can be provided to display 108 a word cloud visualization of the data content of the elements 28 selected on the GUI. According to an embodiment of this presentation, when a user selects a subset of the displayed set of 2-D data 28, the GUI automatically selects 110 a subset of n-D vectors 24, the projection of which is said selected subset of the 2-D data 28.

According to embodiments of this presentation, the GUI can optionally allow the user to zoom-in or zoom-out (not illustrated) the 2-D data 28 displayed. According to an embodiment of this presentation, the GUI user interface 40 can use a touch screen, where the user defines with a finger or a dedicated pen a selected set of 2-D data, a mouse or joystick controlled cursor allowing a user to circle on the screen the selected set of 2-D data; etc. . . . .

According to embodiments of this presentation, the method further comprises, with the GUI 10, allowing 112 the user to label specific examples from the selected documents; and when the user does so, add 114 the specific example and its associated label to a data queue that will eventually be fed into a machine learning model (e.g. Logistic Regression) that can for example be run in the calculator 20 of the GUI. According to embodiments of this presentation, the method further comprises, repeating 116 the operations 106 to 114 until the user decides so, for example then the user feels that the coverage of the dataset was improved significantly.

According to embodiments of this presentation, the method further comprises, then feeding 120 the data queue into the machine learning model, and training the model. According to embodiments of this presentation, the method further comprises emptying 122 the data queue; then running inference 124 across the full dataset 14 using the newly trained machine learning model; and visualizing 126 the inference results by for example coloring the original reduced dimensionality layout/chart of 2-D data 28 as for example illustrated in FIG. 2. The GUI can then allow the user to search for areas that are visually intriguing based not only on the chart's structure, but now based on the coloring of the 2-D data across the dataset and repeat 128 operations 106 to 126 as long as desired by the user, for example until the user believes that the dataset coverage is sufficient.

As outlined previously, the GUI can be arranged to display 108 a word cloud visualization of the data content of the elements 28 selected on the GUI. According to embodiments of this presentation, that can involve displaying a predetermined number of the most frequent n-D vectors in the selected n-D data subset, the size of the words displayed increasing with their frequency of occurrence.

According to embodiments of this presentation, the GUI 10 can also be arranged for additionally displaying, for example in the display 44 disclosed in relation with FIG. 2, a list of all the text 16 corresponding to the n-D vectors 24 that correspond to the 2-D data 28 selected on the 2-D display at 110. Such displaying advantageously helps a user determining the label the user will want to associate to the data selected on the display.

Figure 9:
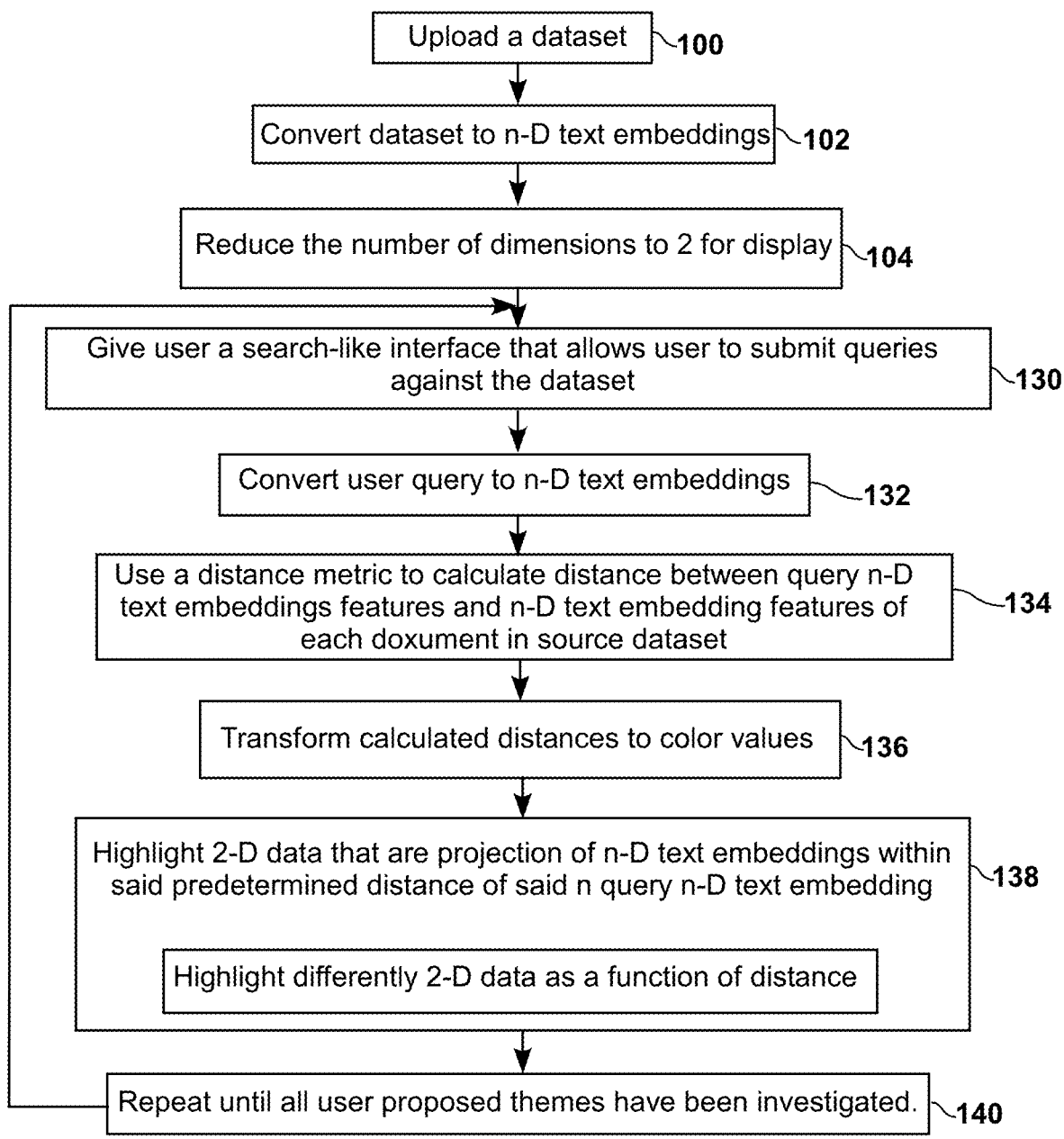
FIG. 9 illustrates a method of operating a GUI according to embodiments of this presentation.

FIG. 9 illustrates a method of operating a GUI according to embodiments of this presentation, which allow iteratively discovering unknown-unknowns through display of implicit corpus topology and model introspection. These embodiments allow imputing text, converting it into word embeddings, visualizing the implicit structure of that data via a dimensionality reduction algorithm, then allow the user to label the data in-view, and see the coloring of the structure update to display which areas are clear and which are ambiguous. Dimensionality reduction algorithm and text embeddings are known. Text investigation is currently done statically, typically using static visualizations of embedding performance to refine the analysis model used.

Embodiments of this presentation combine such known features to refine the problem rather than refining the model. Additionally, embodiments of this presentation use an iterative process rather than a point process by encouraging the user to examine and re-categorize data runs, counter to typical machine learning workflows. The inventors have noted that if such point processes were used to refine the model rather than the problem refining, one could introduce test/train contamination.

Further, typical theme extraction methods are keyword-based and lack any kind of user interaction in refining the method of theme extraction. Embodiments of this presentation treat themes as a drastically more flexible concept that is no longer driven by keyword and strict cluster hierarchies, but instead can be flexibly adapted to a given user's desires and the problem definition at hand. At a basic level, even the ability to define a flexible theme hierarchy, enabled by embodiments of this presentation, is novel.

Embodiments of this presentation relate to a system for flexible user-defined theme analysis. Such system for example differs from known approaches as follows: Standard approaches for theme analysis include but are not limited to Latent Dirichlet Allocation (LDA), Latent Semantic Analysis (LSA), and Pachinko Allocation. In each of these cases "themes" are automatically derived from summary statistics. The "themes" returned also take the form of weights on keywords. The user has no control over exactly what is returned, and the returned "themes" represented by a combination of keywords and weights are often uninterpretable.

More specifically, standard topic modeling consists of some matrix factorization technique (for instance: singular value decomposition) on top of a term-document matrix. This is coupled with a very fundamental assumption about language known as the distributional hypothesis—that both connotative and denotative meanings of a word can be gleaned solely through the context which appears around that word. This construction fundamentally does not allow for user input in the creation or recognition of "themes".

As illustrated in FIG. 9, an embodiment of this presentation relates to a method comprising: uploading 100 a dataset, converting 102 the dataset to text embeddings (e.g. fasttext; the above amounting to receiving a set of n-D data) and using a dimensionality reduction algorithm (e.g. tsne manifold layout algorithm) on the text embeddings to reduce 104 the number of dimensions to 2 for display.

Further, the method comprises giving 130 the user a search-like tool 60 that allows the user to submit queries 62 against the dataset (e.g. entering a n-D vector); then when the user submits a query, use a backend service to convert 132 the query into the same text embeddings used in Step 102. According to an embodiment of this presentation, steps 130 and 132 amount to providing a first user interface arranged for allowing a user to enter a n-D vector/query.

The method further comprises using 134 a distance metric effective for the text embedding manifold (e.g. cosine distance) to get a score of how similar the features of query 62 are to each document 16 in the source dataset 14. According to an embodiment of this presentation, step 134 amounts to determining which n-D data of the set of n-D data are within a predetermined distance of said n-D vector.

The method further comprises, once the distances have been computed—transforming 136 these distances to color values using a dedicated algorithm, for example such as detailed hereafter. According to an embodiment of this presentation, step 136 amounts to highlighting the 2-D data 28 that are the projection of said n-D data within said predetermined distance of said n-D vector.

The method further comprises, applying 138 the color values from the algorithm to the display, and let the user appraise the displayed result for the chosen theme/query. According to an embodiment of this presentation, operation 138 amounts to highlighting differently said 2-D data that are the projection of said n-D data within said predetermined distance of said n-D vector, depending on the distance between said n-D data and said n-D vector. The method then comprises repeating 140 operations 130 to 138 until all user-proposed themes have been investigated.

Embodiments of this presentation comprise a method that can use the following algorithm for defining the color hue to be displayed as a function of the distance with respect to the searched vector:

Input: A real-valued vector where index i represents the distance between the user's query vector and the text embedding for document i.

Hyperparameters: a: Controls the amount of differentiation to introduce between the best and worst hits. Higher numbers lead to tighter display of clusters and clearer visual distinctions between related and unrelated documents. (Technically valid range: 0 to infinity; preferred range: 0.2 to 5; preferred value: 3); K: Controls the threshold for indicating similarity between the search query and a source document. Higher values will limit the display to only the most relevant documents, while lower values will lead to easier identification of similar "neighborhoods". A value that is too high will result in a very "jumpy" visualization where similar search terms may result in completely different colorations. A value that is too low will result in a very "fuzzy" visualization where it may be impossible to accurately identify relevant neighborhoods. (Technically valid range: 0 to 1; preferred range: 0.25 to 0.75; preferred value: 0.5)

```
def algorithm_1(distance_vector, alpha, kappa)
  def norm(input_vector, alpha):
    bottom=min(input_vector)
    delta=max(input_vector)-bottom
    input_vector-=bottom
    input_vector*=1/delta
    return (input_vector**alpha)
  def color_scale(base_color, neutral_color, hit_color, kappa):
    channels=len(base_color)
    def interp_func(index):
      return interpolate(
        [0, kappa, 1],
        [base_color[index], neutral_color[index], hit_color[index]],
        kind="linear"
      )
    interp_funcs={i: interp_func(i) for i in range(channels)}
    def full_interp(values):
      colors=[ ]
      for value in values:
        colors.append([interp_funcs[i](value) for i in range(channels)])
      return colors
    return full_interp
  scale=color_scale([0,0,0], [100, 100, 100], [255, 0, 0], kappa)
  colors=norm(distance_vector, alpha)
  return scale(colors)
```

Embodiments of this presentation postulate that distributional semantics only "suggest" themes, and that a true determination of themes must be performed via a combination of user input and statistical analysis. As illustrated in FIG. 9, a method according to such embodiments begin similar to the method illustrated in FIG. 8, with a GUI 10 implementing operations of input of text (100), conversion (102) to n-D, and conversion to 2-D for visualization (104) that lays out a topological view of the n-D data by using text embeddings. The method then allows a user to "suggest" themes through a search-like interface such as illustrated in FIG. 3. Then a specialized overlay algorithm, for example run in the calculator 20 of the GUI 10, is used to help the user identify "hot spots" where their suggested topic has been found in the source data.

In other words, the suggested theme can be entered in a search-like interface such as a query window. In embodiments of this presentation, the suggested theme can be viewed as a query n-D vector or data (e.g. corresponding to a query sentence or document of one or more words), and an embodiment of this presentation can comprise the calculator 20 being arranged for determining which n-D data associated to the set of input documents are within a predetermined distance of said n-D vector; the user interface 30 being arranged for highlighting the 2-D data that are the projection of said n-D data within said predetermined distance of said n-D vector, as for example detailed in relation to FIG. 3.

It is noted that according to embodiments of this presentation, user interface 30 can be arranged for highlighting differently the highlighted displayed 2-D data 28 (the projections of the n-D vectors 24 that are within the predetermined distance of the query n-D vector) as a function of the distance between said n-D vectors 24 and said n-D query vector. In FIG. 3, all data within the predetermined distance from the query are marked in grey, but the closer the data is, the darker the grey is.

According to embodiments of this presentation, the variation of the highlighting (e.g. the color variation) can be weighted so that a maximum contrast exists between the distances effectively illustrated. This can be achieved by displaying a different hue only for any distance effectively illustrated, and by distinguishing as much as possible the different hues displayed (for example by making the displayed hue proportional to a power of the distance displayed).

Figure 10:
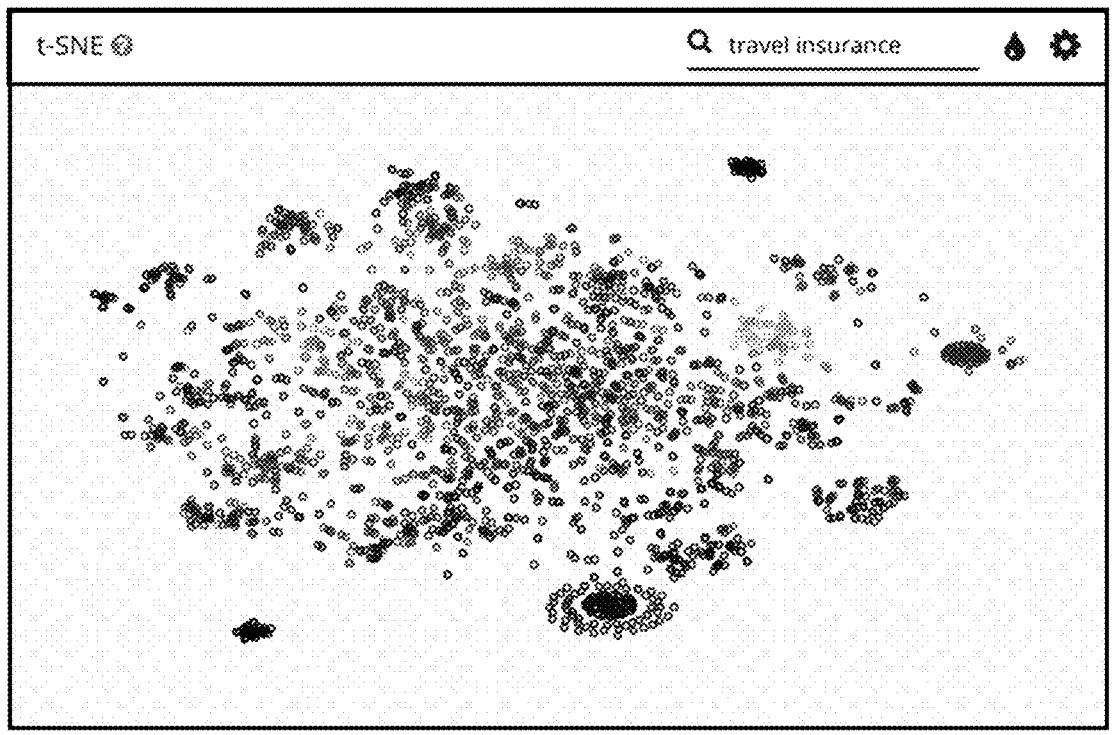
FIGS. 10 and 11 illustrate the 2-D data associated to different query terms according to embodiments of this presentation.

FIG. 10 illustrates for example that the queried theme "travel insurance" is associated to a large amount of data.

Figure 11:
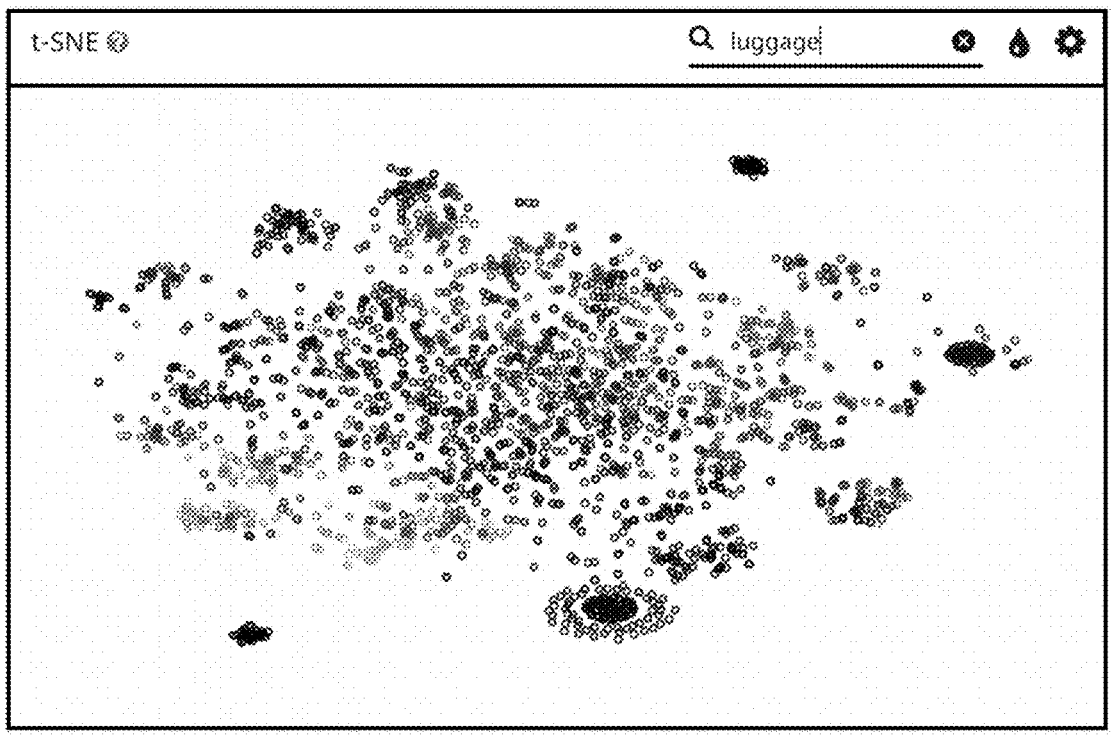

FIG. 11 illustrates for example that the queried theme "luggage" is associated to a large amount of data comprising three distinct variations illustrated by three distinct clusters in the lower left-hand corner.

Embodiments of this presentation can additionally comprise a selection user interface such as 40 as detailed previously in relation with FIG. 2, arranged for allowing a user to "lasso" or select a subset of the displayed set of 2-D data 28; wherein selecting said subset of the 2-D data automatically selects a subset of n-D vectors 24, the projection of which is the selected subset of the 2-D data. As also illustrated in FIG. 2, the GUI can be further arranged for displaying a predetermined number of the most frequent n-D vectors in the selected n-D data subset, for example by displaying a "word cloud" where the size of the word displayed is proportional to the number of occurrence of the word in the selected group of data.

Figure 12:
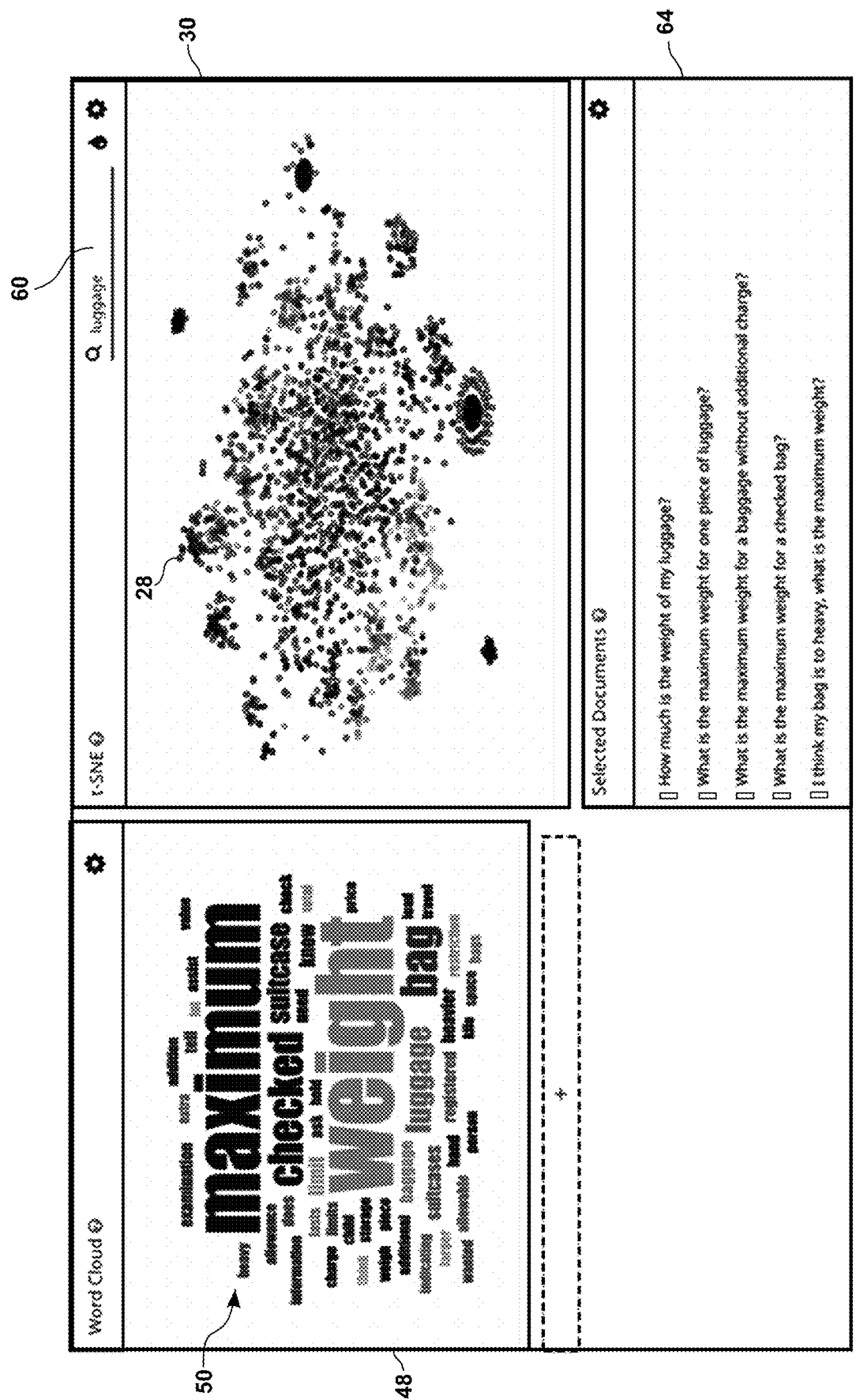
FIGS. 12 and 13 illustrate a GUI display according to embodiments of this presentation.

FIG. 12 illustrates a GUI display such as in FIG. 2, after a user enters the query "luggage" in interface 60, thus selecting all the 2-D data 28 within a predetermined distance of the query vector, wherein display 30 displays in different gray tones the highlighted selected 2-D data, and wherein display 48 displays a word cloud 50 that corresponds to the selected data.

Figure 13:
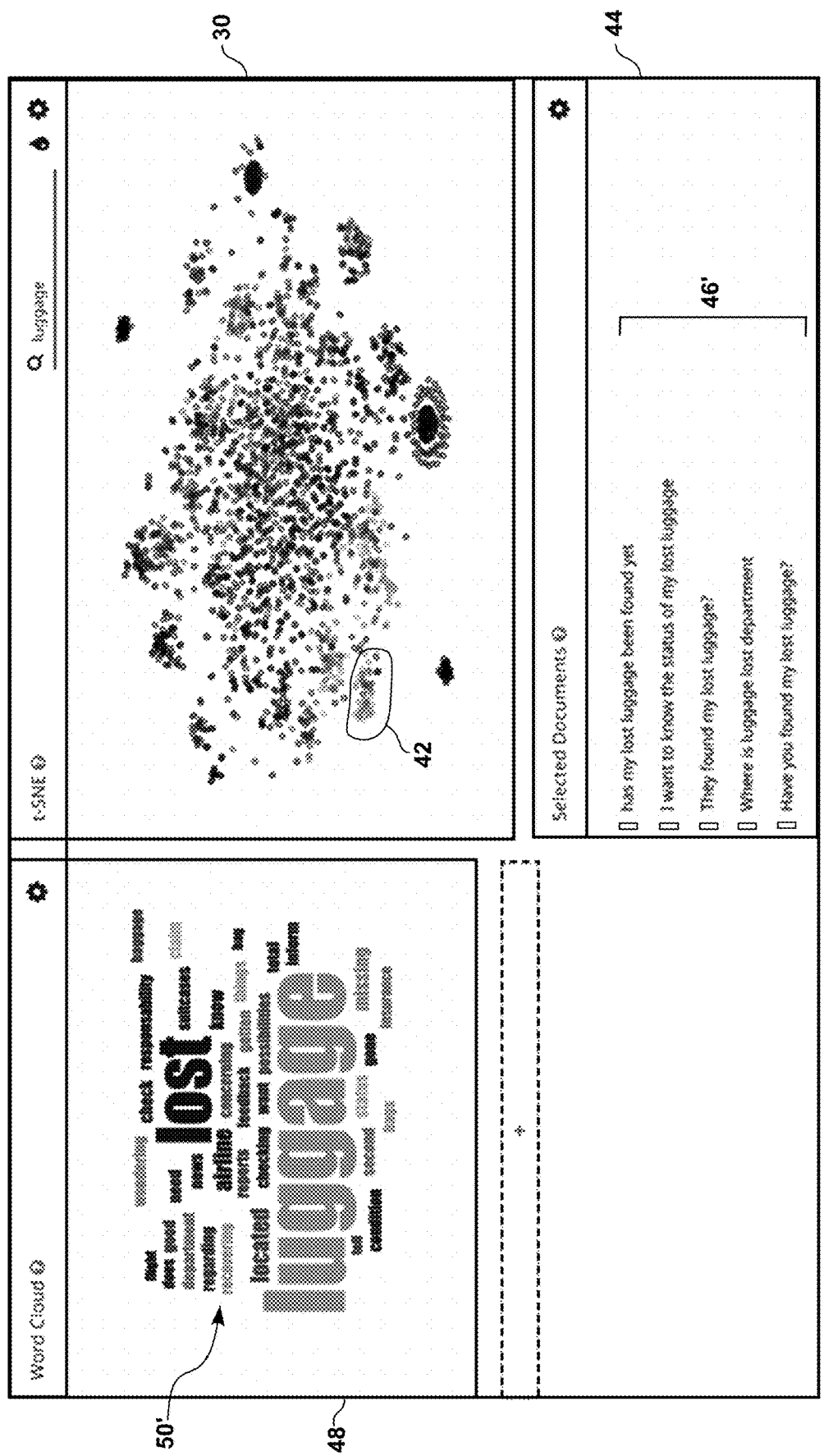

FIG. 13 illustrates a GUI display such as in FIG. 2, after a user enters the query "luggage" in interface 60, thus selecting all the 2-D data 28 within a predetermined distance of the query vector, wherein display 30 displays in different gray tones the highlighted selected 2-D data, and wherein the user thereafter uses interface 40 to lasso a subset 42' of 2-D data on display 30. In FIG. 13, display 48 displays a word cloud 50' related to the documents that correspond to the selected subset 42' of 2-D data, and displays 44 a list 46' of the text documents 16 that correspond to the subset of data 42' in the 2-D space.

As illustrated in relation to FIGS. 5-7, embodiments of this presentation relate to a GUI arranged for expanding common error visualization techniques to allow for precise correction and interpretation of machine learning models built on top of embeddings.

Today's machine learning has a very rigid operational paradigm. The data scientist receives data from a group of subject matter experts, trains a machine learning model based on that data, and then (occasionally) will produce static error visualizations. Based on these visualizations the data scientist will either change their modeling approach or attempt to present these technical error visualizations back to subject matter experts. The assumption is generally that training data is pristine and so the source of any errors must lie in the algorithm.

Very rarely, these visualizations will be interactive, and may have functionality to discover specific examples of given errors. The process for getting these specific errors are typically done as one-offs, and where errors are found there is no clear process either to discover the cause of that error, or to remedy it. The only available process for remedy is to blindly have Subject Matter Experts label more data until the model seems to perform better than it did before. This process is extremely frustrating both to the data scientist and the Subject Matter Experts. This lack of transparency leads people to the misconception that machine learning models are "black boxes" which cannot be understood or effectively corrected.

The Inventors have noted that the above technical prejudice is not accurate, at least with respect to the two following points: First, the Inventors have noted that errors in training data are not rare, contrary to what is currently supposed in the known art. Second, the Inventors have noted that many if not most machine learning model errors in modern systems have little to do with algorithmic difficulties and can instead be traced back to training data.

Based on these findings, the inventors have designed an application aimed at helping users identify errors and follow an "audit trail" back to the training data implicated in those errors.

Embodiments of this presentation provide for a GUI 10 comprising a data interface 12 arranged for receiving a set 14 of test documents 16 having each a known association to one label 68 of a set 70 of labels; a data recognition model (for example in calculator 20) arranged for associating each test document 16 to an estimated label 68 of said set 70 of labels, using recognition rules based on a set of learning documents 16' having each a known association to one label 68 of said set 70 of labels; and a user display 72, 78 for displaying all the test documents together with their estimated and known associated labels.

According to an embodiment of this presentation, the user display 72, 78 can comprise a confusion matrix as illustrated in FIG. 5 with three labels 68: EAP, HPL, MWS, where each test document having the same estimated and known label is displayed as a darker hue on the diagonal box related to said label in the matrix.

Similarly, in FIG. 5 each test document having different estimated and known labels is displayed as a darker hue on a related box of the matrix at the intersection of the known and estimated labels. In FIG. 5, any box of the table outside the identity diagonal that is not white indicates that a test document has different estimated and known labels. The text samples 16 displayed by display 78 in FIG. 5 are specific test-set examples where examples that technically belonged to MWS (Mary Wollstonecraft Shelley) were incorrectly classified as being written by EAP (Edgar Allan Poe).

According to an embodiment of this presentation, a first user interface 74 is arranged for allowing a user to select any of the test documents corresponding to a box of the matrix displayed by user display 72. In FIG. 5, such user interface can be an interface allowing the user to click on any box of the matrix, whereby all the test documents related to the box are displayed and can be selected individually. All the test documents related to a selected box can alternatively be selected together.

As illustrated in FIG. 6, according to an embodiment of this presentation, user display 78 can further be provided for displaying a list of all the learning documents 16' of said set of learning documents that are within a predetermined distance of the selected test documents. The illustration shows such a displaying. According to an embodiment of this presentation, the "learning documents within a predetermined distance of the selected test documents" can be all the learning documents having the same known associated label as the selected test documents.

According to an embodiment of this presentation, user interface 80 can be arranged for allowing a user to correct the set of learning documents, for example by canceling any chosen learning document 16' displayed on user display 78. The data recognition model of GUI 10 can then be arranged for updating said recognition rules based on the corrected set of learning documents. According to an embodiment of this presentation, an arrow or button 79 is displayed on user display 78 for each displayed test document 16, and when the arrow 79 is selected by for example user interface 80, display 78 additionally displays the specific training examples 16' that were used in making the particular determination of the estimated label of test document 16. In the case illustrated a training error has been found, where one of the training examples that was assumed to be written by MWS was in fact written by HPL (H. P. Lovecraft). This is a case where a mislabeled document has contributed to a mistaken classification. Without using a GUI according to this embodiment, discovering a training data error like this would be nearly impossible.

Figure 14:
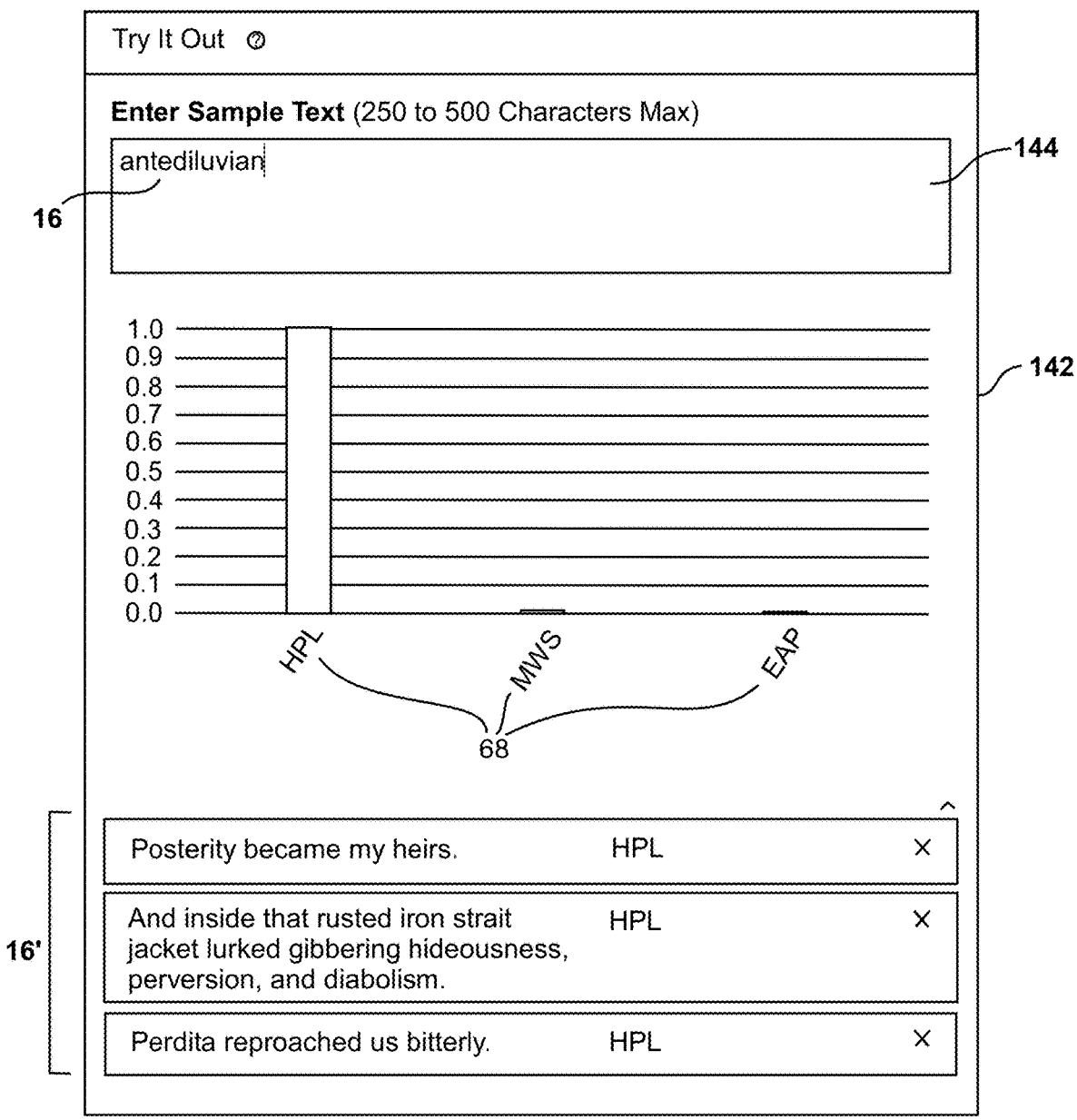
FIG. 14 illustrates a display of a GUI according to alternative embodiments of this presentation.

FIG. 14 illustrates a display 142 of a GUI according to alternative embodiments of this presentation, having an interface 144 allowing a user to enter/type a test document 16, to display a confidence level of the test document being associated with each label 68, and to display all the learning documents 16' within a predetermined distance of said test document. Using a GUI 10 as detailed above can be used to "explain" results that are correct, and also classifications that are not a part of the test set. In the particular case illustrated in FIG. 14, the trained model of the GUI has correctly identified that HPL is the author most likely to use the term "antediluvian". Typically this would be considered a happy accident and a user would have a poor understanding of why the model managed to identify this. As illustrated in FIG. 15 however, according to embodiments of this presentation the user can see that the model has recognized that the three examples below share stylistic similarities with the term antediluvian. The GUI according to embodiments of this presentation shows to the user that the training data/document 16' for HP Lovecraft did not effectively include the term "antediluvian", whereby the machine learning model has likely recognized that HPL's particular style of flowery ornate language would be the most likely to use the term antediluvian in a future work.

FIG. 15 illustrates a GUI according to alternative embodiments of this presentation, having a display 146 that displays statistical measures of model efficacy, together with the test document 16 incorrectly labeled by the model and the training document 16' related to the incorrect labelling. The statistical measures illustrated in FIG. 15 show that the model has incorrectly assumed that the Italian example test document 16 written by MWS is comparable to the French writing training document 16' in Edgar Allen Poe's works. In this case the user can understand that the model does not understand foreign languages and so has erroneously assumed that, because EAP uses foreign languages more frequently than the other authors, all foreign language snippets belong to him. This is a case where algorithmic shortcoming can be traced back to the training documents. In this case the error is that the algorithm has been given examples in a language it does not understand.

Figure 16:
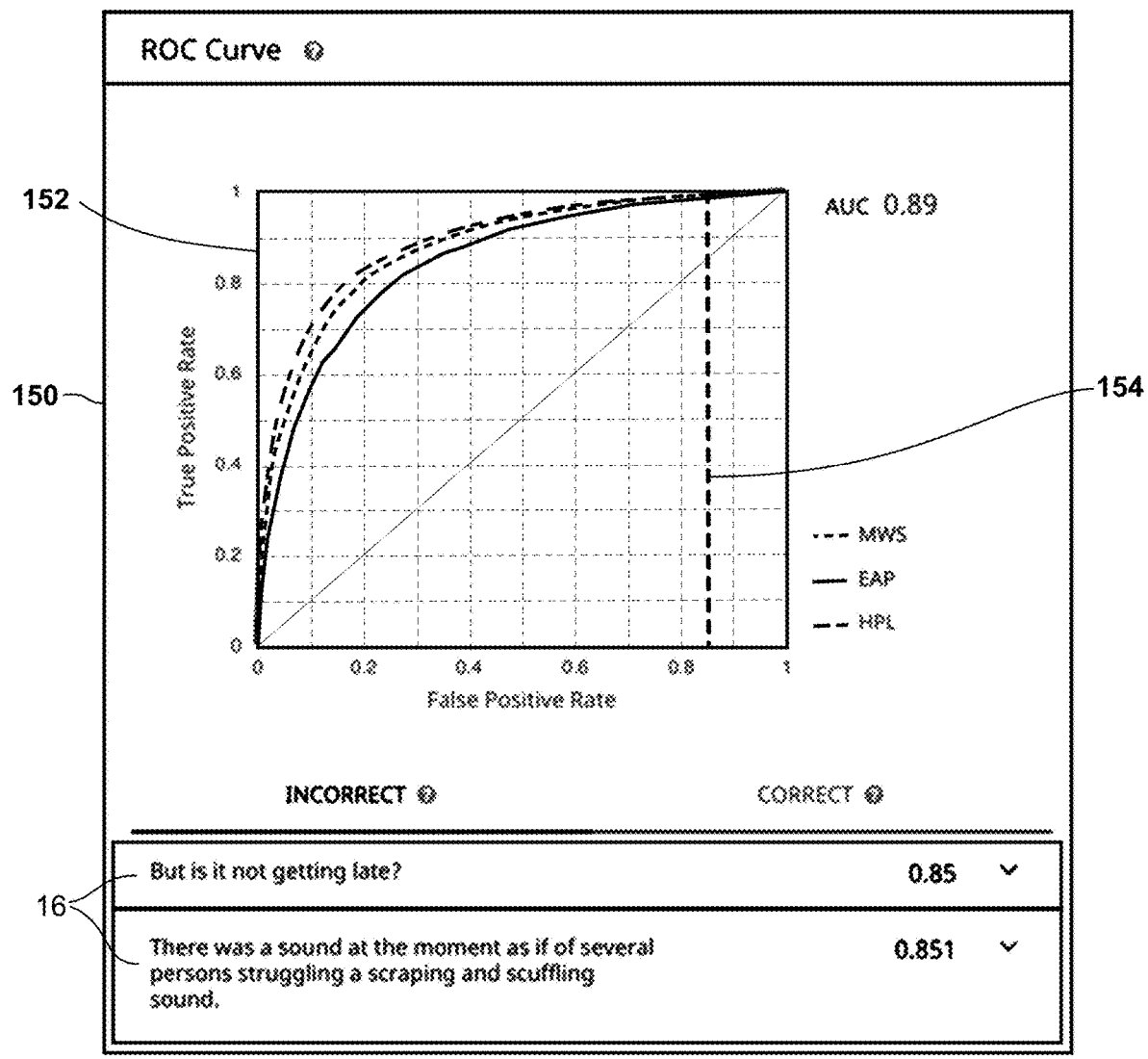
FIGS. 16 and 17 illustrate a GUI according to alternative embodiments of this presentation.

FIG. 16 illustrates a GUI according to alternative embodiments of this presentation, which operates similarly to the GUI illustrated in FIG. 5, but having a display 150 that displays a Receiver Operating Characteristic Curve, which is a more complex error visualization scheme than the confusion matrix of FIG. 5. According to this embodiment, the user selects a specific label by selecting a curve 152 associated with the label and a cutoff value by dragging a dotted line interface 154 left or right. Once these two are selected the GUI displays the test document 16 where the model has made the mistakes corresponding to the intersection of line 154 and curve 152.

Figure 17:
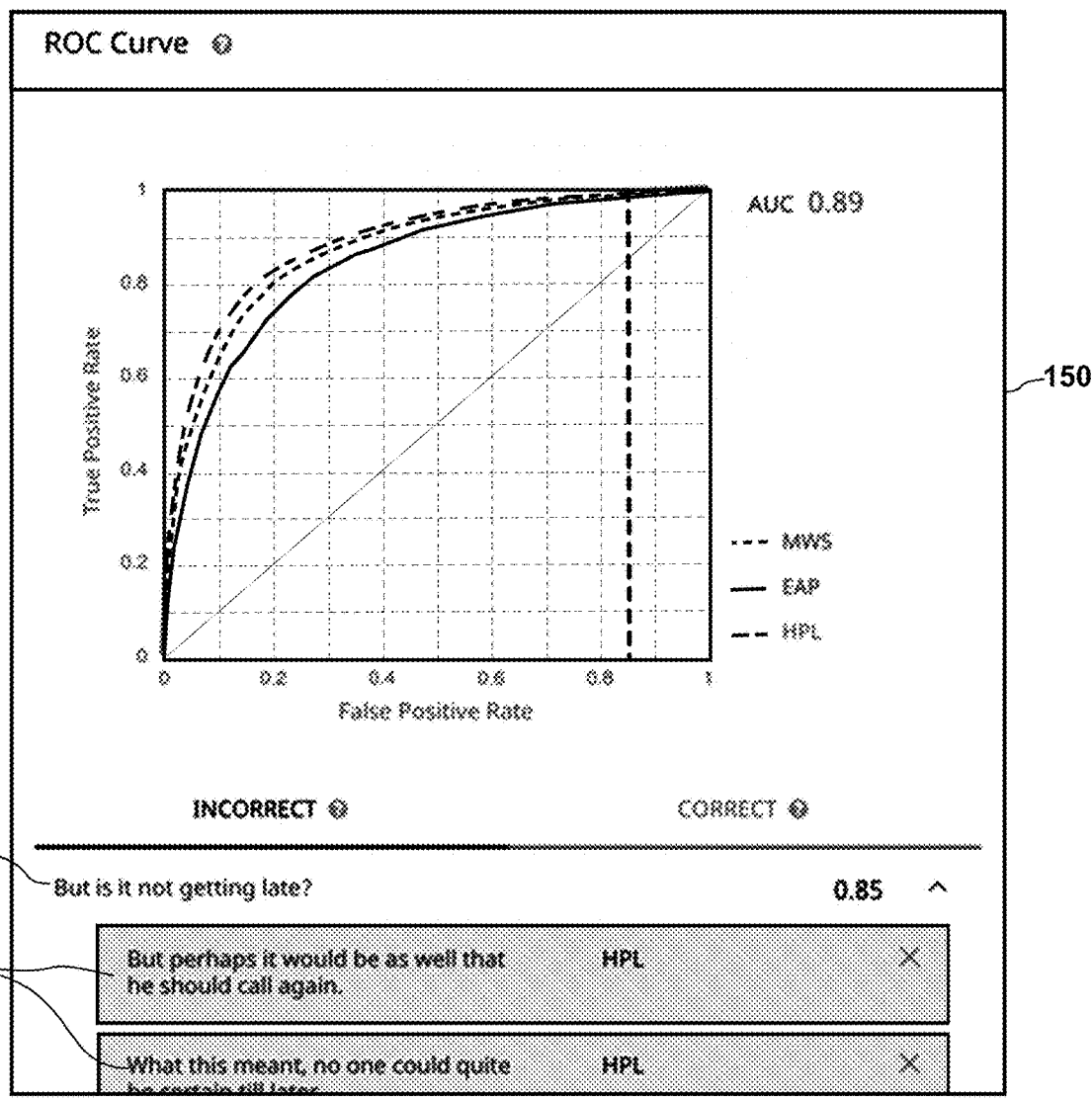

FIG. 17 illustrates the GUI of FIG. 16, where a user interface such as user interface 80 of FIG. 6 allows the user to select a displayed test document 16 of interest, and where the GUI displays in response the learning documents 16' involved in the displayed mistakes. FIG. 17 illustrates another error mode of the model is cases where the context is particularly lacking. Where the model only sees very short snippets of text, the model is incapable of accurately identifying the source author due to insufficient context. Again, this is an error type that would typically require days of investigation as well as a flash of insight, but in this particular case, a GUI according to embodiments of this presentation makes the error immediately obvious by allowing to view the associated audit trail.

Figure 18:
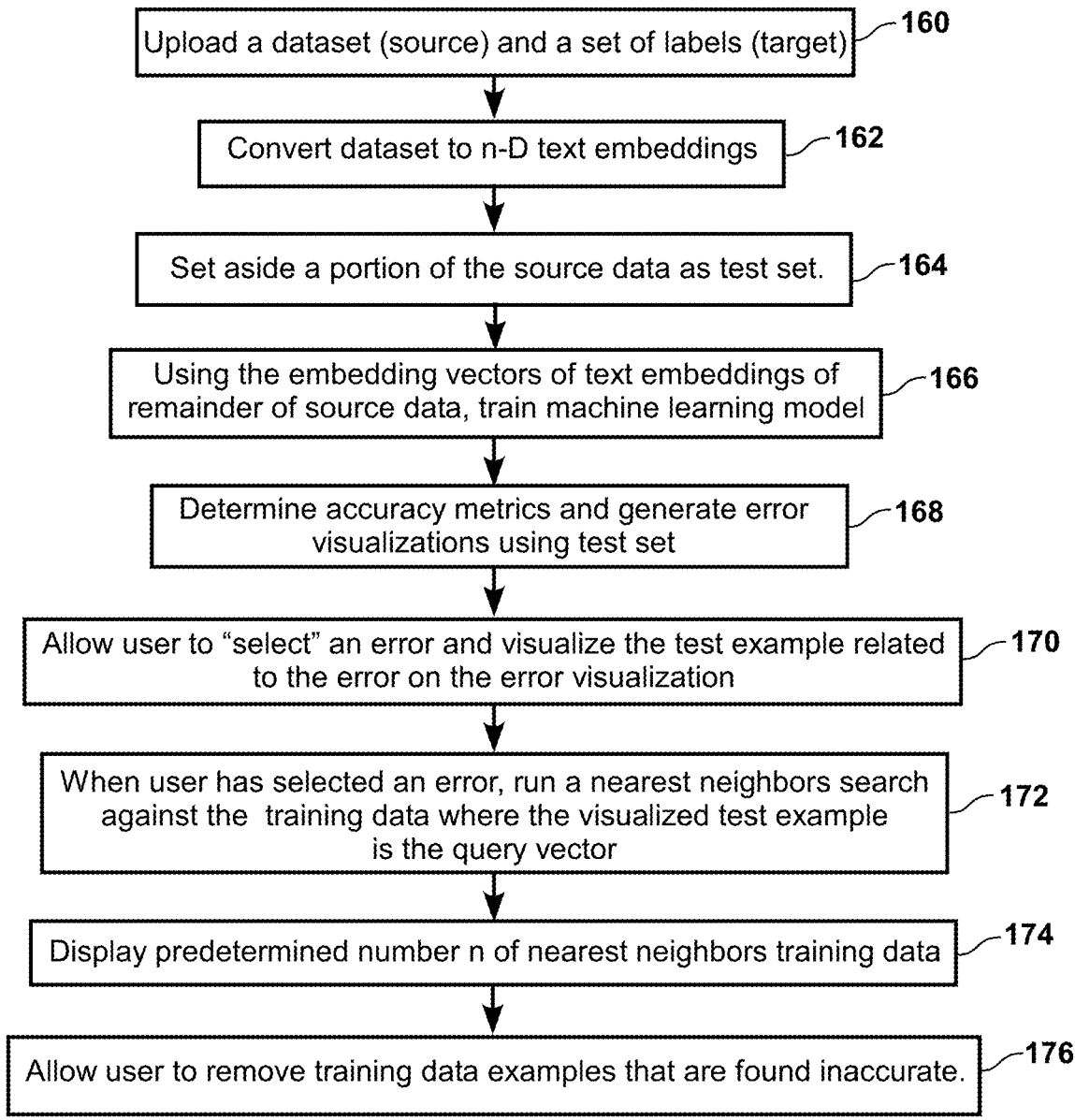
FIG. 18 illustrates a method of controlling a GUI according to embodiments of this presentation.

FIG. 18 illustrates a method of controlling a GUI according to embodiments of this presentation, comprising: uploading 160 a set of documents 16 (the source, for example as described in relation to FIG. 7) along with a set of labels 86 (the target, for example as described in relation to FIG. 7); and converting 162 the dataset to n-D text embeddings/data/vectors. The method further comprises setting aside 164 a portion (e.g. 20%) of the source documents as a test set. According to an embodiment of this presentation, steps 160 to 164 amount to receiving a set of test documents (the 20% documents set aside) having each a known association to one label of a set of labels. The method further comprises, using the embedding vectors as the new source, training 166 a machine learning model on the remainder of the documents (the training documents; 80% remaining in the example given), for example using a standard regression-style model (e.g. Logistic Regression) to create the machine learning model. At this juncture, to ensure adequate performance, hyperparameters can be optimized via e.g. gridsearch with for example the measure performance to be optimized being the average efficacy of a 5-fold CV evaluation. Using the model, for example with appropriate hyperparameter optimization, the method further comprises determining 168 some accuracy metrics by training the model on the training documents (e.g. 80% of the original dataset) and finding errors on the test documents (e.g. the remaining 20% of the original dataset) and generating error visualizations using the test documents. According to an embodiment of this presentation, this operation amounts to displaying all the test documents together with their estimated and known associated labels. According to an embodiment of this presentation, operations 166 and 168 amount to providing a data recognition model for associating each test document to an estimated label of said set of labels, using recognition rules based on a set of learning documents (the 80% documents) having each a known association to one of said set of labels.

According to embodiments of this presentation, the method further comprises making the error visualization appropriately interactive and allowing 170 a user to "select" any of the points on the error visualization to see those particular errors. According to an embodiment of this presentation, this operation amounts to allowing a user to select any of the test documents displayed in relation with the visualized error.

According to embodiments of this presentation, the method further comprises, when a user has chosen a specific test example, running 172 a nearest neighbors search against the training documents where the test example is the query vector of the search.

According to embodiments of this presentation, the method further comprises returning the top n nearest neighbors and displaying them 174. According to an embodiment of this presentation, this operation amounts to displaying the learning documents, of the set of learning documents, which are within a predetermined distance of the selected test documents.

According to embodiments of this presentation, the method further comprises allowing 176 the user to remove any of the displayed training documents that are found in this way. Retraining of the model can for example be triggered when a training document is removed, as the displayed errors will no longer be accurate. According to an embodiment of this presentation, this operation amounts to allowing a user to correct the set of learning documents by canceling any learning document displayed in relation to a test document error and updating the recognition rules based on the corrected set of learning documents.

Further embodiments of this presentation allow improving the speed and efficacy of labeling tasks over time by intrinsically linking the task to a machine learning model. Today, data labeling is an integral part of almost every machine learning system. However the process by which it happens is slow and cumbersome. At the outset of a new machine learning problem the first question people ask is how much training data/documents they need. However, it is difficult to answer reliably to this question.

Every problem is different, and more critically the determination of what exactly is "good enough" for the problem at hand, usually cannot be cleanly mapped back to quantitative metrics. This is because measuring model efficacy is a shockingly technical field that a standard business owner cannot understand. Even metrics like accuracy are unintuitive in cases with a large number of classes, or strong class imbalance.

This means that today's process is often a frustrating cycle of data labeling and incremental model tweaking to gain incremental advantages. The process is frustrating for the business owners, who feel that they have no insight into how the model is performing, and frustrating for the data scientists, who feel that no matter how they report their accuracy metrics the business owners will not understand them. Invariably this results in a common industry anti-pattern, where the target accuracy is always 10% higher than whatever the initially reported values are.

The inventors have found that the standard data labeling flow such as outlined above is far too transactional, and that the key issue in communication has nothing to do with quantitative efficacy metrics (accuracy, F1 score, ROC AUC, etc. . . . ) and have much more to do with the fact that business owners that actually deal with the data labeling cannot "see" how the model is performing. Their labeling flow never changes, they never see increased productivity in the part of the workflow in which they are involved. This also means that they have trouble understanding or anticipating common error modes.

Embodiments of this presentation radically transform the standard data labeling workflow. Rather than treating labeling as a purely transactional task—labelling is viewed as a continuous task where the individual making the accuracy assessment is actually the person labeling the data rather than a data scientist removed from the process. The above can be accomplished by intrinsically linking labeling tasks to an underlying machine learning model. As a user submits labels the underlying model is updated in real time and the predictions are displayed in context—telling the user exactly how effective the model is at a given point in time.

This also serves the purpose of accelerating the labeling workflow over time: A user has the ability to accept the labels that are presented to him in the labeling flow, and accepting existing labels is significantly faster than creating these labels from scratch, and as time goes on the ratio of labels that can be automatically accepted also raises—ensuring that there is an acceleration in data labeling over time.

Figure 19:
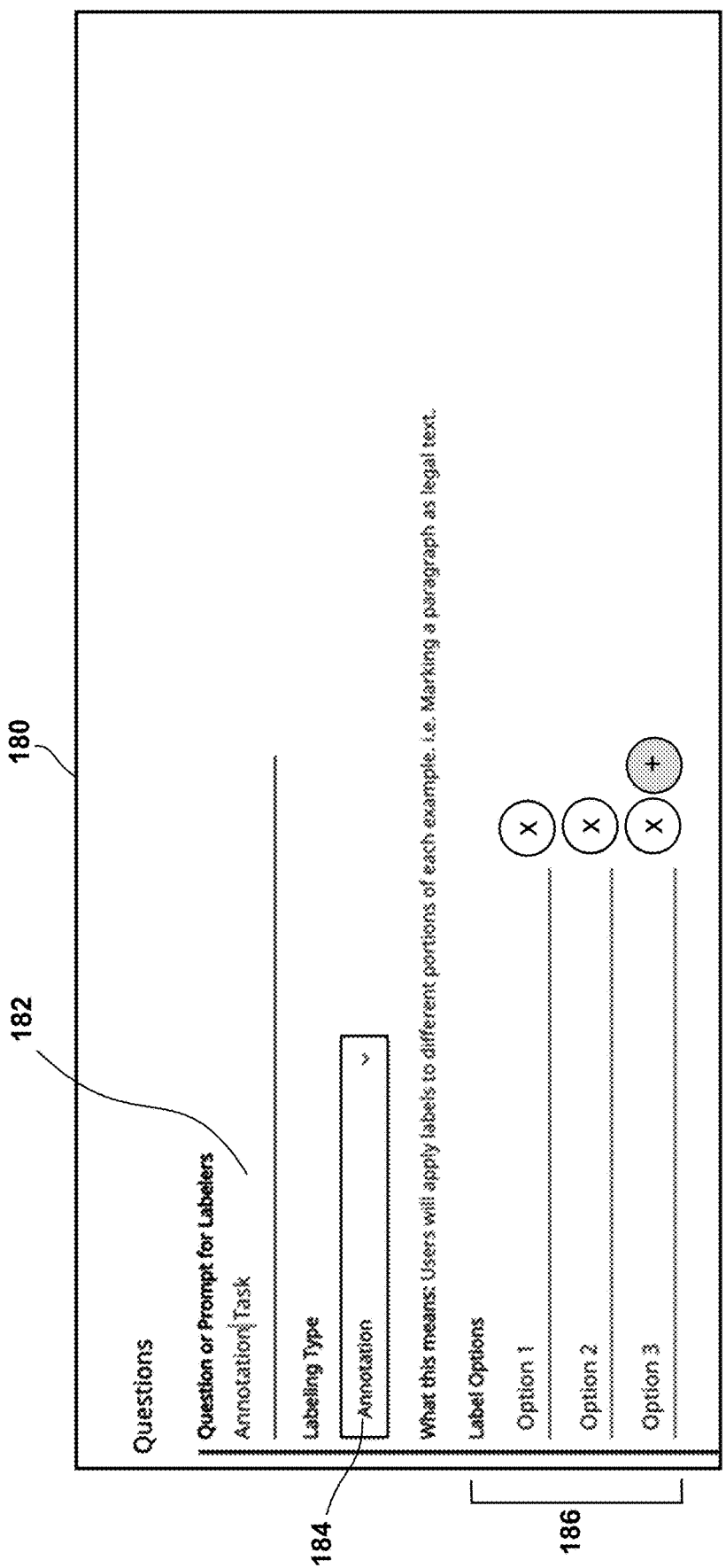
FIG. 19 illustrates a setup GUI according to embodiments of this presentation.

FIG. 19 illustrates a setup GUI 180 according to embodiments of this presentation, arranged for preparing a labelling GUI as outlined above, the setup GUI 180 comprising an interface/field 182 for entering the instruction that will be given to a user that is to label a set of text data (such as a set 14 of documents 16 as described in relation with FIG. 1); an interface 184 for selecting a type of labeling operation (e.g. labeling portions of a text document or a whole text document); and an interface 186 for entering the labels the user will have to associate the text document to.

Figure 20:
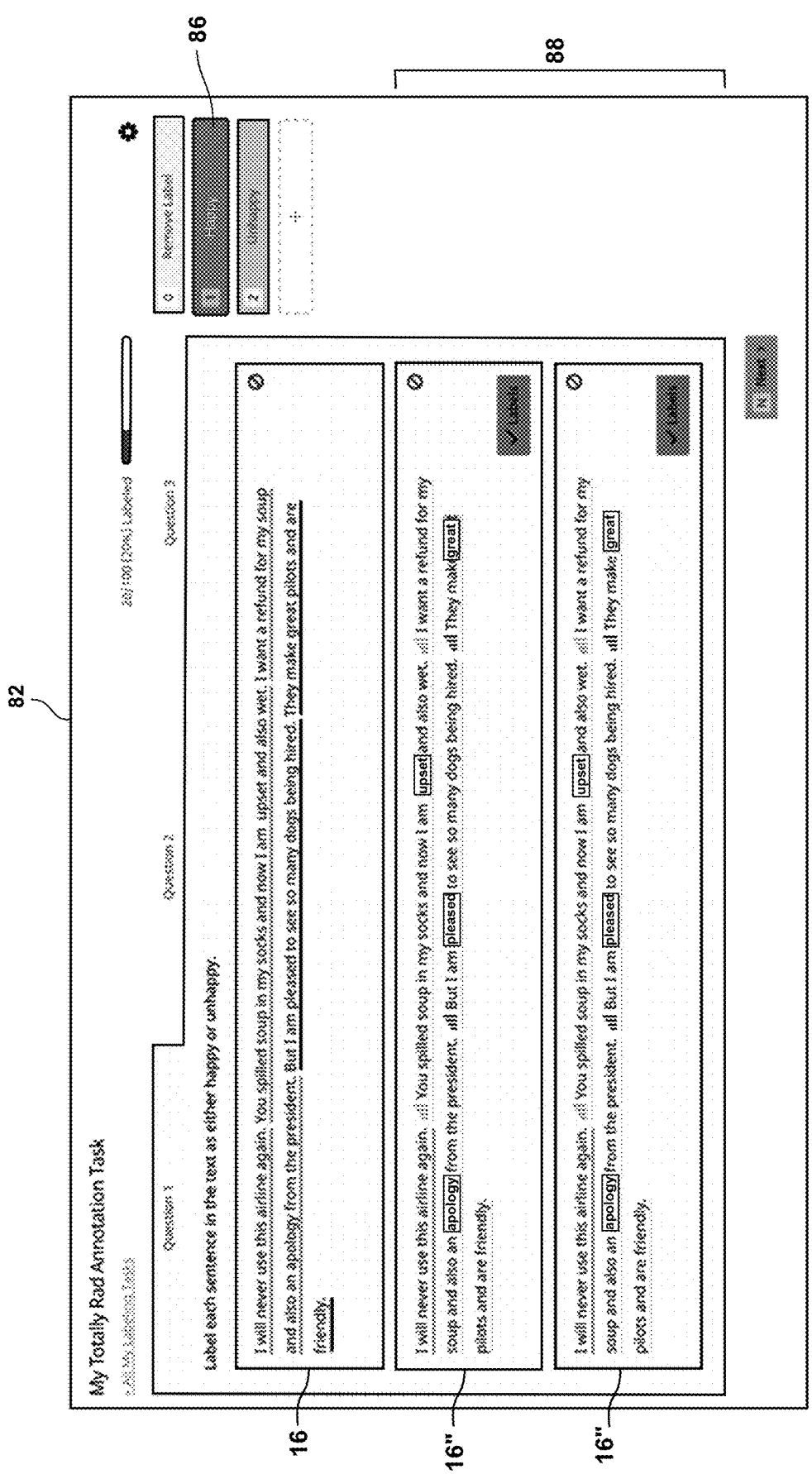

FIG. 20 illustrates a GUI display 82 of a GUI 10 such as described in relation with FIG. 7, which was programmed using for example using GUI 180 above to display/give the user the instruction "label each sentence in the text as either happy or unhappy" and display a text document 16 of a first set of documents. As outlined above, GUI 10 can have a user interface that allows a user to select phrases in document 16 and to associate the selected text document to a selected label 86. The GUI 10 is further arranged to provide feedback to the user by underlining the selected text document 16 or portion of text document 16, for example with a line colored in the same way as the box containing the label 86 to which the user has associated the selected text.

As also described in relation with FIG. 7, the GUI 10 is further provided to receive a second set of text documents 16" and comprises a second user display 88 arranged for successively displaying subsets of the second set of text documents 16" (for example a subset of 2 text documents 16" as illustrated); the calculator of the GUI being arranged for transforming the text document 16" of said displayed subsets into vectors of the n-dimensional manifold; and generate with the data recognition model a likelihood of the vectors being associated with the labels 86. FIG. 20 illustrates the second user display 88 displaying two text documents/data 16" and displaying a likelihood of sentences in the displayed text being associated to one of the two labels 86. As illustrated, the GUI 10 can display that a sentence is most likely to be associated with each label by underlining the sentence with a color associated to that most likely label, where the vividness of the color of the underlining is related to the likelihood. In FIG. 20, the display 88 additionally displays a little "reception bar" or scale diagram of color at the end of each sentence of the text, having a number of colored bars indicating the likelihood of the sentence being associated to the label identified by the diagram color.

According to an embodiment of this presentation, the user can effectively associate each of documents 16" to the suggested likely labels by using an interface (for example allowing to "double click" on the suggested label) to accept the suggested label, resulting in a faster labeling speed than if the user were labeling each example from scratch.

Figure 21:
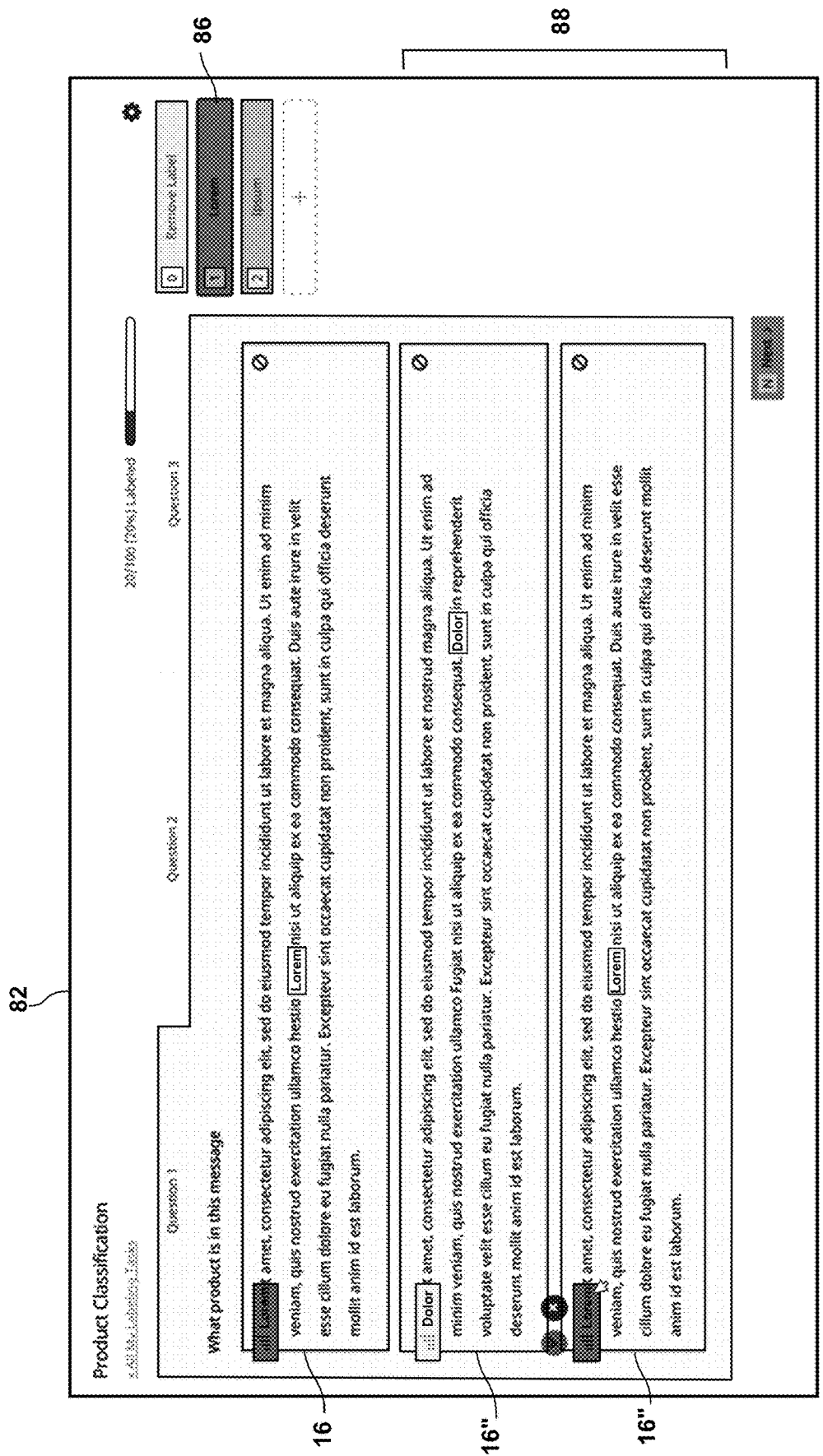

FIG. 21 illustrates a display similar to the display in FIG. 20, where whole text documents (16, 16" in the figure) are suggested likely labels instead of sentences of the text documents 16, 16" as previously illustrated.

Figure 22:
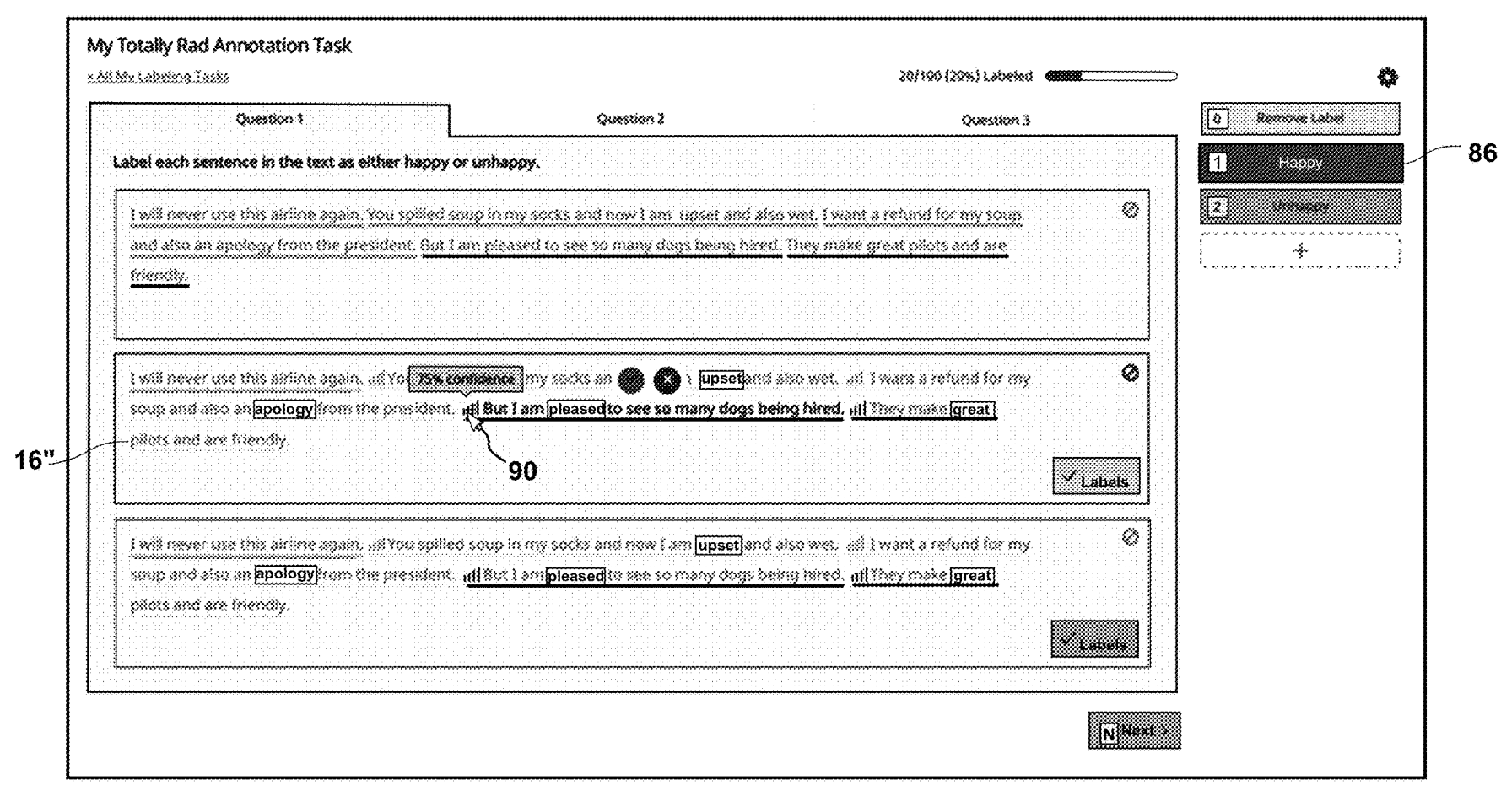

FIG. 22 illustrates the display of FIG. 20, where a user interface 90 of the GUI allows the user to point to the scale diagram generated by the data recognition model, thus causing the GUI to additionally display the calculated level of confidence given by the model to the suggested association between the text document 16" and the associated label 86, and allowing the user to accept or reject the suggested association, where the accepted and rejected associations are used to update the recognition model.

Figure 23:
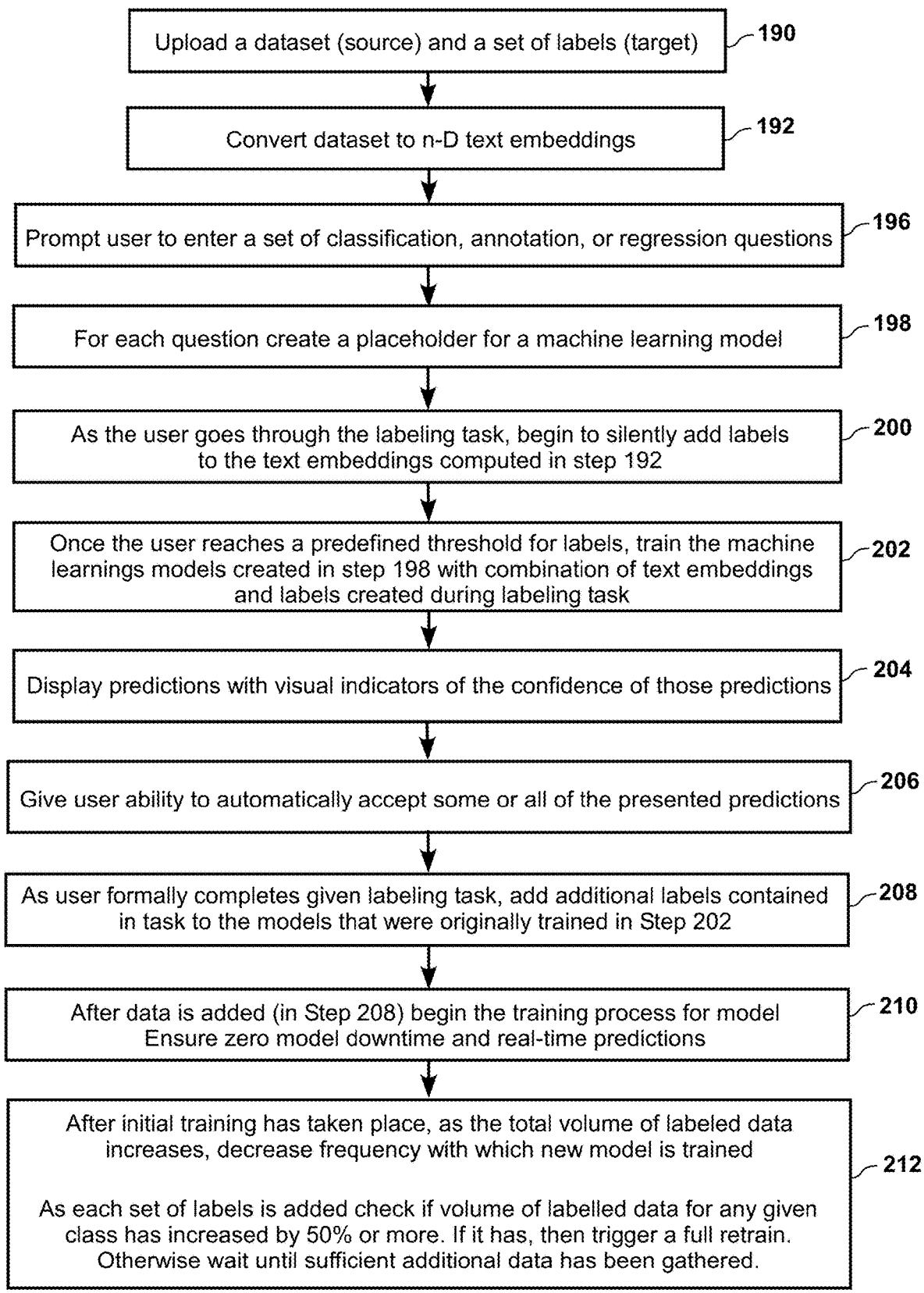
FIG. 23 illustrates a method of operating a GUI such as described in relation to FIG. 7 and FIGS. 20-22.

FIG. 23 illustrates a method of operating a GUI such as described in relation to FIGS. 7 and 20-22 according to embodiments of this presentation; the method comprising: Uploading 190 a set of documents or dataset (the source) along with a set of labels (the target); converting 192 the dataset to text embeddings (e.g. using a fasttext software); prompting 196 a user to enter a set of classification, annotation, or regression questions; and for each question entered by the user, create 198 a placeholder for a machine learning model.

According to embodiments of this presentation the method further comprises, as the user goes through the task of labeling the dataset, begin 200 "silently" adding labels (i.e. adding the labels without displaying them) to the text embeddings computed in step 192. According to embodiments of this presentation, once the user reaches a predefined threshold for labels (for example at least 3 examples per class for classification problems, but several dozen examples may be required for annotation problems) the method comprises training 202 the machine learning model created in step 198 by providing to the machine learning model the combination of text embeddings and labels created during the labeling task.

According to embodiments of this presentation, the method further comprises then displaying 204 the predictions made by the model with visual indicators of the confidence of those predictions, and giving 206 to the user the ability to automatically accept some or all of the presented predictions, as shown in FIGS. 7, 20, 22 above. According to embodiments of this presentation, the method further comprises, as the user formally completes a given labeling task (e.g. by pressing a "next task" button), add 208 the additional labels contained in that task to the models that were originally trained in Step 202; and, after data is added (in Step 208), begin 210 the training process for that model. According to embodiments of this presentation, as the model used so far is still required to make predictions on the next set of examples, an appropriate deployment strategy (e.g. "blue-green deployment strategy") must be used to ensure zero model downtime and real-time predictions.

According to embodiments of this presentation, the method further comprises, after the initial training has taken place and as the total volume of labeled data increases, decreasing the frequency with which a new model is trained. As each set of labels is added, the method provides for checking to see if the volume of labelled data for any given class has increased by a predetermined number (e.g. 50% or more). If it has, then trigger 212 a full retrain. Otherwise wait until sufficient additional data has been gathered.

The embodiments described above refer specifically to a system arranged for displaying model predictions to users/labelers as they go through the labeling task. The benefit of this is that each label is a test result so the visual is always an accurate portrayal of test performance (if a limited subsample).

The benefits of such embodiments are threefold: Firstly, as the established labels become more accurate the needed amount of correction to each piece is reduced, and the percentage of times where the human can simply check the work of the model, which is significantly faster than creating the work from scratch. Secondly, one of the biggest issues in machine learning today is allowing a business user to understand what is being learned by the machine; where it does well and where it does poorly. The above-described embodiments allow users to label more effectively as they can simply recognize cognitive differences between what they are labeling and what they want to see in an answer (this is often the case though it's very hard to convince users of this. As machine learning models are effectively well-trained parrots, this is the source of much dissatisfaction with these models). Finally, these embodiments help resolving the age-old question of: "how many labels do we need to give it?" additional labels simply improve accuracy. It is nearly impossible for someone to answer "how accurate does it have to be", or "how many labels would we need to get there", or even "what accuracy is reasonable", but this embodiment gives the user direct control over the above features. By continuously showing test results to a user, the user can stop labeling when the accuracy is intuitively satisfying to the user.

Thus, the above embodiments allow leveraging learning to improve the efficiency and efficacy of the labeling process. Typically this is only done in reverse. Additionally, the above embodiments resolve current uncertainty around data volumes and accuracy expectations.

Embodiments of this presentation also provide for an active learning process that includes seeding the model with the provided labels (one-shot learning)

It is known to implement static labeling (e.g. Amazon mechanical turk), surveys, quizzes. Static labeling applications exist, where the results are fed into a machine learning algorithm, but not in real time and not in a way that can solve the above problems.

In addition to the current state of labeling technology (which is entirely static), any speed increase is driven only by the user's understanding of the task and their increasing comfort with the platform, but after reaching a basic level of proficiency, both the efficiency and efficacy remain almost entirely static. Because the user has no understanding of how the data and labels are being used there are frequently large misunderstandings about how the user should be labeling. The current solution to this is extremely detailed training, coupled with the hiring of skilled professionals in a given space. This is hugely expensive and again, doesn't provide satisfactory solution to this problem.

Currently when it comes to communicating required data volumes, a subject matter expert (data scientist) is unable to give an estimate until the full model has been trained. In addition, since the expected accuracy is driven by the customer, but the customer frequently lacks the technical expertise to give a good answer to what accuracy should be required or expected (accuracy, the only metric which a user will be familiar with, is shockingly unintuitive and is a remarkably poor metric for most problems. AUC, which is much more intuitive, is so technical as to be unfamiliar to those without relevant graduate-level education, and inaccessible to those without a technical background). This leads to a scenario where a user simply pegs itself to a number slightly above whatever the first presented accuracy was, with little grounding on what is a good or a bad result.

As the user will typically already be the one that is checking the results, a GUI according to embodiments of this presentation adds no additional overhead, and can in fact drastically improve the efficiency of the labeling process, which in turn improves the accuracy of the model in a positive feedback loop that drastically improves model performance per unit of labeling time.

Figures 24A, 24B:
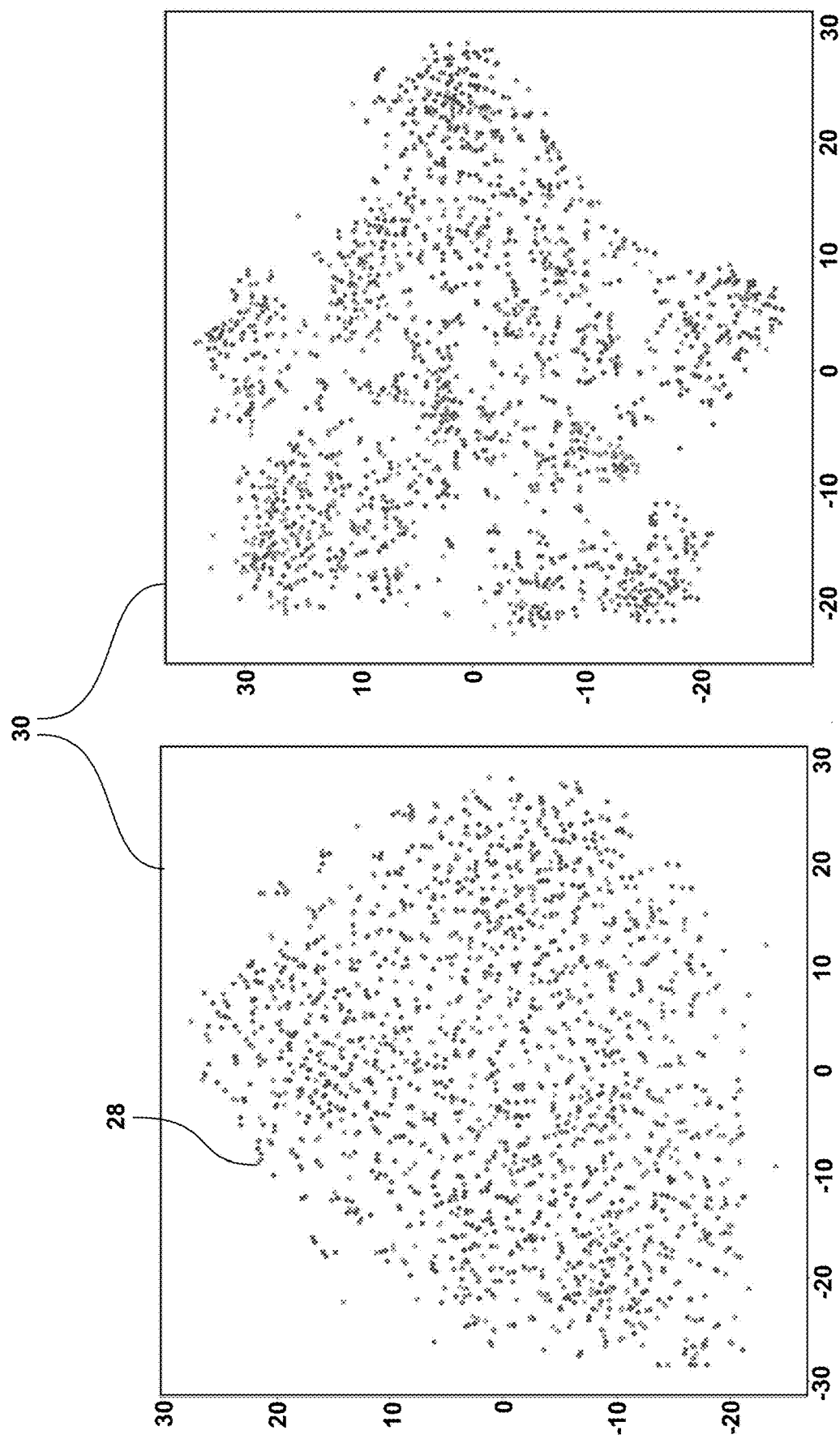
FIGS. 24A to 24D illustrate the operation of a GUI according to embodiments of this presentation.

According to embodiments of this presentation, and in order to facilitate the readability of for example display 30 of the GUI 10 disclosed above, the calculator 20 is arranged to change how the vectors in the n-dimensional manifold are transformed into a data in a 2-D space, such that the 2-D data of text documents associated to a same label form clusters on the first user display. According to an embodiment of this presentation, calculator 20 can for example be arranged to weigh differently the directions of the n-dimensional manifold that appear prominently in the vectors of the text documents associated to labels (e.g. such that the 2-D projection of distances along said directions appear shorter than the 2-D projection of distances along the other, non-weighed, directions). FIG. 24A illustrates a user display 30 with all directions of the n-dimensional manifold weighed equally; and FIG. 24B illustrates a user display 30 with a change in the weighing of the n-dimensional manifold directions that appear prominently in the vectors of the text documents associated to labels; such change causing the 2-D data 28 associated to different labels to form clusters, where for example the mean distance between 2-D data associated with a same label is smaller than the mean distance between randomly chosen 2-D data.

Figures 24C, 24D:
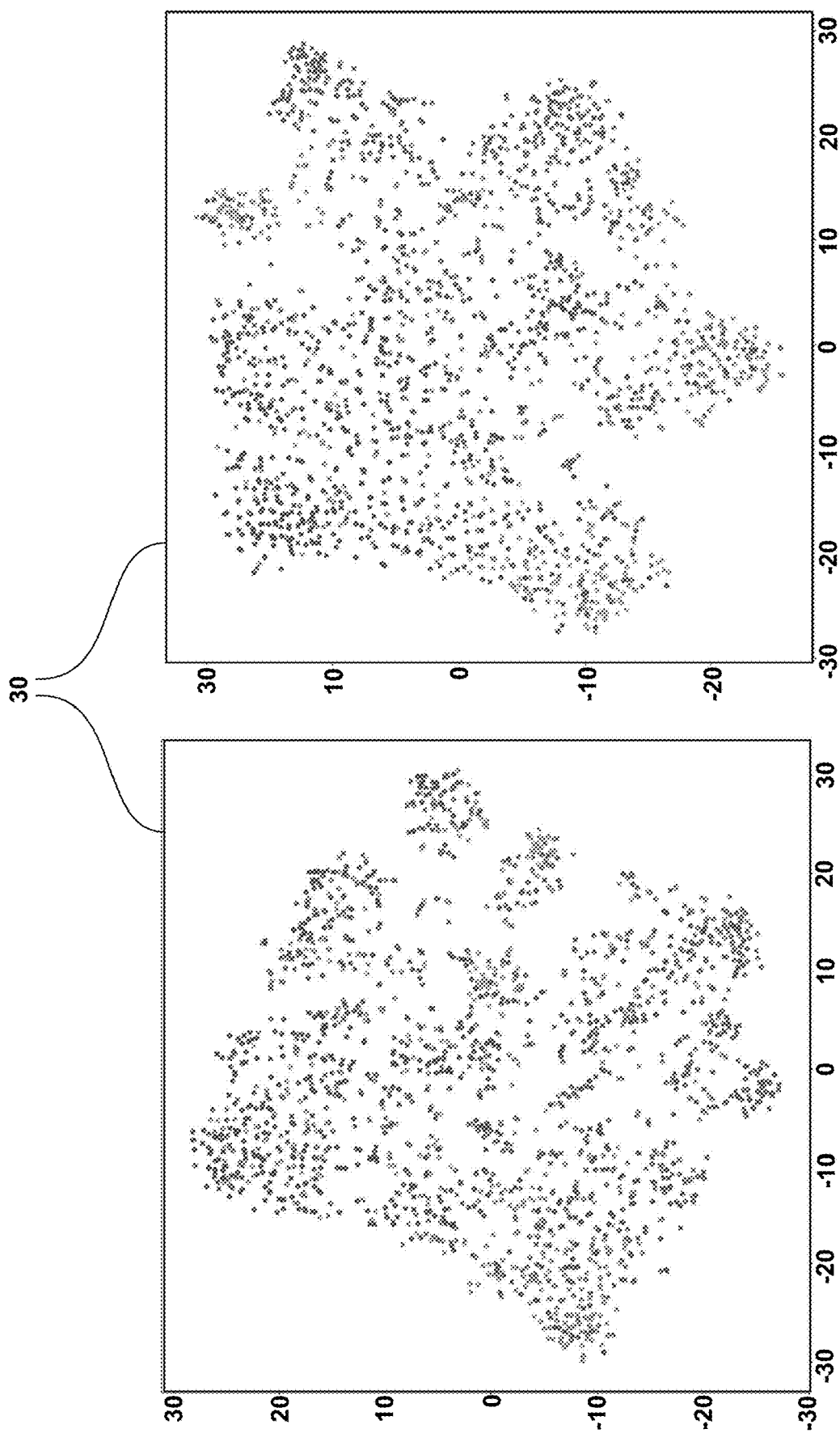

According to an embodiment of this presentation, a user interface such as user interface 52 disclosed above can be arranged for allowing a user to change the set of text documents associated to labels. Such a change can be implemented by associating a selected 2-D data 28 (or a selected subset of displayed 2-D data) to a label, as disclosed above. Optionally the selection user interface can also be used to allow the user to un-associate a received text document from a label to which it was previously associated (for example by selecting the displayed 2-D data corresponding to the received text document and selecting an appropriate command). Alternatively or additionally, the set of text documents associated to labels can be changed by receiving with interface 12 a plurality of text documents each already associated to a label. According to an embodiment of this presentation, calculator 20 can be arranged to change the weighing of the n-dimensional manifold directions in real time as the set of labeled text documents change. FIG. 24C illustrates changes in the clusters displayed on display 30, with respect to the clusters displayed in FIG. 24B, as the set of labeled text documents changes, for example due to user interaction.

Figure 25A:
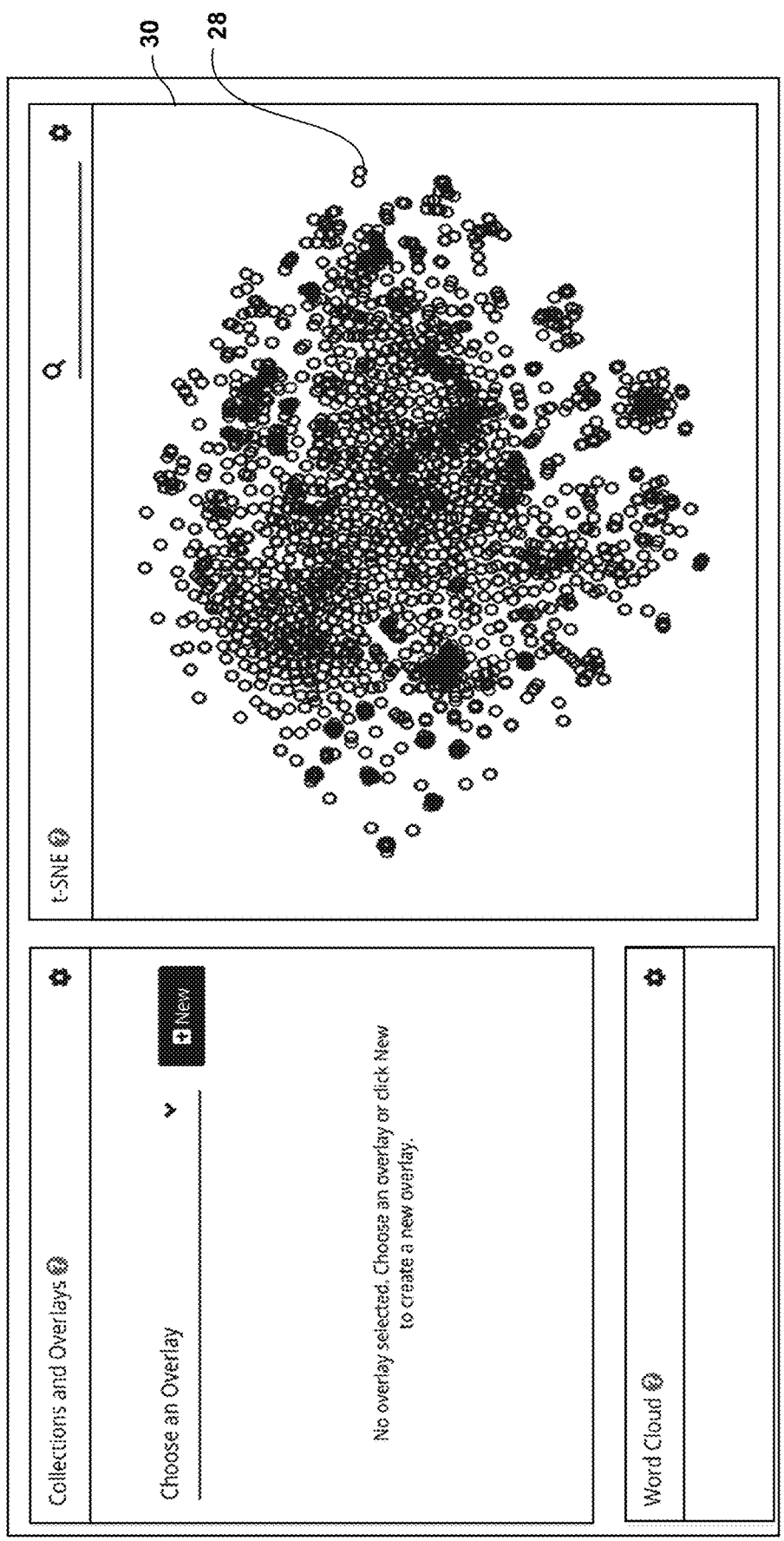
FIGS. 25A to 25E illustrate the operation of a GUI according to embodiments of this presentation.

FIG. 25A illustrates a display 30 of a GUI 10 as disclosed above, that displays a large number of 2-D data 28 corresponding each to a received text document.

Figure 25B:
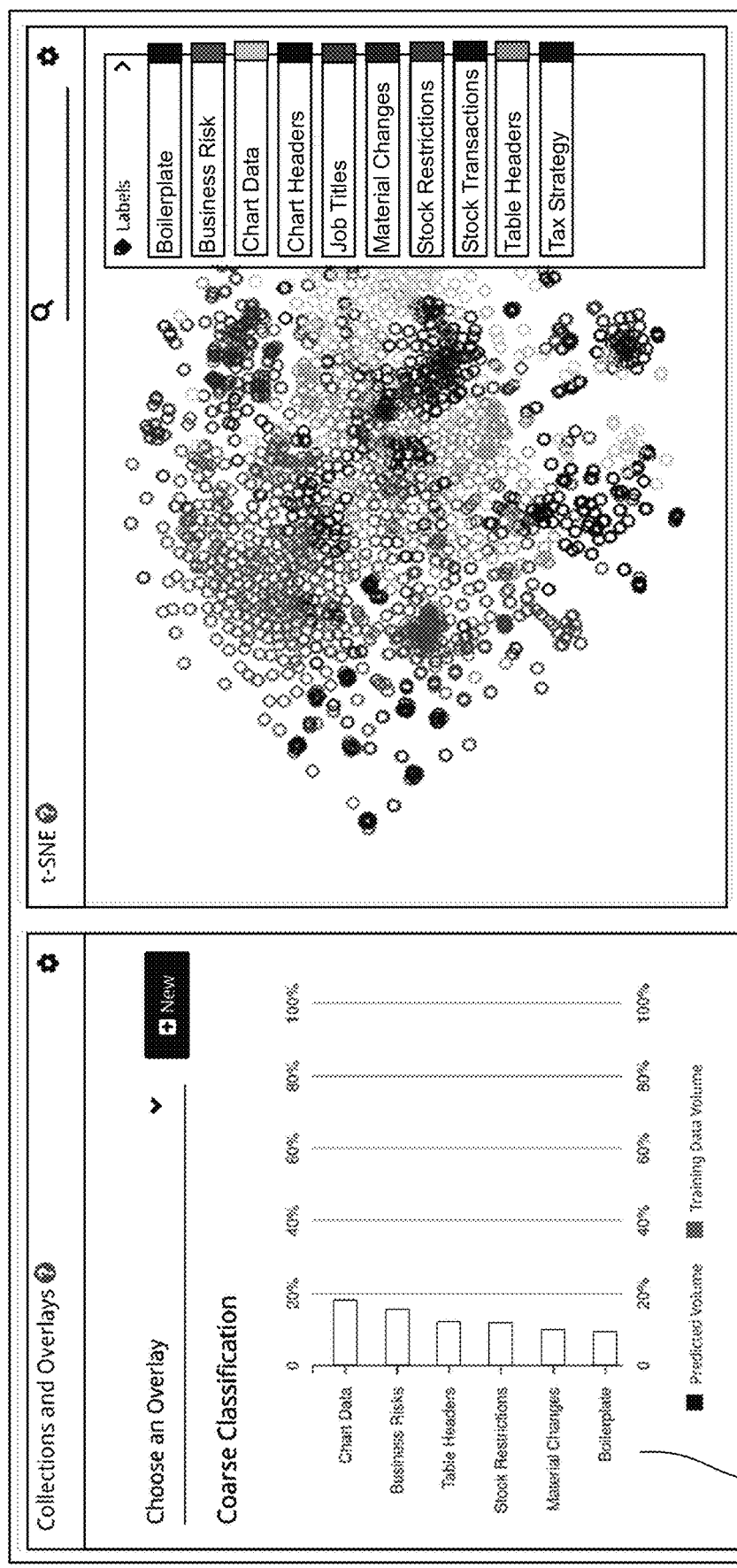

FIG. 25B illustrates the display 30 of FIG. 25A according to an embodiment of this presentation, where display 30 is arranged for displaying differently reach 2-D data associated to a different label. In the figure, each label is given a color and each 2-D data associated to a label is displayed as a circle having the color given to its associated label. As illustrated in FIG. 25B, a further display 50' can be provided to indicate what percentage of the 2-D data corresponds to each label (only the 6 largest percentages are displayed in the illustrated display 50', but display 50' can display the percentages associated to all the labels if appropriate).

Figure 25C:
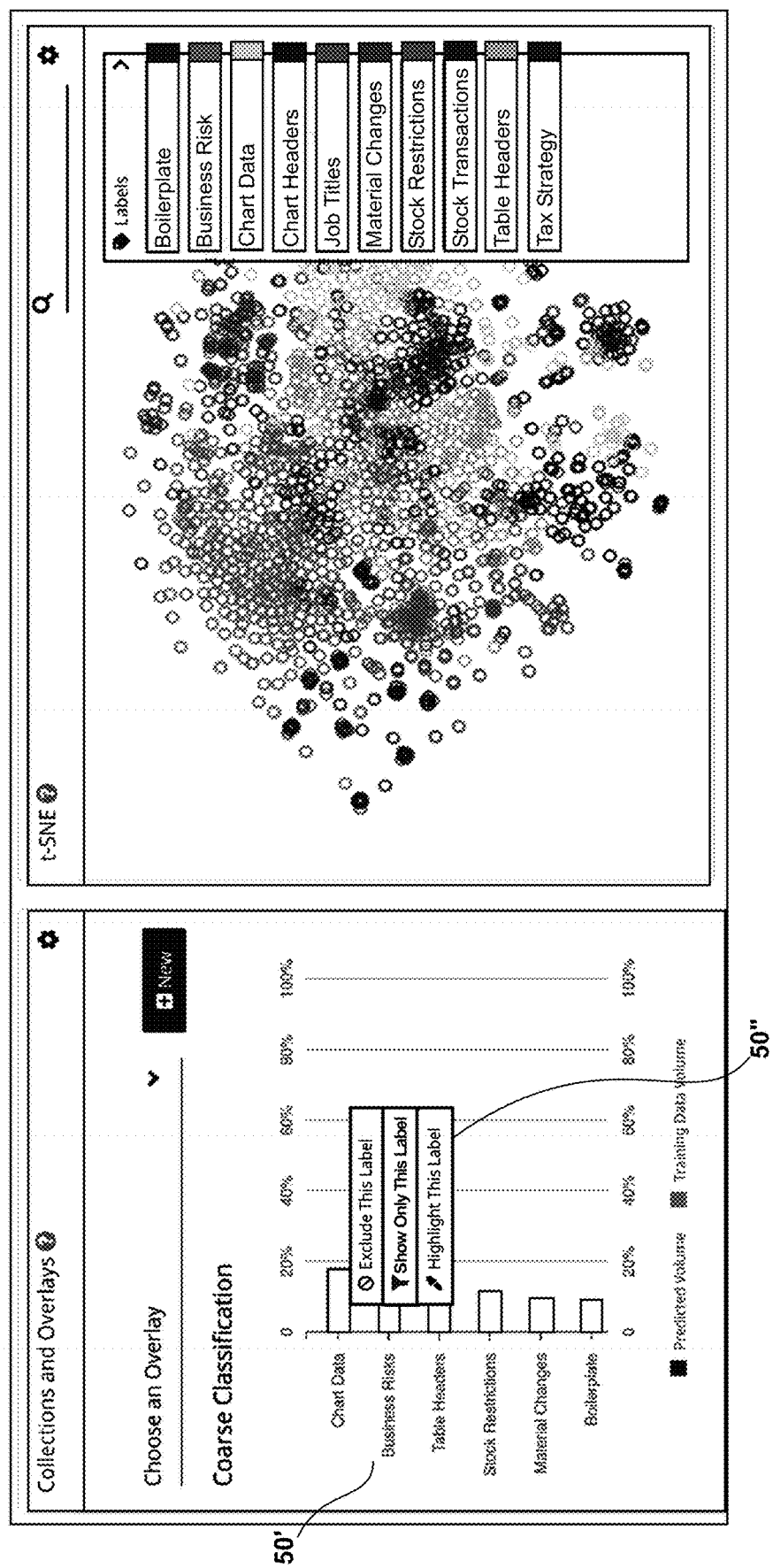

For ease of use, GUI 10 can comprise a further user interface 50" arranged to allow the user to select one of the labels, the calculator 20 being arranged to then generate a modified set of text documents comprising only the received text documents associated to the selected label (box "show only this label" in interface 50"), and to display on the 2D display 30 only the 2-D data corresponding to the n-dimensional manifold vectors of the modified set of text documents. Alternatively, the calculator 20 can be arranged to generate a modified set of text documents comprising the received text documents except those associated to the selected label (box "exclude this label" in interface 50"). As illustrated in FIG. 25C, interface 50" can comprise a set of dialog boxes that appears on the display when the user moves a mouse cursor above the percentage associated to each label in display 50'.

Figure 25D:
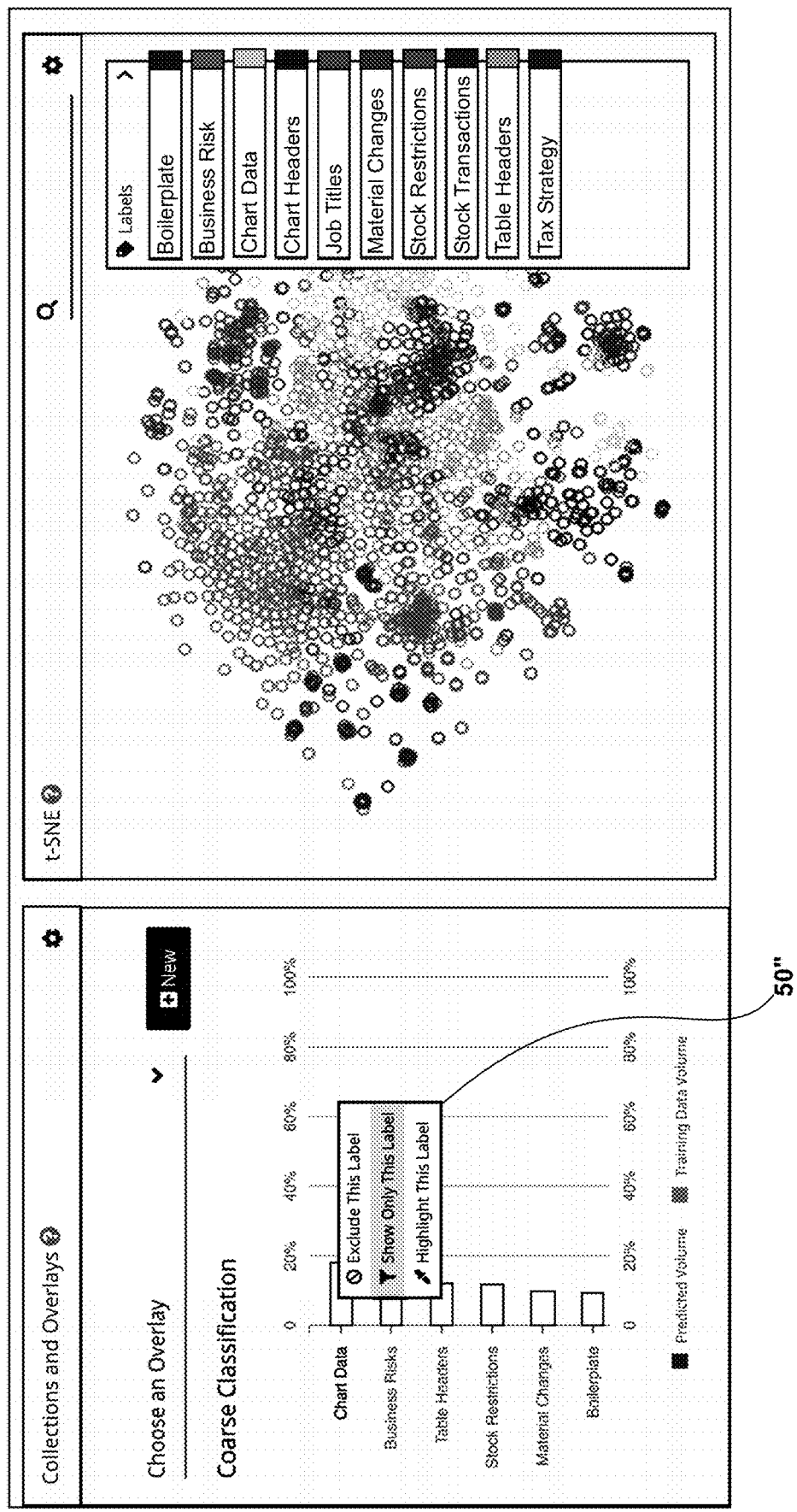

FIG. 25D illustrates a user selecting in interface 50" an operation of calculator 20 (by selecting the box "show only this label" in interface 50") on the 2-D data associated (via its corresponding text documents) to the label "Chart Data".

Figure 25E:
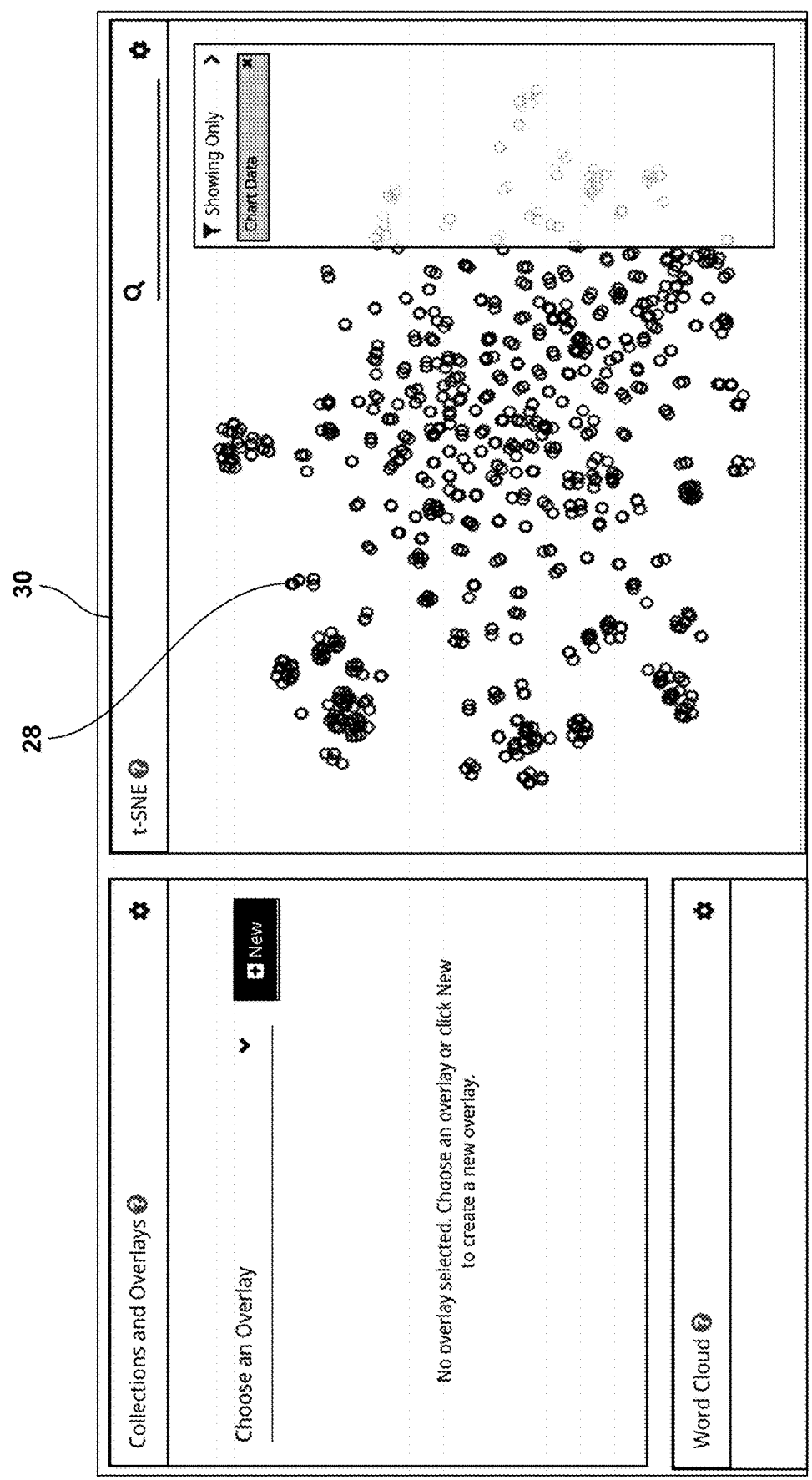

FIG. 25E illustrates display 30 displaying only the 2-D data 28 associated to the label selected in FIG. 25D. According to an embodiment of this presentation and as illustrated in FIG. 25E, calculator 20 can be arranged to change the scale of the 2-D display 30 such that the 2-D data is always displayed on at least a predetermined portion of the first user display. For example, the scale of display 30 can be changed such that the outward-most 2-D data 28 is always $\frac{1}{10}^{th}$ or $\frac{1}{20}^{th}$ of the size of display 30 away from the edges of display 30 in the x and y directions. Alternatively, the calculator 20 can be arranged to change how the n-dimensional manifold vectors of the modified set of text documents are transformed (projected) into 2-D data, such that the 2-D data is always displayed on the predetermined portion of display 30.

According to embodiments of this presentation calculator 20 can be further arranged to allow a user to adjust the number n of dimensions in said n-dimensional manifold. For example, the number n can be reduced to allow rapid computations by calculator 20, thus allowing the user to gain time when associating labels to a large number of text documents using the 2-D data; and the number n can be increased back before working on a reduced number of text documents.

Figure 26A:
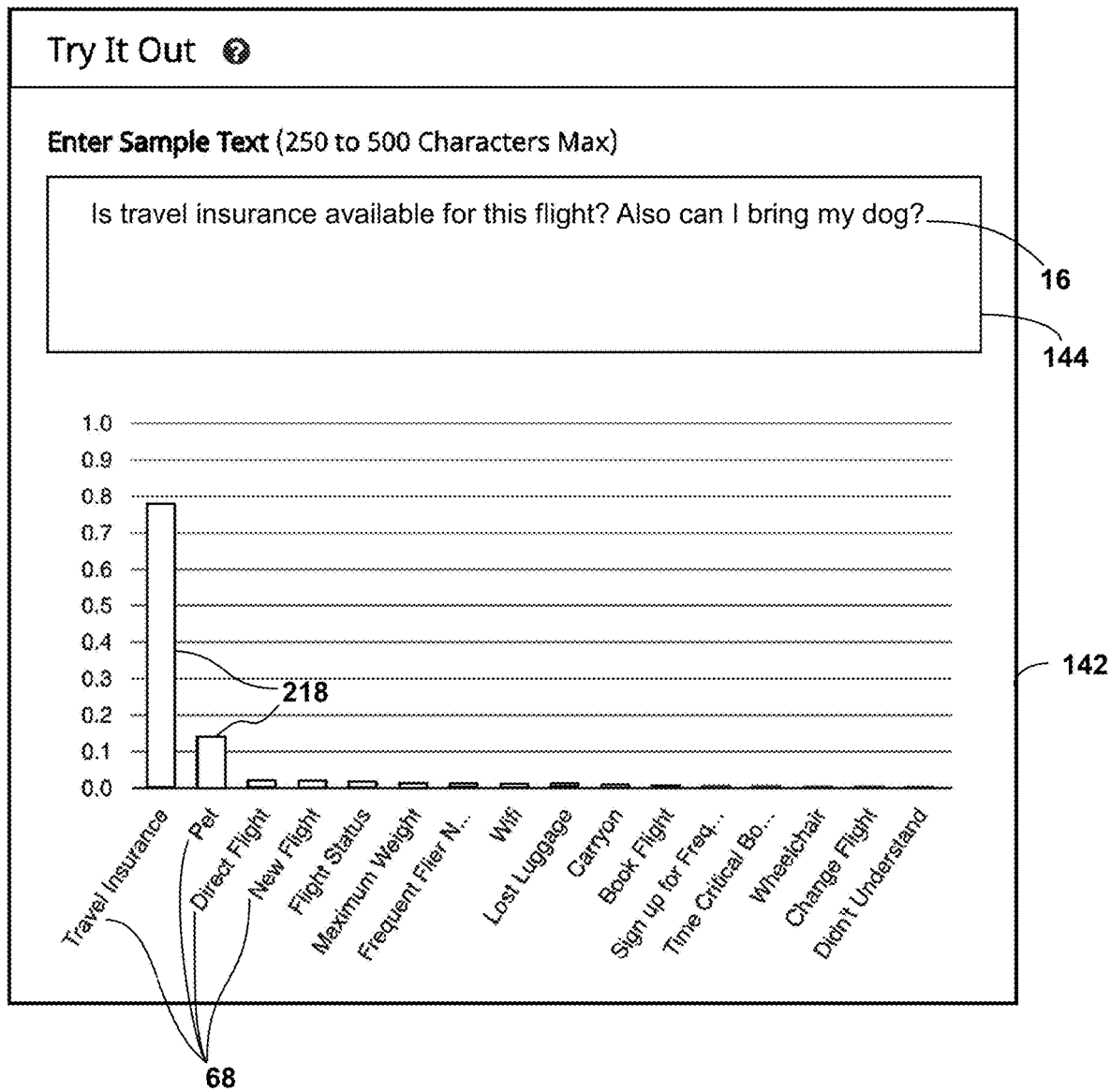
FIGS. 26A to 26E illustrate the operation of a GUI according to embodiments of this presentation.

FIG. 26A illustrates a display 142 of a GUI such as illustrated in FIG. 14, having an interface 144 allowing a user to enter/type a text document 16; where display 142 is arranged for displaying a confidence level 218 of the text document being associated with each label 68. According to an embodiment of this presentation, such displaying of the confidence level further comprises providing a user interface 220 allowing the user to request a highlighting of how the text document is associated to a selected label.

Figure 26B:
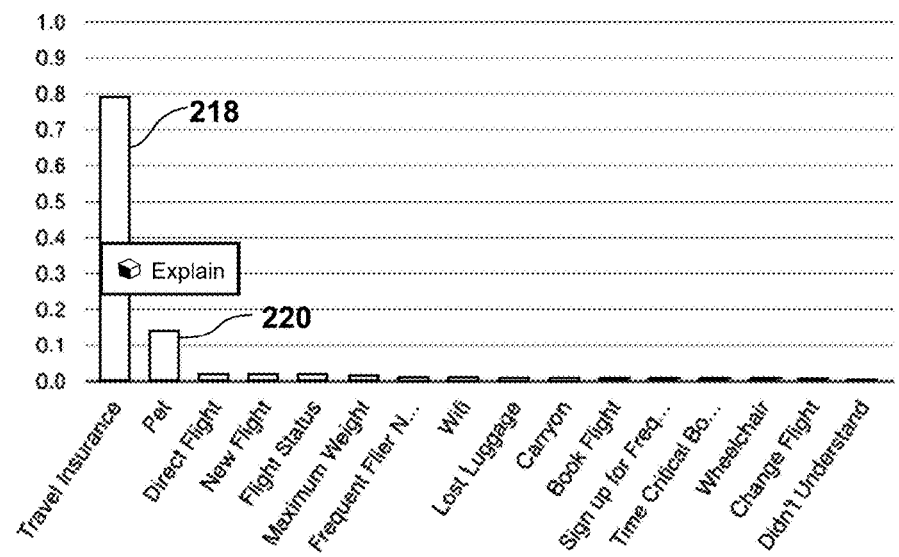

As illustrated in FIG. 26B, interface 220 can comprise a dialog box ("explain") that appears on the display 142 when the user moves a mouse cursor above the confidence level 218 displayed in display 142 for the selected label.

Figure 26C:
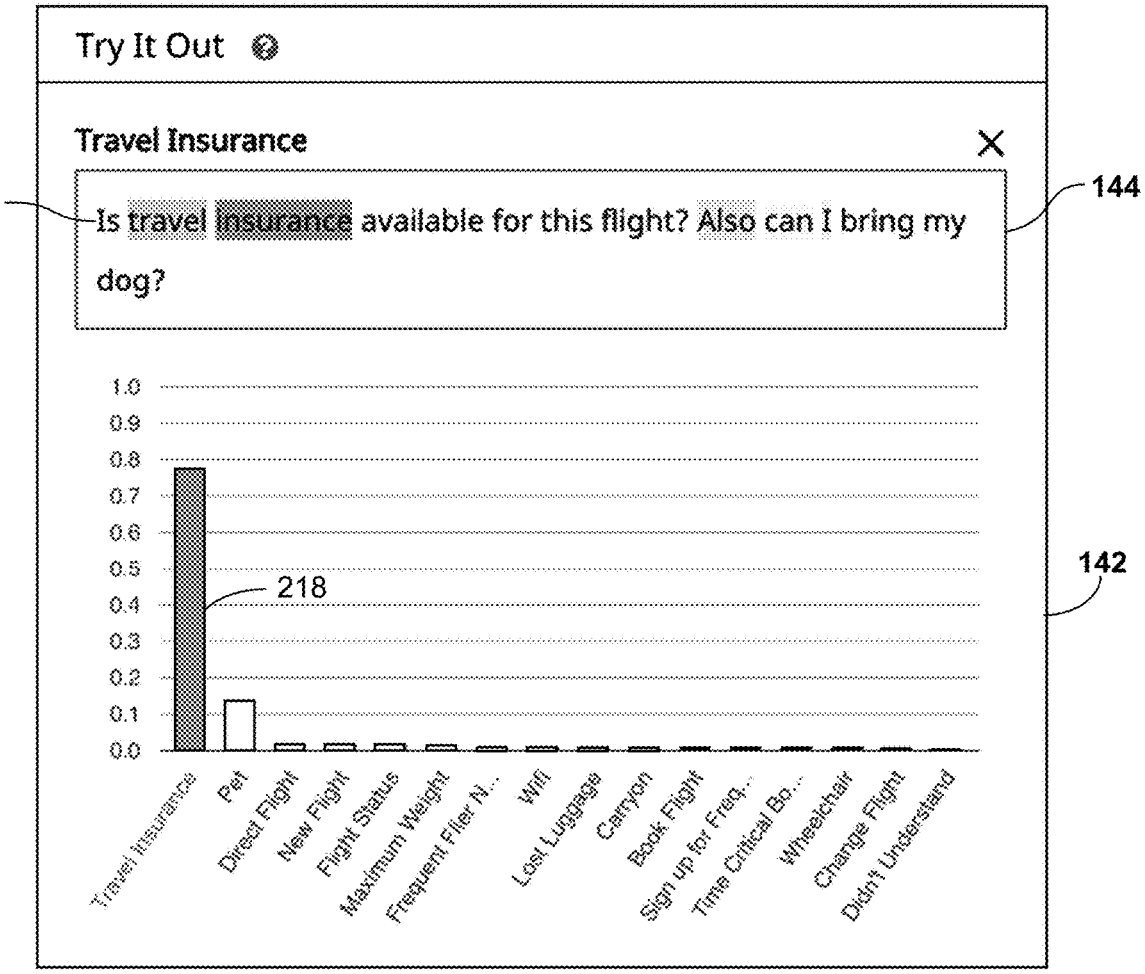

As illustrated in FIG. 26C, the GUI is further arranged for highlighting in a non-binary way how at least one word 222 of the displayed text document 16 associates said text document to the selected estimated label 218. According to an embodiment of this presentation, said non-binary highlighting can comprise superposing, with each word of the displayed text document used by the data recognition model in the association of the text document 16 with the label, a color box having a color intensity that indicates how important the word is to the data recognition model for making that association. In the illustrated example, the word "insurance" is of great importance to associate the sentence 16 to the label "travel insurance"; the words "travel" and "also" are of lesser importance; and the other words are of no importance.

Figure 26D:
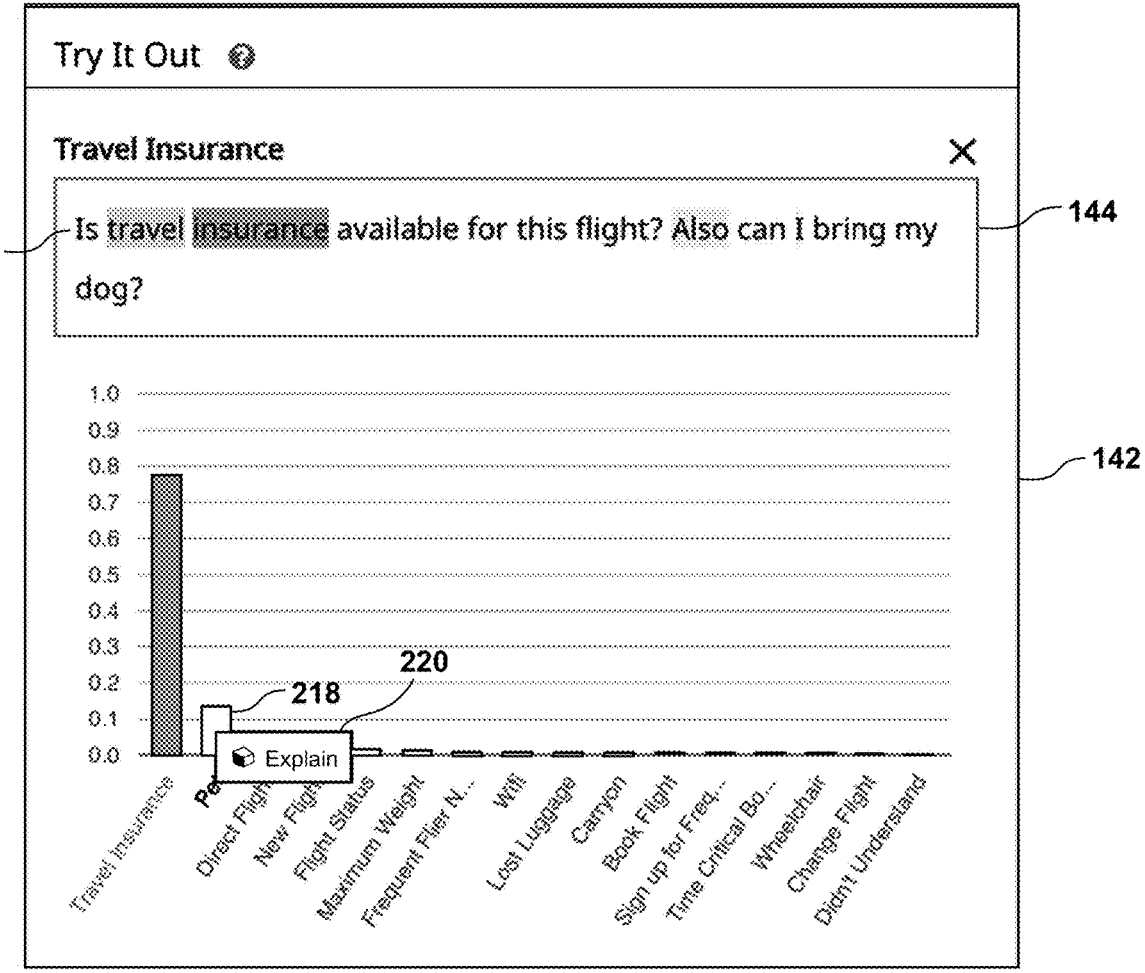
Figure 26E:
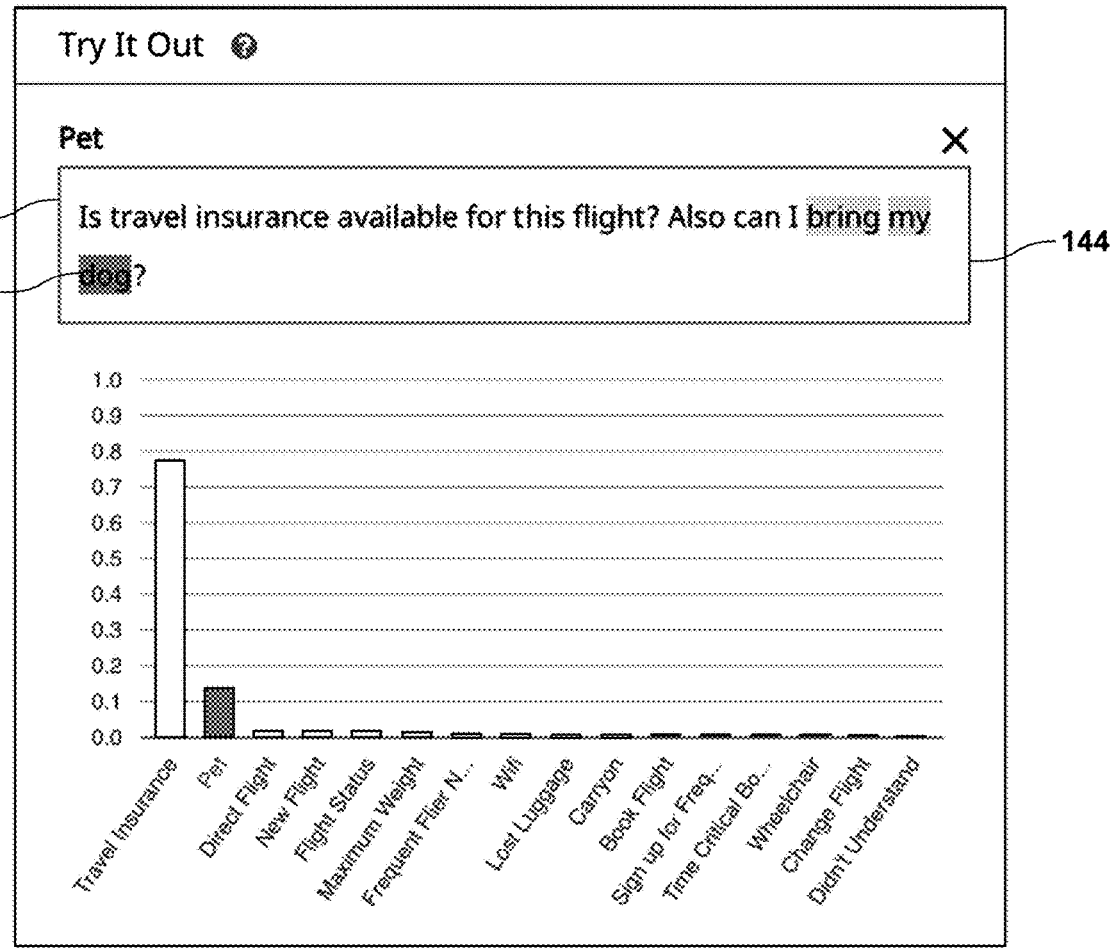

FIG. 26D illustrates interface 220 having been moved above a further confidence level 218, associated to the label "pet", and FIG. 26E illustrates the GUI highlighting in a non-binary way how the words 222 of the displayed text document 16 associate text document 16 to the selected estimated label 218 "pet". In the illustrated example, the word "dog" is of great importance to associate the sentence 16 to the label "pet"; the words "bring" and "my" are of lesser importance; and the other words are of no importance.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this presentation with respect to the current state of the art, but also contemplates advancements and that adaptations in the future may take into consideration of those advancements, namely in accordance with the then current state of the art. Reference to a feature element in the singular is not intended to mean "one and only one" unless explicitly so stated. Moreover, no element, component, nor method or process step in this presentation is intended to be dedicated to the public regardless of whether the element, component, or step is explicitly recited in this presentation. No element disclosed herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of. . . . "

What is claimed is:

1. A graphical user interface comprising:
   a data interface arranged for receiving a set of text documents;
   a calculator arranged for:
   transforming each text document of the received set into a vector of a n-dimensional manifold, n being an integer larger than 2;
   transforming each vector in said n-dimensional manifold into a data in a 2-D space;
   generating and storing a first mapping between said data in said 2-D space and said vectors in said n-dimensional manifold; and
   generating and storing a second mapping between said data in said 2-D space and said text documents of the received set;
   a first user display arranged for displaying each data in said 2-D space on a 2-D plane;
   a first user interface arranged for allowing a user to select a subset of the displayed data in said 2-D space; wherein selecting said subset of the data in said 2-D space automatically selects the vectors in said n-dimensional manifold that correspond to said subset of data in said 2-D space; and
   a second user display arranged for displaying a list of the text documents that correspond to said subset of data in said 2-D space.

2. The graphical interface of claim 1, wherein the calculator is further arranged for:
   calculating a first vector space model of the received set of text documents;
   calculating a second vector space model of the text documents that correspond to said subset of data in said 2-D space; and
   calculating a third vector space model equal to the difference between the first and second vector space models;
   the graphical user interface further comprising a third user display for displaying a word cloud representation of said third vector space model.

3. The graphical interface of claim 1, further comprising a second user interface arranged for allowing a user to associate said subset of the data in said 2-D space to an associated label, from a predetermined set of labels or entered by the user; wherein associating said subset of the data in said 2-D space to said associated label automatically associates said associated label to the vectors in said n-dimensional manifold that correspond to said subset of data in said 2-D space.

4. The graphical interface of claim 3,
   wherein the calculator is further arranged to:
   train a label recognition model using a plurality of said associated label and said vectors in said n-dimensional manifold that correspond to said subset of data in said 2-D space;
   using said label recognition model, associate each text document of said received set of text documents to one label of said plurality of said associated label; and
   emphasize differently on the first user display the data in said 2-D space, which corresponds to a text document of said received set of text documents that is associated to a different label.

5. The graphical user interface of claim 4, further comprising a third user interface arranged to allow a user to select a label associated to at least one data in said 2-D space, the calculator being arranged:
   to generate a modified set of text documents comprising either the received text documents associated to the selected label or the received text documents except those associated to the selected label; and
   to display on the 2D display only the 2-D data corresponding to the n-dimensional manifold vectors of the modified set of text documents.

6. The graphical user interface of claim 5, wherein the calculator is arranged to change the scale of the 2-D display such that the 2-D data is always displayed on at least a predetermined portion of the first user display.

7. The graphical user interface of claim 5, wherein the calculator is arranged to change how said vectors in said n-dimensional manifold are transformed into a data in a 2-D space as a function of said modified set of text documents, such that the 2-D data is always displayed on at least a predetermined portion of the first user display.

8. The graphical user interface of claim 4, further comprising a third user interface arranged to allow a user to associate a received text document to a label, or to un-associate a received text document from a label to which it was previously associated, by selecting the displayed 2-D data corresponding to the received text document.

9. The graphical user interface of claim 4, wherein the calculator is arranged to change how the vectors in the n-dimensional manifold are transformed into a data in a 2-D space, such that the 2-D data of text documents associated to a same label form clusters on the first user display.

10. The graphical user interface of claim 9 wherein the calculator is arranged to weigh the directions of the n-dimensional manifold that appear prominently in the vectors of the text documents associated to labels differently from the other directions of the n-dimensional manifold.

11. The graphical user interface of claim 10, wherein the weighing of the prominent directions is such that the 2-D projection of distances along said directions appear shorter on the 2-D display than the 2-D projection of distances along the other, non-weighed, directions.

12. The graphical user interface of claim 9, wherein the calculator is arranged to cause the 2-D data of text documents associated to a same label to form said clusters in real time as the text documents associated to a same label change.

13. The graphical user interface of claim 4, wherein the calculator is arranged to change how said vectors in said n-dimensional manifold are transformed into a data in a 2-D space, such that the distances separating the 2-D data of text documents associated to a same label are reduced on the first user display.

14. The graphical user interface of claim 1, wherein the calculator is further arranged to allow a user to adjust the number n of dimensions in said n-dimensional manifold.

15. The graphical user interface of claim 1, wherein at least one of the received text documents is associated to a label and wherein the calculator is further arranged to:
    train a label recognition model using a plurality of said associated label and the vectors in the n-dimensional manifold that correspond to said at least one of the received text documents;
    using said label recognition model, associate each non-labeled text document of said received set of text documents to one label of said plurality of said associated label; and
    emphasize differently on the first user display the data in said 2-D space, which corresponds to a text document of said received set of text documents that is associated to a different label.

16. The graphical user interface of claim 1, wherein at least one of the received text documents is associated to a label and wherein the calculator is further arranged to filter out and not process anymore said at least one of the received text documents if said label is part of a predetermined set of labels that are to be filtered out.

17. A graphical user interface comprising:
    a data interface arranged for receiving a set of text documents;
    a calculator arranged for:
    transforming each text document of the received set into a vector of a n-dimensional manifold, n being an integer larger than 2;
    transforming each vector in said n-dimensional manifold into a data in a 2-D space; and
    generating and storing a first mapping between said data in said 2-D space and said vectors in said n-dimensional manifold;
    a first user display arranged for displaying each data in said 2-D space on a 2-D plane; and
    a first user interface arranged for allowing a user to submit a query text;
    the calculator being further arranged to:
    transform said query text into a vector of said n-dimensional manifold; and
    use a distance metric to calculate a distance between the transformed query text and the vector in said n-dimensional manifold of each text document of the received set;
    the first user display being arranged for highlighting each data in said 2-D space as a function of the distance calculated for the n-dimensional manifold vector that corresponds to the data in 2-D space.

18. The graphical interface of claim 17, wherein the calculator is further arranged for:
    generating and storing a second mapping between said data in said 2-D space and said text documents of the received set; and
    generating a first subset of data in said 2-D space corresponding to n-dimensional manifold vectors having a calculated distance below a predetermined threshold;
    the graphical user interface comprising a second user display arranged for displaying a list of the text documents that correspond to said first subset of data in said 2-D space.

19. The graphical interface of claim 18, comprising
    a second user interface arranged for allowing a user to select a second subset of the displayed data in said 2-D space; wherein selecting said second subset of the data in said 2-D space automatically selects the vectors in said n-dimensional manifold that correspond to said second subset of data in said 2-D space; and
    a third user display being arranged for displaying a list of the text document that correspond to said second subset of data in said 2-D space.

20. The graphical interface of claim 19, further comprising a third user interface arranged for allowing a user to associate said second subset of the data in said 2-D space to an associated label, from a predetermined set of labels or entered by the user; wherein associating said second subset of the data in said 2-D space to said associated label automatically associates said associated label to the vectors in said n-dimensional manifold that correspond to said second subset of data in said 2-D space.

21. The graphical interface of claim 20, wherein the calculator is further arranged to:
    train a label recognition model using a plurality of said associated label and said vectors in said n-dimensional manifold that correspond to said subset of data in said 2-D space;
    using said label recognition model, associate each text document of said received set of text documents to one label of said plurality of associated label; and
    emphasize differently on the first user display the data in said 2-D space, which corresponds to a text document of said received set of text documents that is associated to a different label.

22. The graphical interface of claim 17, wherein said data interface arranged for receiving a set of text documents comprises one of an Optical Character Recognition function, a XML Parsing function, and a CSV Parsing function.

23. The graphical interface of claim 17, wherein the calculator is further arranged for:
- calculating a first vector space model of the received set of text documents;
- calculating a second vector space model of the text document that correspond to said first subset of data in said 2-D space; and
- calculating a third vector space model equal to the difference between the first and second vector space models;
- the graphical user interface further comprising a third user display for displaying a word cloud representation of said third vector space model.

24. A graphical user interface comprising:
- a data interface arranged for receiving a first set of text documents;
- a calculator arranged for transforming each received text document into a vector of a n-dimensional manifold, n being an integer larger than 2;
- a first user display arranged for successively displaying each text document of the first set of text documents;
- a first user interface arranged for allowing a user to associate each displayed text document to a label selected by the user;
- the calculator being arranged to associate said label selected by the user to the n-dimensional manifold vector that corresponds to the displayed text document; and
- a data recognition model arranged for associating any received n-dimensional manifold vector being to one of said labels selected by the user, the data recognition model being dynamically based on the associations made by said calculator between the labels selected by the user and the n-dimensional manifold vectors;
- the data recognition model being arranged to receive the n-dimensional manifold vector corresponding to each text document displayed on the first user display, and to output in response which label of said labels selected by the user is associated to said received n-dimensional manifold vector;
- the first user display being further arranged for displaying, in addition to displaying each text document of the first set of text documents, which label is output by the data recognition model in response to the n-dimensional manifold vector that corresponds to the displayed text document.

25. The graphical user interface of claim 24,
- wherein said data interface is arranged for receiving a second set of text document;
- the graphical user interface further comprising a second user display arranged for successively displaying subsets of the second set of text documents;
- the calculator being arranged for transforming each text document of said displayed subsets into a vector of said n-dimensional manifold; and
- the data recognition model being arranged to receive the n-dimensional manifold vector corresponding to each text document of said displayed subsets and to output in response which label of said labels selected by the user is associated to said received n-dimensional manifold vector;
- the second user display being arranged for displaying, in addition to displaying each text document of the subsets of the second set of text documents, which label is output by the data recognition model in response to the n-dimensional manifold vector that corresponds to the displayed text document.

26. The graphical user interface of claim 25, further comprising: a second user interface arranged for allowing the user to accept as valid or reject as invalid the label displayed on said second user display; an accepted label being considered as a further label association to be used as a basis for the data recognition model.

* * * * *